US 8,738,803 B2

(12) United States Patent
Onoue

(10) Patent No.: US 8,738,803 B2
(45) Date of Patent: May 27, 2014

(54) COMMUNICATION METHOD, COMMUNICATION DEVICE, AND COMPUTER PRODUCT FOR CONVERTING BROADCAST INTO UNICAST

(75) Inventor: Koichi Onoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 13/526,829

(22) Filed: Jun. 19, 2012

(65) Prior Publication Data

US 2013/0054773 A1 Feb. 28, 2013

(30) Foreign Application Priority Data

Aug. 30, 2011 (JP) ................................ 2011-188037

(51) Int. Cl.
*G06F 15/173* (2006.01)
(52) U.S. Cl.
USPC ........... 709/242; 709/220; 709/221; 709/223; 709/224; 709/245
(58) Field of Classification Search
USPC ......... 709/242, 245, 220, 221, 223, 224, 225; 725/109; 370/392, 255, 401, 412; 719/323
See application file for complete search history.

(56) References Cited

U.S. PATENT DOCUMENTS

| 7,130,307 | B2 | 10/2006 | Nakamura et al. | |
|---|---|---|---|---|
| 2011/0296481 | A1* | 12/2011 | Cholas et al. | 725/109 |
| 2011/0299537 | A1* | 12/2011 | Saraiya et al. | 370/392 |
| 2012/0008528 | A1* | 1/2012 | Dunbar et al. | 370/255 |
| 2012/0033678 | A1* | 2/2012 | Page et al. | 370/401 |
| 2012/0036233 | A1* | 2/2012 | Scahill et al. | 709/220 |
| 2012/0177045 | A1* | 7/2012 | Berman | 370/392 |
| 2013/0058358 | A1* | 3/2013 | Fulton et al. | 370/412 |
| 2013/0117766 | A1* | 5/2013 | Bax et al. | 719/323 |

FOREIGN PATENT DOCUMENTS

| JP | 2002-374276 A | 12/2002 |
|---|---|---|
| JP | 2005-151598 A | 6/2005 |
| JP | 2007-081519 A | 3/2007 |
| WO | WO-2005/032073 A1 | 4/2005 |

OTHER PUBLICATIONS

Onoue, et al., "Host-based Logical Isolation Technology for Scalable Cloud Networks", Symposium on Advanced Computing Systems and Infrastructures, May 25, 2011, pp. 100-108, URL:http://skdr.dyndns.org/proceedings/sacsis2011/IPSJ-SACSIS2011013.pdf (English Abstract).

* cited by examiner

*Primary Examiner* — Le H Luu
(74) *Attorney, Agent, or Firm* — Fujitsu Patent Center

(57) ABSTRACT

A communication method, which is executed by a computer having access to a storage device having stored therein correlation relations between layer 2 addresses and layer 3 addresses set for a group of devices on a network, includes extracting from the storage device when an acquisition request for a layer 2 address is to be transmitted, a first layer 2 address that corresponds to a layer 3 address included in the acquisition request; converting the destination of the acquisition request, from a second layer 2 address representing the group of devices, to the first layer 2 address; transmitting the converted acquisition request whose destination has been converted; and updating when a response to the converted acquisition request has been received, the first layer 2 address in the storage device, to the first layer 2 address included in response.

11 Claims, 49 Drawing Sheets

COMMUNICATION METHOD, COMMUNICATION DEVICE, AND COMPUTER PRODUCT FOR CONVERTING BROADCAST INTO UNICAST

CROSS REFERENCE TO RELATED APPLICATIONS

This application is based upon and claims the benefit of priority of the prior Japanese Patent Application No. 2011-188037, filed on Aug. 30, 2011, the entire contents of which are incorporated herein by reference.

FIELD

The embodiments discussed herein are related to a communication method, a communication device, and a computer product.

BACKGROUND

Conventionally, technology exists that broadcasts the same data to unspecified destinations on a network. For example, under address resolution protocol (ARP), to resolve a layer 2 address, broadcast is performed and the layer 2 address of the communication counterpart is acquired. Broadcasting places great load on the network consequent to transmission to unspecified destinations on the network.

As a technology that suppresses broadcasting, for example, one technology related to local area networks (LAN), converts at a hub connected by a communication line, a broadcast address that is from a connected terminal into a unicast address. Among tunneling technologies is a technology that uses a relay device having a layer 2 address storage function and transmits to a tunnel that is a relay destination and correlated with a layer 3 destination address, data whose layer 2 address taken in from a user terminal is a broadcast address.

Another technology has a search server that returns a result of address resolution in response to an address resolution request and when a layer 2 switch acknowledges a multicast packet for address resolution issued by a terminal, the layer 2 switch transfers the multicast packet through a given route to the search server. In a wireless LAN, yet another technology converts a broadcast address into a unicast address and transmits the unicast address if the destination terminal is registered in a layer 3/layer 2 conversion table that is at a base station and concerns wireless and wired terminals in the wireless LAN.

For examples of such technologies, refer to Japanese Laid-Open Patent Publication Nos. 2005-151598, 2002-374276, and 2007-81519; and International Publication Pamphlet No. WO2005/032073.

However, with the above technologies, if a conversion table is used and broadcast addresses are converted, when a layer 3 address for a device is changed, response to the change is delayed, resulting in invalid data and increased network load. Further, when a device is removed from the network, response to the change is delayed, resulting in increased network load. If the conversion table is periodically erased, broadcasting is performed irrespective of a conversion still being valid and consequently, the degree to which broadcasting is suppressed becomes low and network load increases.

SUMMARY

According to an aspect of an embodiment, a communication method is executed by a computer having access to a storage device having stored therein correlation relations between layer 2 addresses and layer 3 addresses set for a group of devices on a network. The communication process includes extracting from the storage device when an acquisition request for a layer 2 address is to be transmitted, a first layer 2 address that corresponds to a layer 3 address included in the acquisition request; converting the destination of the acquisition request, from a second layer 2 address representing the group of devices, to the first layer 2 address; transmitting the converted acquisition request whose destination has been converted; and updating when a response to the converted acquisition request has been received, the first layer 2 address in the storage device, to the first layer 2 address included in response.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to the accompanying drawings.

Figure 1:
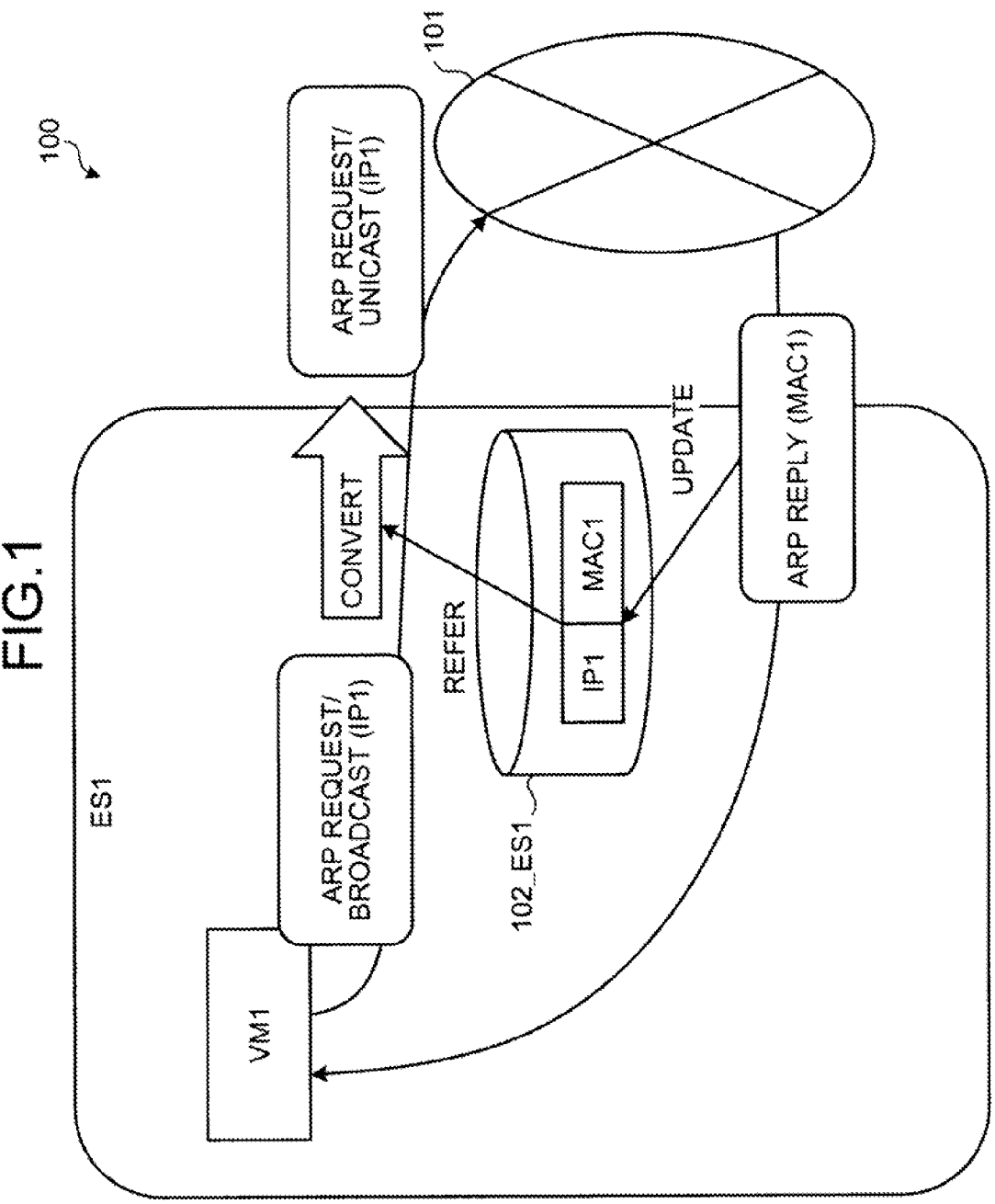
FIG. 1 is a diagram depicting an operation example of a communication system.

FIG. 1 is a diagram depicting an operation example of a communication system. A communication system 100 includes an end host server (ES) that is a communication device according to a first embodiment. An ES 1 includes an internal virtual machine (VM) 1. A VM is a virtual machine that virtualizes a computer and operates on a virtual machine monitor that performs control enabling multiple operating systems (OS) to be executed. The ES 1 is connected to a network 101 and has access to an ARP_BtoU table 102_ES1 of correspondence relations between layer 2 addresses and layer 3 addresses set for devices on the network 101. Hereinafter, "_ESx" indicates a table that is accessible by ES x.

In this state, the VM 1 broadcasts an ARP request to acquire the layer 2 address for an internet protocol (IP) address 1 that is a layer 3 address. From the ARP_BtoU table 102_ES1, the ES 1 extracts a media access control (MAC) address 1 corresponding to IP1, converts the destination of the ARP request to MAC1 from the broadcast address, and transmits the ARP request by unicast.

If an ARP reply to the unicast transmitted ARP request is received, the ES 1 updates the ARP_BtoU table 102_ES1 with MAC1 included in the ARP reply and transmits the ARP reply to the VM 1.

Thus, the ES 1 converts the broadcast of an ARP request into a unicast transmission of the ARP request addressed to a stored MAC address and updates the MAC address obtained from the ARP reply. Consequently, the ES 1 suppresses broadcasting and can respond to network changes, whereby invalid data is not transmitted, enabling the load on the network 101 to be suppressed.

Figure 2:
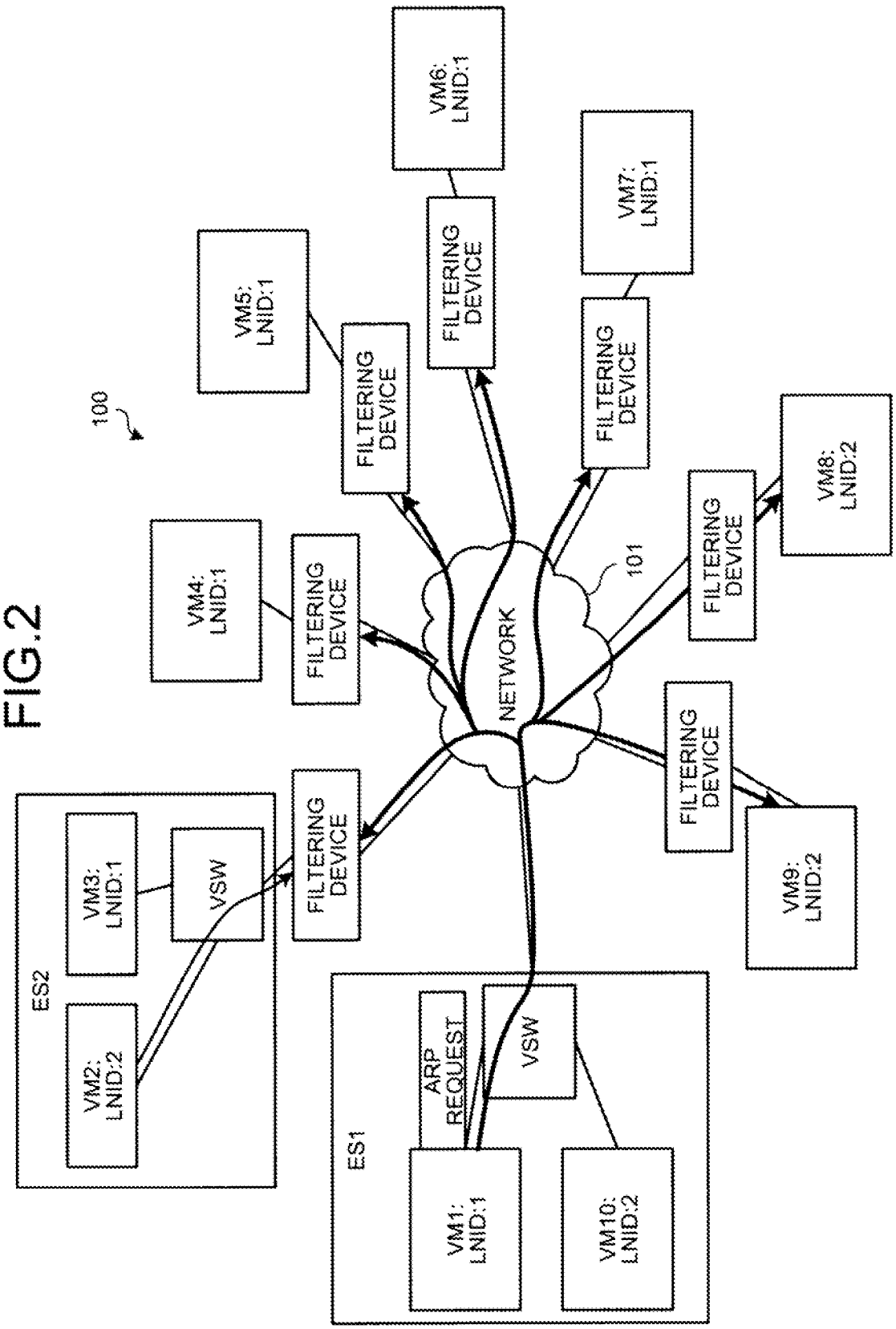
FIG. 2 is a diagram depicting an example of connection of the communication system.

FIG. 2 is a diagram depicting an example of connection of the communication system. The communication system 100 includes the VMs 1 to 10. In the example depicted in FIG. 2, the VM 1 and the VM 10 operate on the ES 1; and the VM 2 and the VM 3 operate on an ES 2. Although not depicted in FIG. 2, the VMs 4 to 9 also operate on an ES. The VMs 1 to 10 are appended with logical network IDs (LNID) that isolate the network 101 logically (for example, refer to Onoue, Koichi, et al, "Host-based Logical Isolation Technology for Scalable Cloud Networks", [online], searched Aug. 15, 2011, <URL: http://skdr.dyndns.org/proceedings/sacsis2011/IPSJ-SACSIS2011013.pdf>).

In the example depicted in FIG. 2, LNID:1 is appended to the VM 1, the VM 3, the VM 4, the VM 5, the VM 6, and the VM 7; and LNID:2 is appended to the VM 2, the VM 8, the VM 9, and the VM 10. Further, the VMs 2 to 9 are connected to the network 101 through a filtering device that filters packets. In this connection state, for example, the VM 1 broadcasts an ARP request through a virtual switch (VSW) to the VMs 2 to 10. If an IP address is to be set, the VM 1 broadcasts DHCPDISCOVER to the VMs 2 to 10, according to the dynamic host configuration protocol (DHCP).

Figure 3:
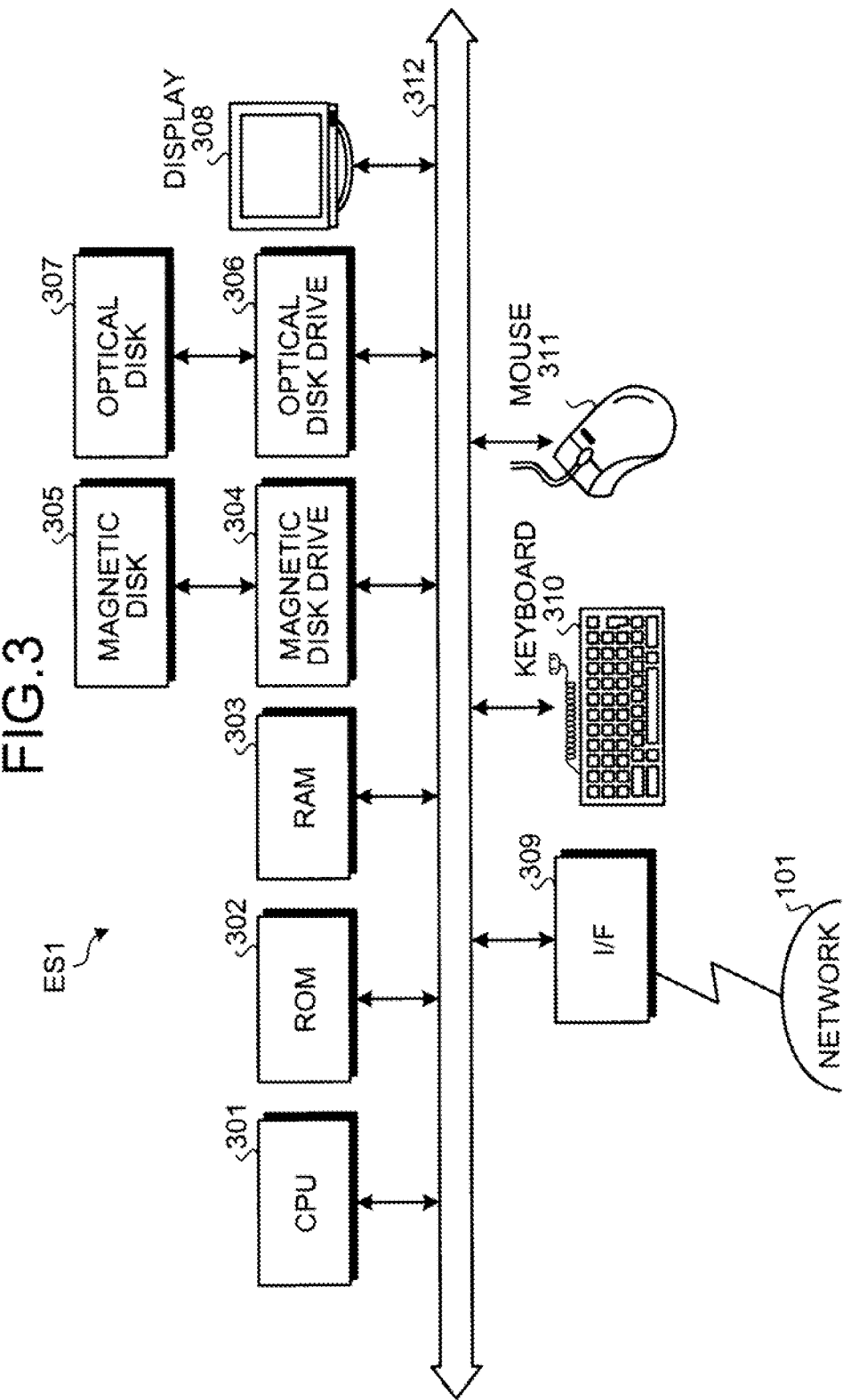
FIG. 3 is a block diagram depicting an example of the hardware of an end host server (ES) 1.

FIG. 3 is a block diagram depicting an example of the hardware of the ES 1. With reference to FIG. 3, the hardware of the ES 1, which is a communication device, will be described. Other ESs have hardware identical to the ES 1. As depicted in FIG. 3, the ES 1 includes a central processing unit (CPU) 301, a read-only memory (ROM) 302, a random access memory (RAM) 303, a magnetic disk drive 304, a magnetic disk 305, an optical disk drive 306, and an optical disk 307. As input and output devices for the user and/or other devices, the ES 1 includes a display 308, an interface (I/F) 309, a keyboard 310, and a mouse 311. The components are respectively connected by a bus 300.

The CPU 301 governs overall control of the ES 1. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer. Any one of the storage devices among the ROM 302, the magnetic disk 305, and the optical disk 307 may store a communication program according the first and a second embodiment.

The display 308 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 308.

The I/F 309 is connected to the network 101 such as a local area network (LAN), a wide area network (WAN), and the Internet through a communication line and is connected to other apparatuses through the network 101. The I/F 309 administers an internal interface with the network 101 and controls the input/output of data from/to external apparatuses. For example, a modem or a LAN adaptor may be employed as the I/F 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

Figure 4:
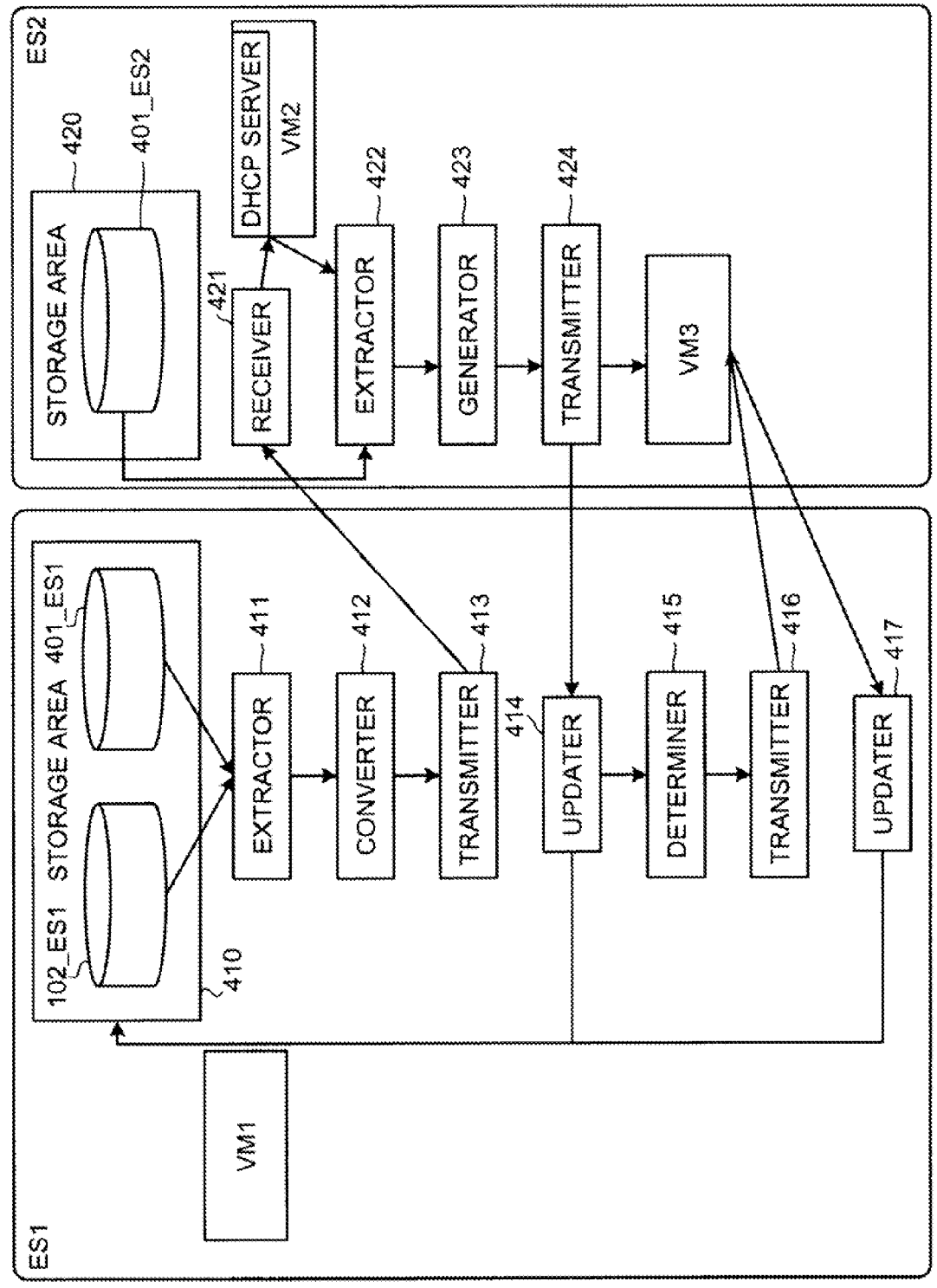
FIG. 4 is a block diagram depicting an example of a functional configuration of the communication system.

FIG. 4 is a block diagram depicting an example of a functional configuration of the communication system. The communication system 100 includes a storage area 410, an extractor 411, a converter 412, a transmitter 413, an updater 414, a determiner 415, a transmitter 416, an updater 417, a storage area 420, a receiver 421, an extractor 422, a generator 423, and a transmitter 424. These functions (the extractor 411 to the updater 417, and the receiver 421 to the transmitter 424) forming a controller are implemented by executing on the CPU 301, a program stored in a storage device. The storage device is, for example, the ROM 302, the RAM 303, the magnetic disk 305, and the optical disk 307 depicted in FIG. 3. Further the functions may be implemented by the execution of the program on another CPU, via the I/F 309.

The ES 1 can access the ARP_BtoU table 102_ES1 and a DHCP_BtoU table 401_ES1 as the storage area 410. The storage area 410 is in a storage device such as the RAM 303, the magnetic disk 305, and the optical disk 307. Similarly, the ES 2 can access the DHCP_BtoU table 401_ES1 as the storage area 420. The storage area 420 is in a storage device such as the RAM, the magnetic disk, and the optical disk of the ES 2. Although not depicted in FIG. 4, the ES 2, when transmitting an ARP request, may access an ARP_BtoU table 102_ES2.

In the example depicted in FIG. 4, the storage area 410 to the updater 417 are depicted as functions of the ES 1; and the storage area 420 to the transmitter 424 are depicted as functions of the ES 2. For example, if a DHCP server in a VM of the ES 1 is running, the ES 1 may have the storage area 420 to the transmitter 424. Further, in the example depicted in FIG. 4, in the ES 1, the VM 1 is operating; and in the ES 2, the VM 2 and the VM 3 are operating. In the VM 2, a DHCP server is running.

An ARP_BtoU table 102 indicates correspondence relations between layer 2 addresses and layer 3 addresses set for devices on the network 101. Here, a layer 2 address is a data link layer address, e.g., a MAC address. A layer 3 address is a network layer address, e.g., an IP address. Details of the ARP_BtoU table 102 will be described hereinafter with reference to FIG. 5.

The DHCP_BtoU table 401_ES1 indicates layer 2 addresses of devices storing allocable layer 3 addresses. For example, the DHCP_BtoU table 401_ES1 indicates the MAC addresses of DHCP servers storing allocable layer 3 addresses.

The DHCP_BtoU table 401_ES1 may indicate the IP addresses of the DHCP servers. In particular, when a DHCP server is outside the broadcast domain to which the ES 1 belongs, the DHCP server cannot be reached from the ES 1 by the MAC address and therefore, the DHCP_BtoU table 401_ES1 includes the IP address of the DHCP servers. Further, a case when a DHCP server is outside the broadcast domain to which the ES 1 belongs, for example, is a case when a router that has received broadcast data of the VM 1 transfers by a DHCP relay agent, the data to a DHCP server outside the broadcast domain to which the ES 1 belongs. Details of the DHCP_BtoU table 401 will be described hereinafter with reference to FIG. 25.

The extractor 411 has a function of extracting from the storage area 410 when an acquisition request for a layer 2 address is to be transmitted, a first layer 2 address corresponding to the layer 3 address included in the acquisition request. For example, when an ARP request (the layer 2 address acquisition request) is to be transmitted, the extractor 411 extracts from the ARP_BtoU table 102_ES1, a MAC address that corresponds to the destination protocol address included in the ARP request.

Configuration may be such that the extractor 411 extracts a first layer 2 address from the storage area 410 when the acquisition request is an acquisition request for an allocable layer 3 address. For example, when DHCPDISCOVER (the layer 3 address acquisition request) is to be transmitted, the extractor 411 extracts from the DHCP_BtoU table 401_ES1, the MAC address of the DHCP server.

As an acquisition method of the acquisition request, an acquisition request generated at the ES 1 or an acquisition request transmitted from another ES may be received. The extracted first layer 2 address is stored to a storage area of, for example, the RAM 303, the magnetic disk 305, the optical disk 307, etc.

The converter 412 has a function of converting the destination of an acquisition request, from a second layer 2 address indicative of the devices on the network 101 into a first layer 2 address. The second layer 2 address, for example, is a broadcast MAC address, "FF-FF-FF-FF-FF-FF". The second layer 2 address may be a multicast MAC address such as a MAC address that begins with "01-00-5E-".

For example, the converter 412 converts the header portion of the destination address of an ARP request, from a broadcast MAC address into the extracted MAC address. Configuration may be such that when the layer 3 address corresponding to the extracted layer 2 address is in the storage area 410, the converter 412 converts the destination IP address into the layer 3 address corresponding to the extracted layer 2 address. The converted acquisition request is stored to a storage area of, for example, the RAM 303, the magnetic disk 305, the optical disk 307, etc.

The transmitter 413 has a function of transmitting an acquisition request whose destination has been converted. For example, the transmitter 413 transmits to the VM 2, a unicast ARP request resulting from such conversion. The transmitter 413 further transmits to the VM 2, unicast DHCPDISCOVER resulting from such conversion.

The updater 414 has a function of updating when a response to a converted acquisition request has been received, the first layer 2 address in the storage area 410 to the first layer 2 address included in the response. For example, when an ARP reply is received, the updater 414 updates in the ARP_BtoU table 102_ES1, the MAC address corresponding to the IP address of the ARP request, to the transmission source hardware address of the ARP reply. Further, when DHCPOFFER is received, the updater 414 registers to the DHCP_BtoU table 401_ES1, the transmission source MAC address of the DHCPOFFER or server IP address of the DHCPOFFER.

Further, if no response is received with respect to a converted acquisition request, the updater 414 may delete the first layer 2 address in the storage device. For example, if no ARP reply is received, the updater 414 deletes the ARP_BtoU table 102_ES1 record that corresponds to the ARP request. For example, at the extractor 411, the record number subject to extraction is stored and if an ARP reply is not received within a given period, the updater 414 deletes the stored record.

Similarly, if no DHCPOFFER is received in response to a DHCPDISCOVER, the updater 414 deletes the DHCP_BtoU table 401_ES1 record that corresponds to the DHCPDISCOVER.

When updating to a first layer 2 address is performed, the determiner 415 has a function of determining whether multiple layer 3 addresses corresponding to the first layer 2 address are present in the storage area 410. For example, the determiner 415 determines whether consequent to the update of the ARP_BtoU table 102_ES1, multiple records having the same MAC address as the MAC address of the ARP reply are present. The determination result is stored to a storage area of, for example, the RAM 303, the magnetic disk 305, the optical disk 307, etc.

The transmitter 416 has a function of transmitting to the remaining layer 3 addresses exclusive of the layer 3 address included in the acquisition request, a pseudo acquisition request addressed to the first layer 2 address, when multiple layer 3 addresses corresponding to the first layer 2 address are present. For example, when multiple records are present having the same MAC address as the ARP reply MAC address, the transmitter 416 transmits a pseudo ARP request to the remaining IP addresses exclusive of the IP address of the ARP request.

The updater 417 has a function of updating when a response to a pseudo acquisition request is received, the first layer 2 address corresponding to the remaining layer 3 address in the storage area 410, to the first layer 2 address included in the response to the pseudo acquisition request.

For example, an ARP reply for the pseudo ARP request is assumed to be received. In this case, in the ARP_BtoU table 102_ES1, the updater 417 updates the MAC address corresponding to the IP address of the pseudo ARP request, to the transmission source hardware address of the ARP reply.

Further, if no response is received for a pseudo acquisition request, the updater 417 may delete from the storage area 410, the first layer 2 addresses corresponding to the remaining layer 3 addresses. For example, in the ARP_BtoU table 102_ES1, the updater 417 deletes the record corresponding to the IP address of the pseudo ARP request.

The receiver 421 has a function of receiving an acquisition request for a layer 3 address. For example, the receiver 421 receives DHCPDISCOVER. The received acquisition request is stored to a storage area of the RAM, the magnetic disk, the optical disk, etc. of the ES 2.

The extractor 422 has a function of extracting a first layer 2 address from the storage area 420 and a second layer 2 address (the transmission source of an acquisition request) from a first response, when the first response corresponding to an acquisition request is to be transmitted.

For example, broadcast DHCPOFFER is assumed to be transmitted as a first response corresponding to DHCPDISCOVER (an acquisition request). In this case, the extractor 422 extracts from a DHCP_BtoU table 401_ES2, the MAC address of the VM 3 in the DHCP server, and from the DHCPOFFER to be transmitted, the MAC address of the VM 1 (the transmission source of DHCPDISCOVER).

Broadcast DHCPACK is assumed to be transmitted as a first response corresponding to DHCPREQUEST (an acquisition request). In this case, the extractor 422 extracts from the DHCP_BtoU table 401_ES2, the MAC address of the VM 3 in the DHCP server; and from the DHCPACK to be transmitted, extracts the MAC address of the VM 1 (the transmission source of DHCPDISCOVER). The extracted layer 2 address is stored to a storage area of, for example, the RAM, the magnetic disk, optical disk, etc. of the ES 2.

The generator 423 has a function of generating, based on a first response, a second response whose destination is a first layer 2 address and a third response whose destination is a second layer 2 address. For example, the generator 423 generates from a broadcast DHCPOFFER, a unicast DHCPOFFER that is to another DPHC server and whose destination is the VM 3, and a unicast DHCPOFFER whose destination is the VM 1. The generator 423 generates from a broadcast DHCPACK, a unicast DHCPACK whose destination is to another DPHC server that is the VM 3, and a unicast DHCPACK whose destination is the VM 1. The generated response is stored to a storage area of, for example, the RAM, the magnetic disk, and the optical disk of the ES 2.

The transmitter 424 has a function of transmitting second and third responses. For example, the transmitter 424 transmits a second response to the VM 3 and transmits a third response to the VM 1.

Figure 5:
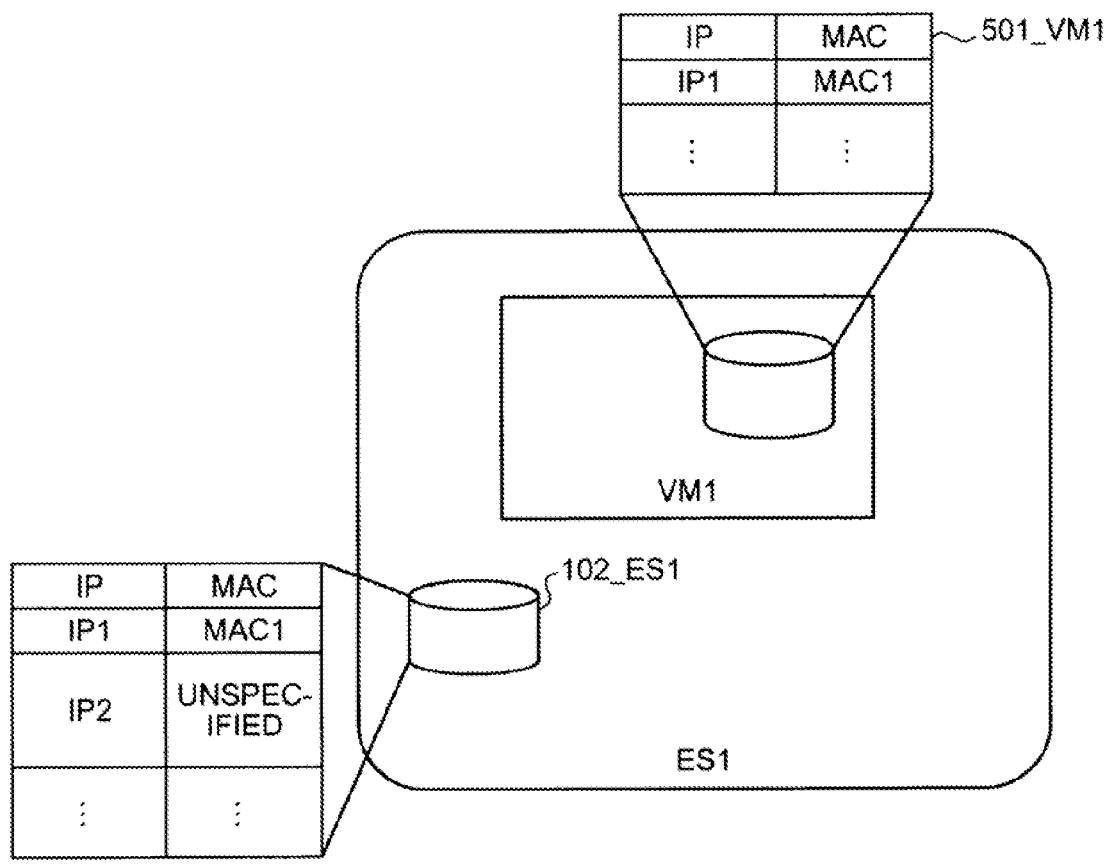
FIG. 5 is a diagram depicting an example of an ARP cache table and an ARP_BtoU table.

FIG. 5 is a diagram depicting an example of an ARP cache table and an ARP_BtoU table. The VM 1 that issues ARP has an ARP cache table 501_VM1 indicating mapping information of the protocol address and the hardware address obtained by ARP. The protocol address is a logic address used by a network layer protocol, e.g., an IP address. The hardware address is a physical address of the data link layer, e.g., a MAC address. In the present embodiment, the protocol address is assumed to be an IP address and the hardware address is assumed to be a MAC address.

An ARP cache table 501 has 2 fields, an IP field and a MAC field. The IP field indicates an IP address. The MAC field indicates the MAC address correlated with the IP address. The ARP_BtoU table 102 has the same fields as the ARP cache table 501 and description thereof will be omitted. The ARP_BtoU table 102 may further have a field indicating an LNID.

For example, the ARP cache table 501_VM1 depicted in FIG. 5 correlates and stores "IP1" and "MAC1". Further, the ARP_BtoU table 102 correlates and stores "IP1" and "MAC1", and "an IP2" and "unspecified". "Unspecified" is an identifier registered in the MAC field when an ARP request has been transmitted.

The ARP cache table 501_VM1 has an aging_time that is an effective period for storing records. When a record exceeds the aging_time, the record is deleted.

Using the ARP_BtoU table 102, the ES 1 suppresses ARP broadcast communication. With reference to FIGS. 6 to 9, operation when an ARP request and an ARP reply are received will be described. With reference to FIGS. 10 to 14, for example, operation when an IP address is replaced by an IP address being regranted consequent to a DHCP server lease period expiring will be described. With reference to FIG. 10 and FIGS. 15 to 18, operation when an new IP address is added to 1 MAC address by IP aliasing of allocating 2 or more addresses to 1 interface will be described.

Figure 23:
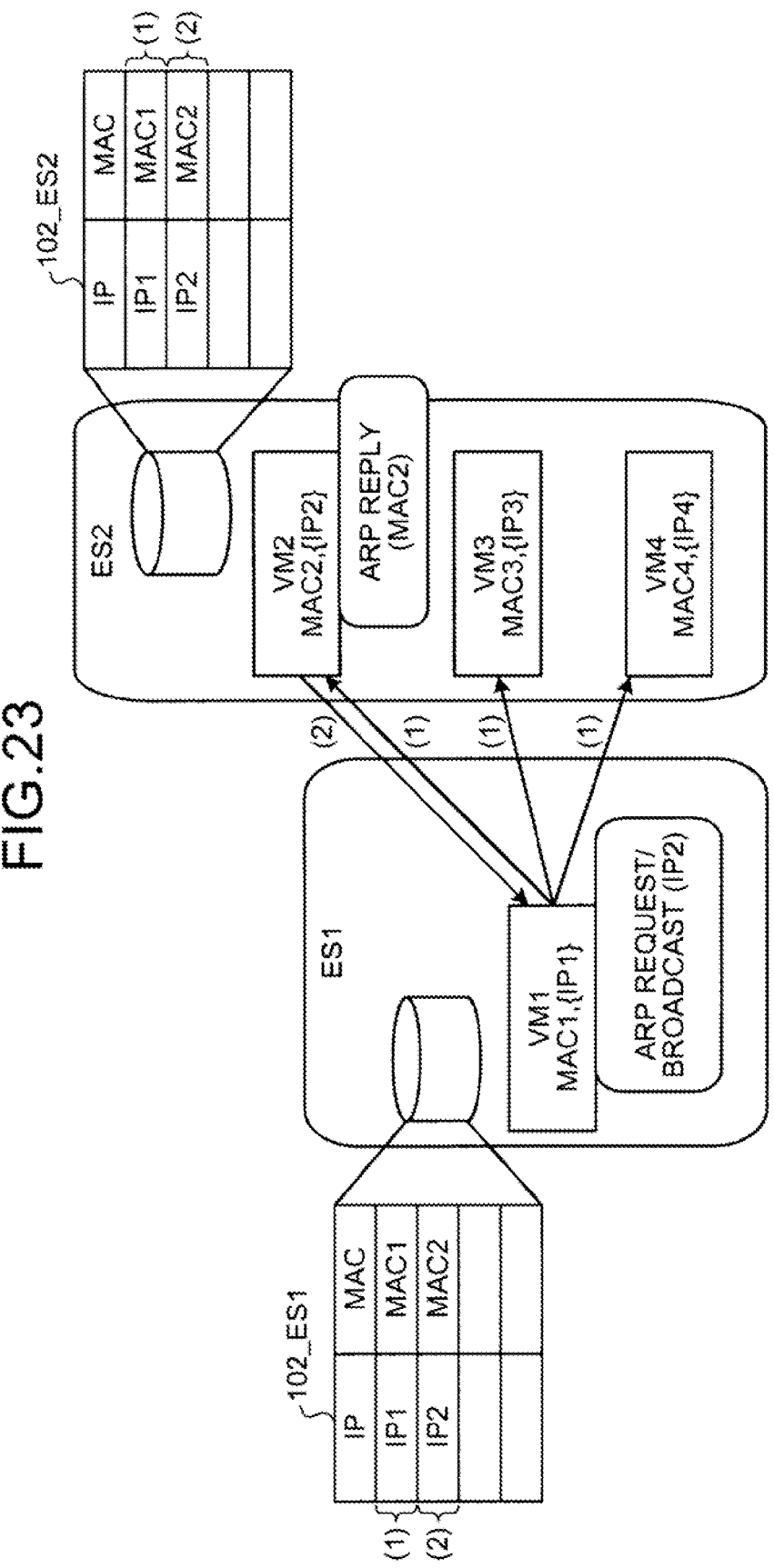
FIG. 23 is a first diagram depicting an example of ARP_BtoU table use.
Figure 24:
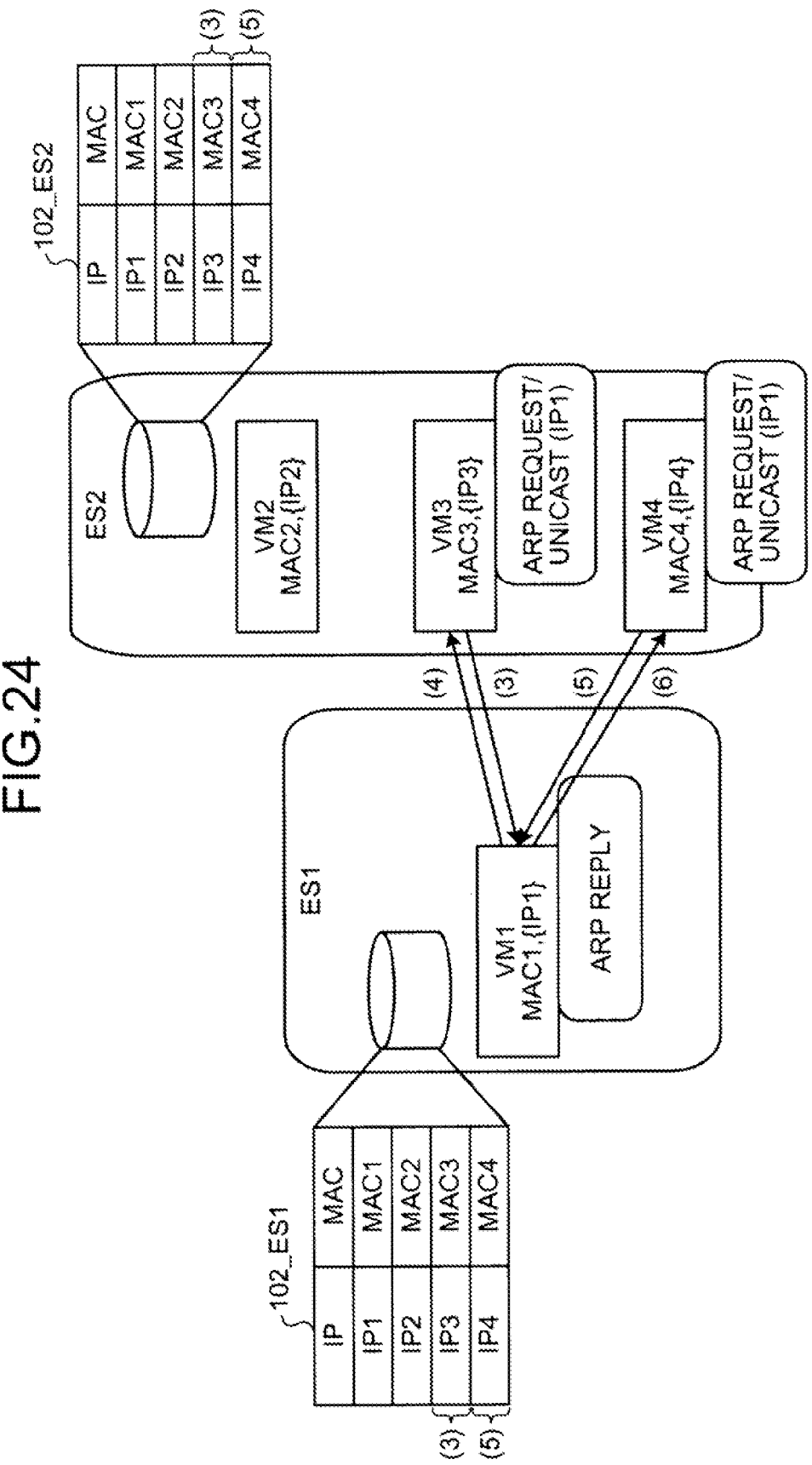
FIG. 24 is a second diagram depicting an example of ARP_BtoU table use.

With reference to FIGS. 19 to 22, operation when the MAC address corresponding an IP address is updated consequent to IP address allocation being updated will be described. With reference to FIG. 23 and FIG. 24, a state for the most efficient registration to a BtoU table will be described.

Figure 6:
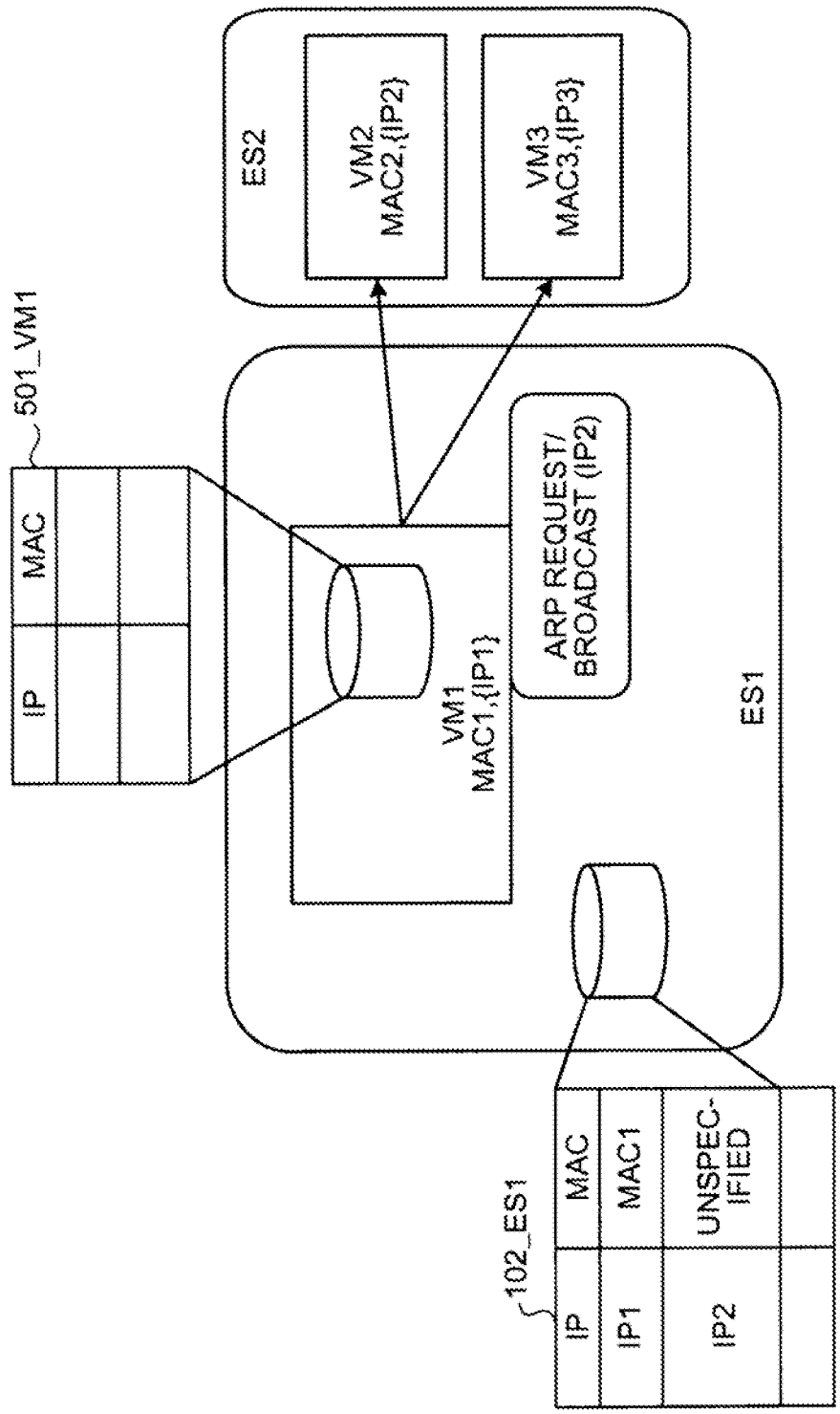
FIG. 6 is a diagram depicting a state when an ARP request is received before MAC address resolution.

FIG. 6 is a diagram depicting a state when an ARP request is received before MAC address resolution. In the communication system 100 depicted in FIG. 6, the VM 1 on the ES 1 is allocated MAC1 as a MAC address and IP1 as an IP address. The VM 2 on the ES 2 is allocated a MAC2 as a MAC address and IP2 as an IP address. The VM 3 on the ES 2 is allocated a MAC3 as MAC address and an IP3 as an IP address. Nothing is registered in the ARP cache table 501_VM1.

In this state, the VM 1 broadcasts an ARP request inquiring about the MAC address that corresponds to IP2. The ES 1 having received the ARP request, adds to the ARP_BtoU table 102_ES1, a record for "IP1" and "MAC1" from the transmission source protocol address and the transmission source hardware address of the ARP request. The ES 1 further adds a record for "IP2" and "unspecified" from the destination protocol address and the destination hardware address of the ARP request. The ES 1 transmits an ARP request to the VM 2 and the VM 3.

Figure 7:
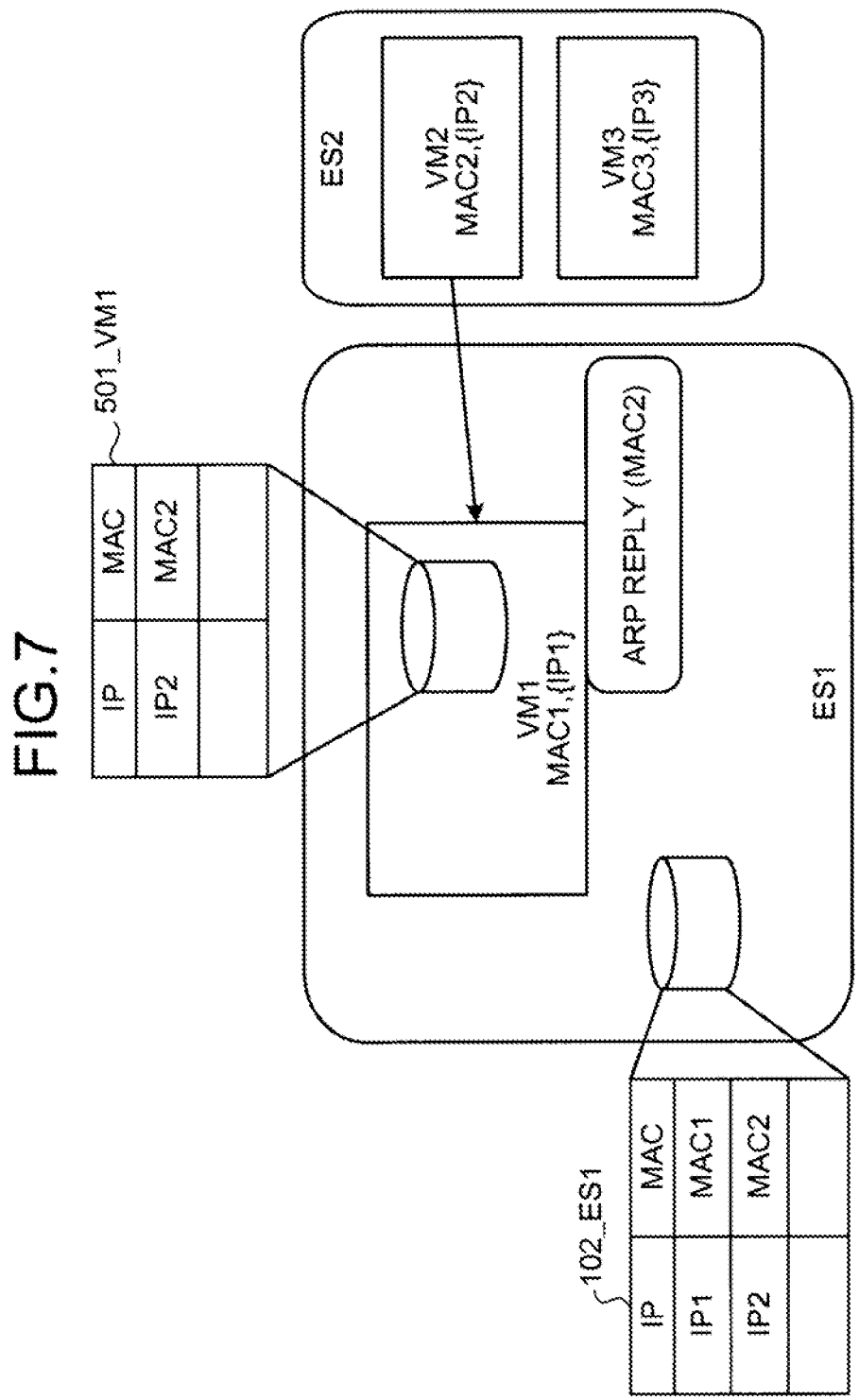
FIG. 7 is a diagram depicting a state when an ARP reply is received before MAC address resolution.

FIG. 7 is a diagram depicting a state when an ARP reply is received before MAC address resolution. In the communication system 100 depicted in FIG. 7, in response to the ARP request transmitted in FIG. 6, the VM 2 has transmitted an ARP reply in which MAC2 has been set.

The ES 1 having received the ARP reply, updates the MAC field of the ARP_BtoU table 102_ES1 record for "IP2" to "MAC2", which is from the transmission source hardware address of the ARP reply. The ES 1 further transmits an ARP reply to the VM 1. The VM 1 adds to the ARP cache table 501_VM1, a record for "IP2" and "MAC2", which are from the received ARP reply.

Figure 8:
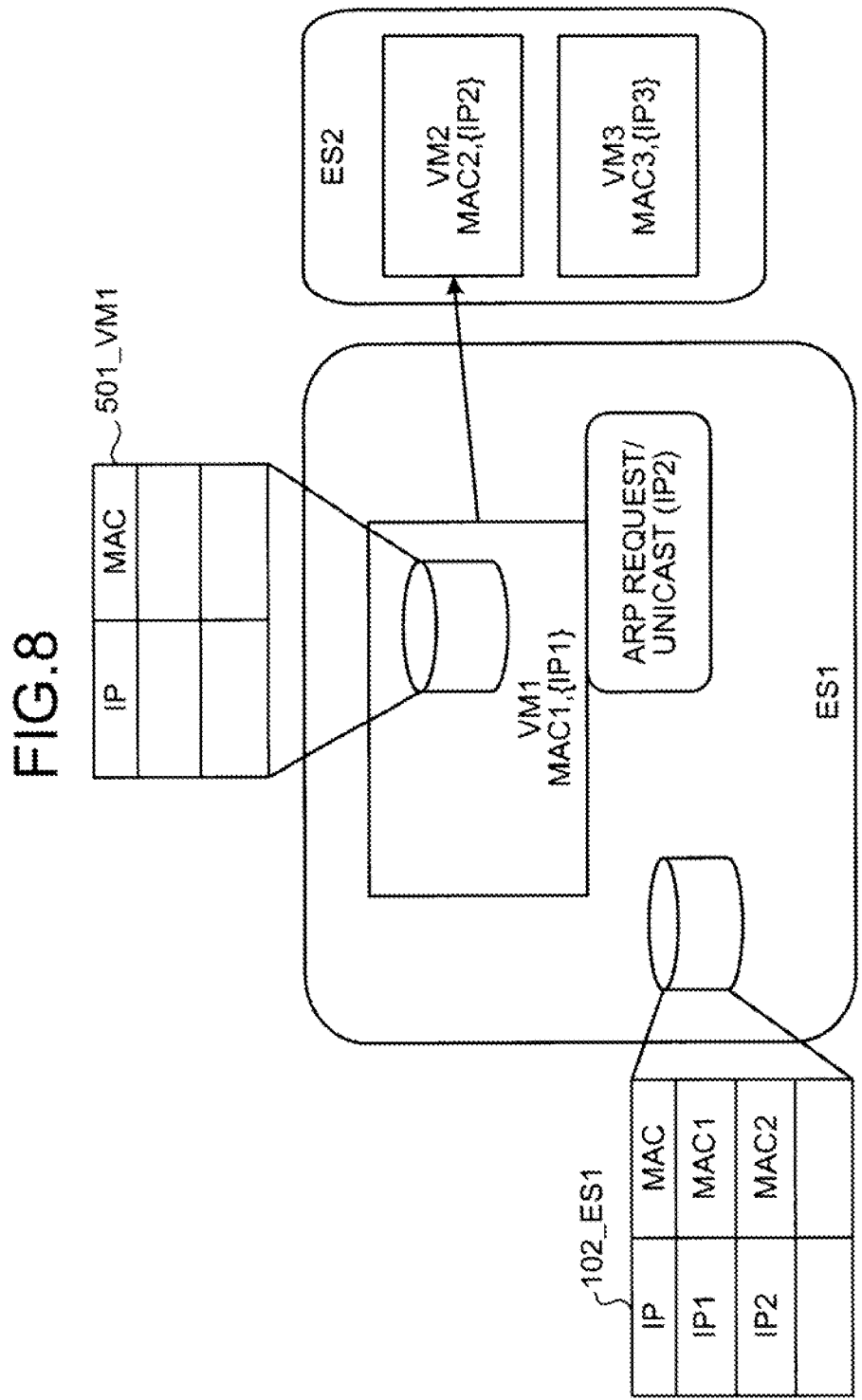
FIG. 8 is a diagram depicting a state when an ARP request is received after MAC address resolution.

FIG. 8 is a diagram depicting a state when an ARP request is received after MAC address resolution. In the communication system 100 depicted in FIG. 8, the aging time from the ARP reply received in FIG. 7 has elapsed and the record for "IP2" and "MAC2" has been deleted from the ARP cache table 501_VM1.

In this state, the VM 1 broadcasts an ARP request inquiring about the MAC address that corresponds to IP2. The ES 1 having received the ARP request, converts the communication scheme from broadcast to unicast to MAC2 and transmits the ARP request to the VM 2, since MAC2 corresponding to IP2 is registered in the ARP_BtoU table 102_ES1.

Figure 9:
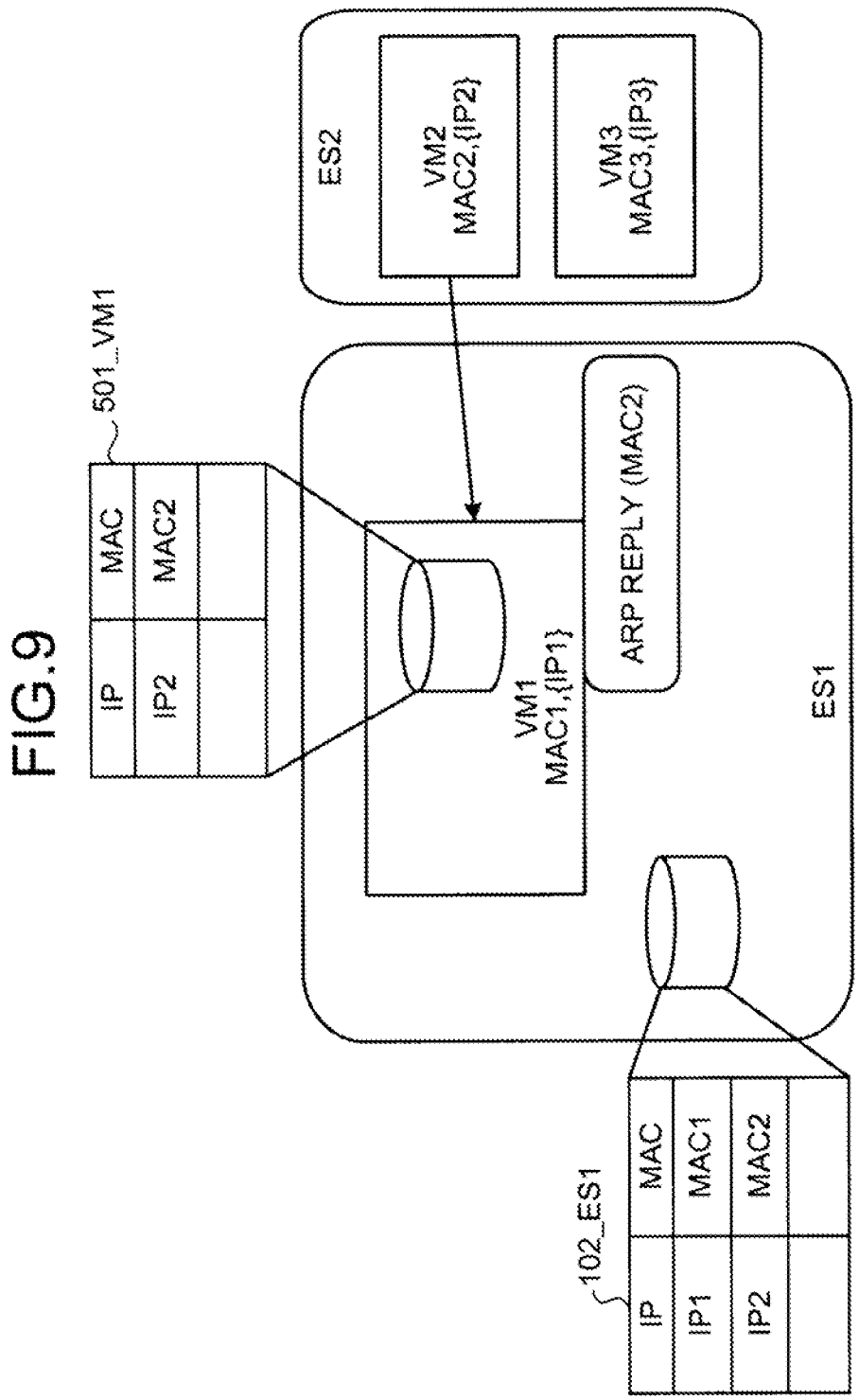
FIG. 9 is a diagram depicting a state where an ARP reply is received after MAC address resolution.

FIG. 9 is a diagram depicting a state where an ARP reply is received after MAC address resolution. In the communication system 100 depicted in FIG. 10, in response to the ARP request transmitted in FIG. 8, the VM 2 has transmitted an ARP reply in which MAC2 has been set.

The ES 1 having received the ARP reply, transmits the ARP reply to the VM 1 without newly performing registration since MAC1 corresponding to IP1 and MAC2 corresponding to IP2 have already been registered in the ARP_BtoU table 102_ES1. The VM 1 adds to the ARP cache table 501_VM1, a record for "IP2" and "MAC2", which are from the received ARP reply.

Figure 10:
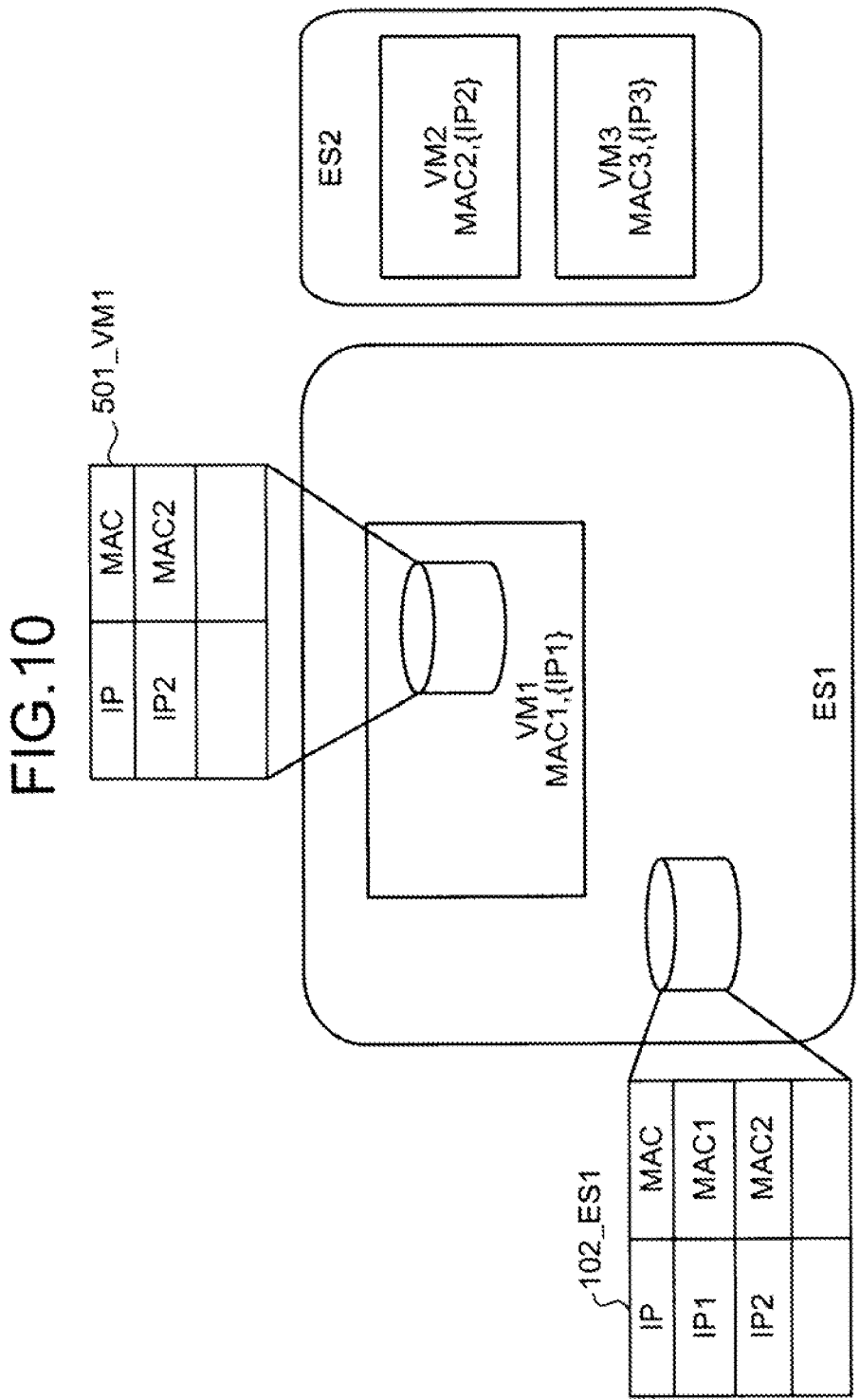
FIG. 10 is a diagram depicting an initial state of operation when an IP address is replaced and when an IP address is added.

FIG. 10 is a diagram depicting an initial state of operation when an IP address is replaced and when an IP address is added. In the communication system 100 depicted in FIG. 10, the IP addresses and the MAC addresses allocated to the VM 1, the VM 2, and the VM 3 are identical to those depicted in FIGS. 6 to 9. The ARP_BtoU table 102_ES1 has a record for "IP1" and "MAC1" and a record for "IP2" and "MAC2". The ARP cache table 501_VM1 has a record for "IP2" and "MAC2". From this state, with reference to FIGS. 11 to 14, operation when an IP address is replaced will be described and with reference to FIGS. 15 to 18, operation when an IP address is added will be described.

Figure 11:
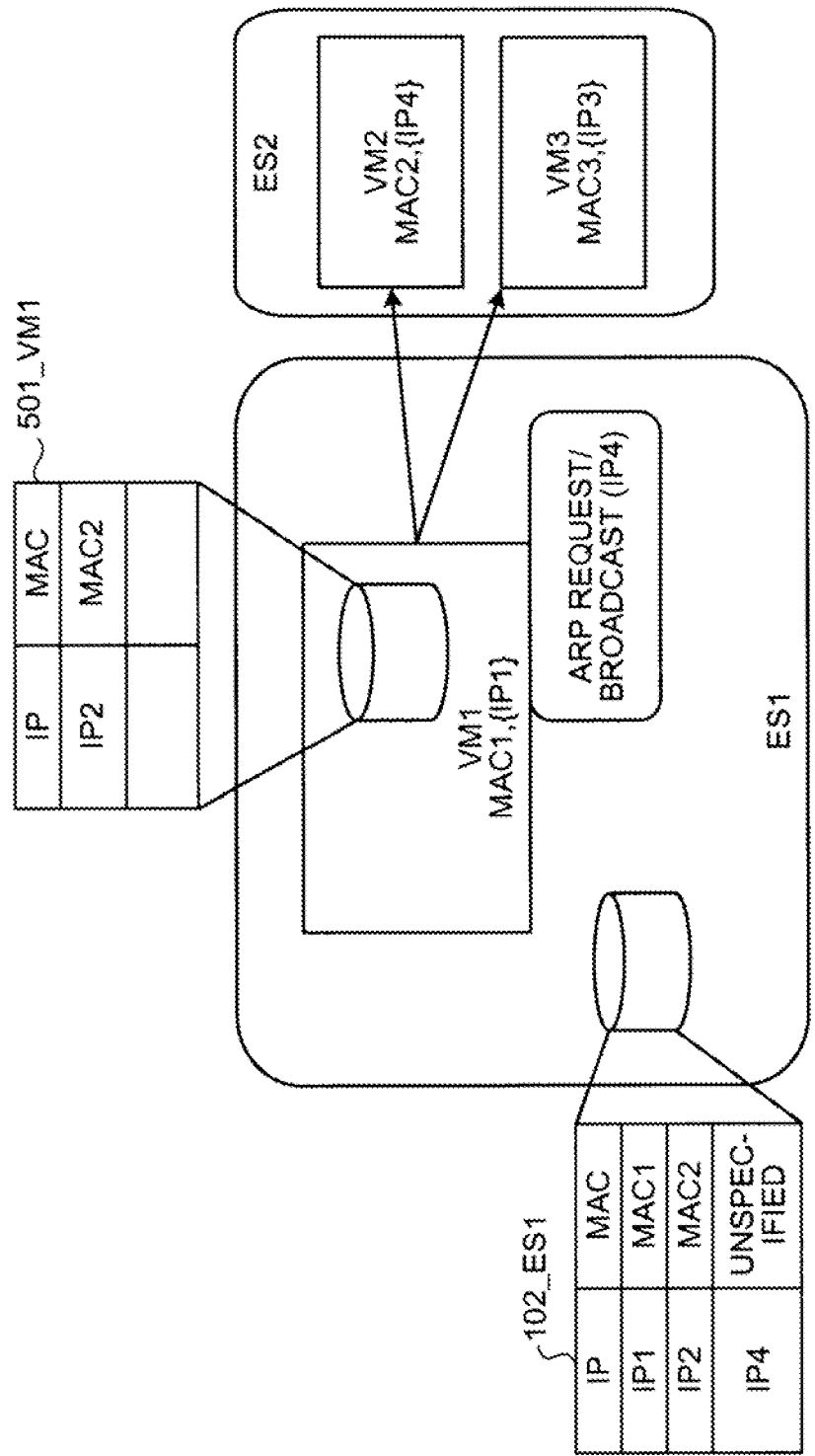
FIG. 11 is a first diagram depicting operation during IP address replacement.

FIG. 11 is a first diagram depicting operation during IP address replacement. In the communication system 100 depicted in FIG. 11, the IP address (IP2) allocated to the VM 2 has been replaced with IP4, from the state depicted in FIG. 10.

In this state, the VM 1 broadcasts an ARP request inquiring about the MAC address that corresponds to IP4. The ES 1 having received the ARP request, transmits the ARP request to the VM 2 and the VM 3 by broadcast without changing the communication scheme of the ARP request since a MAC address corresponding to IP4 has not been registered in the ARP_BtoU table 102_ES1. The ES 1 further adds to the ARP_BtoU table 102_ES1, a record for "IP4" and "unspecified".

Figure 12:
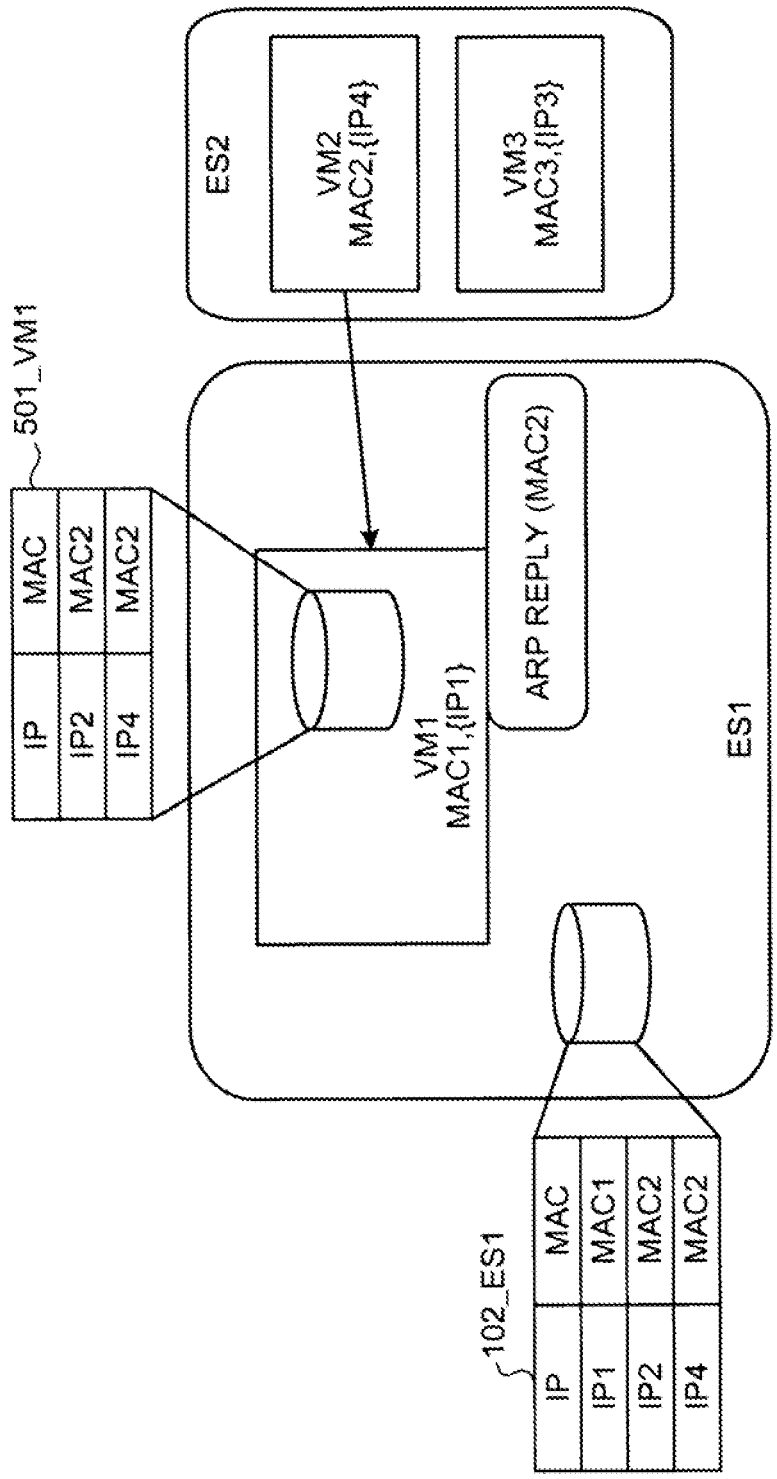
FIG. 12 is a second diagram depicting operation during IP address replacement.

FIG. 12 is a second diagram depicting operation during IP address replacement. In the communication system 100 depicted in FIG. 12, in response to the ARP request transmitted in FIG. 8, the VM 2 has transmitted an ARP reply in which MAC2 has been set.

The ES 1 having received the ARP reply, updates in the ARP_BtoU table 102_ES1, the MAC field of the record for "IP4" to "MAC2", which is from the transmission source hardware address of the ARP reply. The ES 1 further transmits the ARP reply to the VM 1. The VM 1 adds to the ARP cache table 501_VM1, a record for "IP4" and "MAC2", which are from the received ARP reply.

Figure 13:
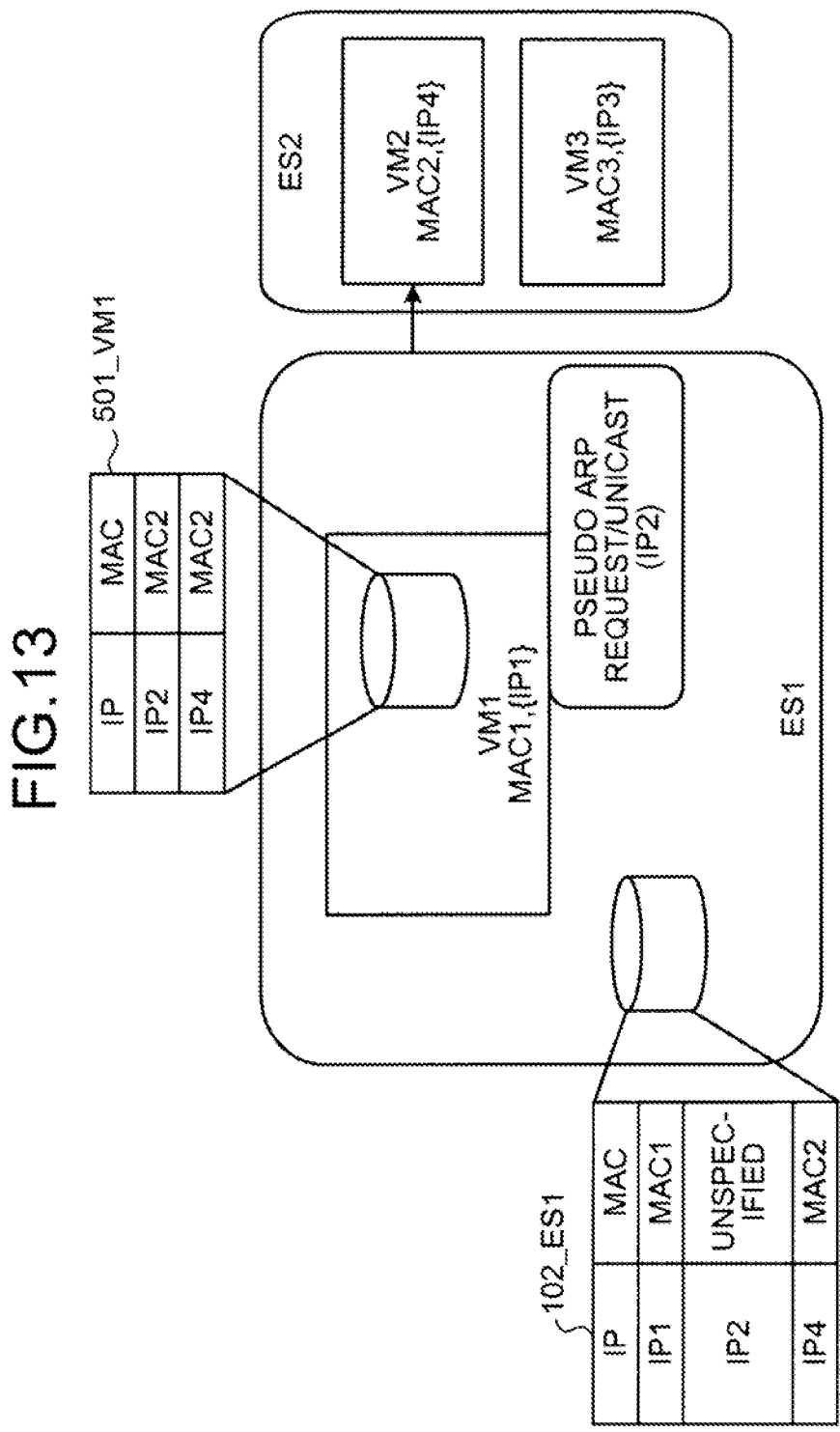
FIG. 13 is a third diagram depicting operation during IP address replacement.

FIG. 13 is a third diagram depicting operation during IP address replacement. FIG. 13 depicts the state of the communication system 100 after the ARP reply in FIG. 12 has been received. Since multiple IP addresses (IP2 and IP4) correspond to MAC2, the ES 1 transmits, by unicast, a pseudo ARP request to confirm whether the MAC address that corresponds to IP2 is actually MAC2. The pseudo ARP request has the same contents as a regular ARP request and rather than being the ARP request generated by the VM 1 is an ARP request generated by the ES 1.

Figure 14:
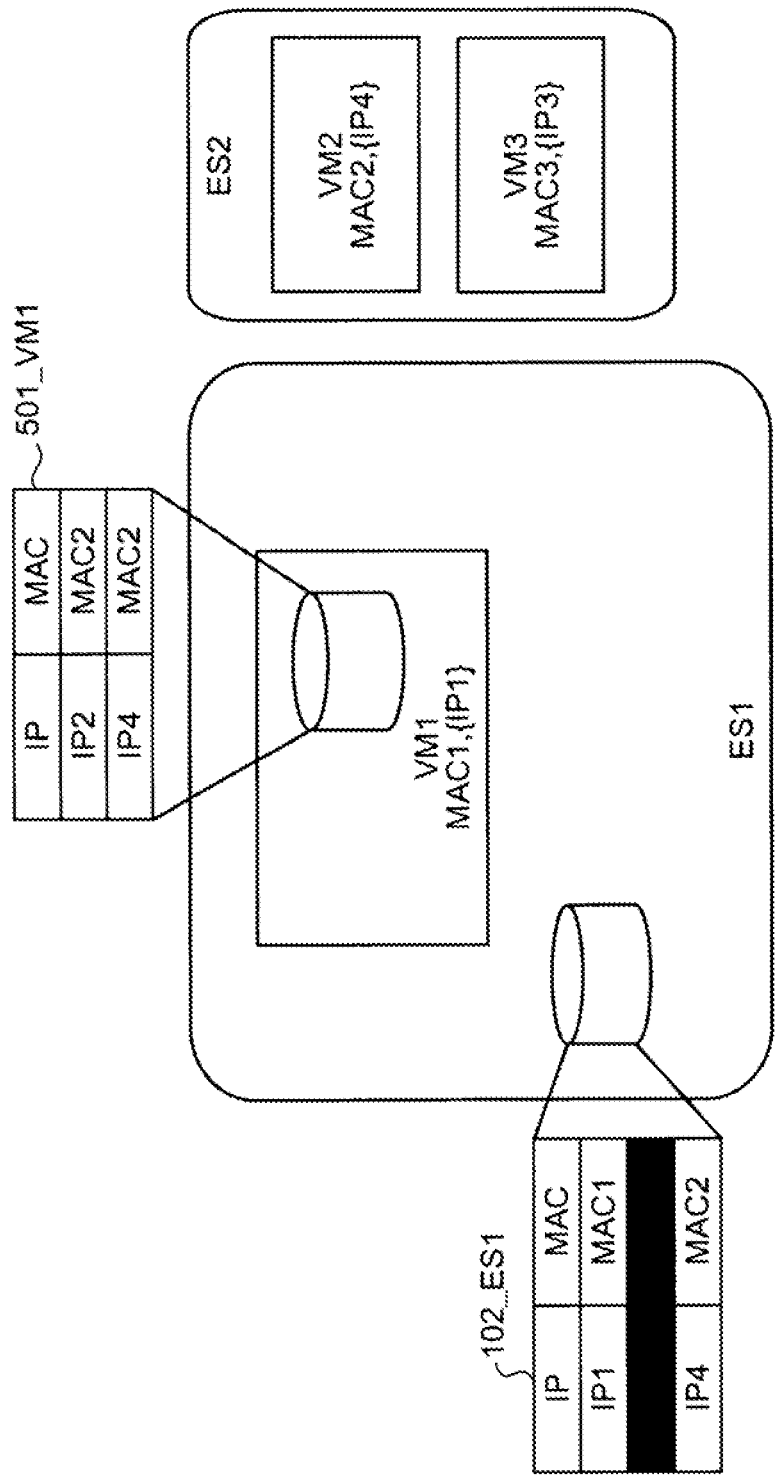
FIG. 14 is a fourth diagram depicting operation during IP address replacement.

FIG. 14 is a fourth diagram depicting operation during IP address replacement. In the communication system 100 depicted in FIG. 14, a given period has elapsed since the transmission of the pseudo ARP request to the VM 2 depicted in FIG. 13. Since IP2 is not allocated thereto, the VM 2 does not respond to the ARP request for IP2.

In this state, if the ES 1 does not receive an ARP reply in response to the ARP request despite a given period elapsing, the ES 1 deletes from the ARP_BtoU table 102_ES1, a record for "IP2" that is the destination protocol address of the ARP request. Thus, when the IP address has been replaced, the ES 1 can update the data of the ARP_BtoU table 102_ES1 according to the allocation state of IP addresses.

Figure 15:
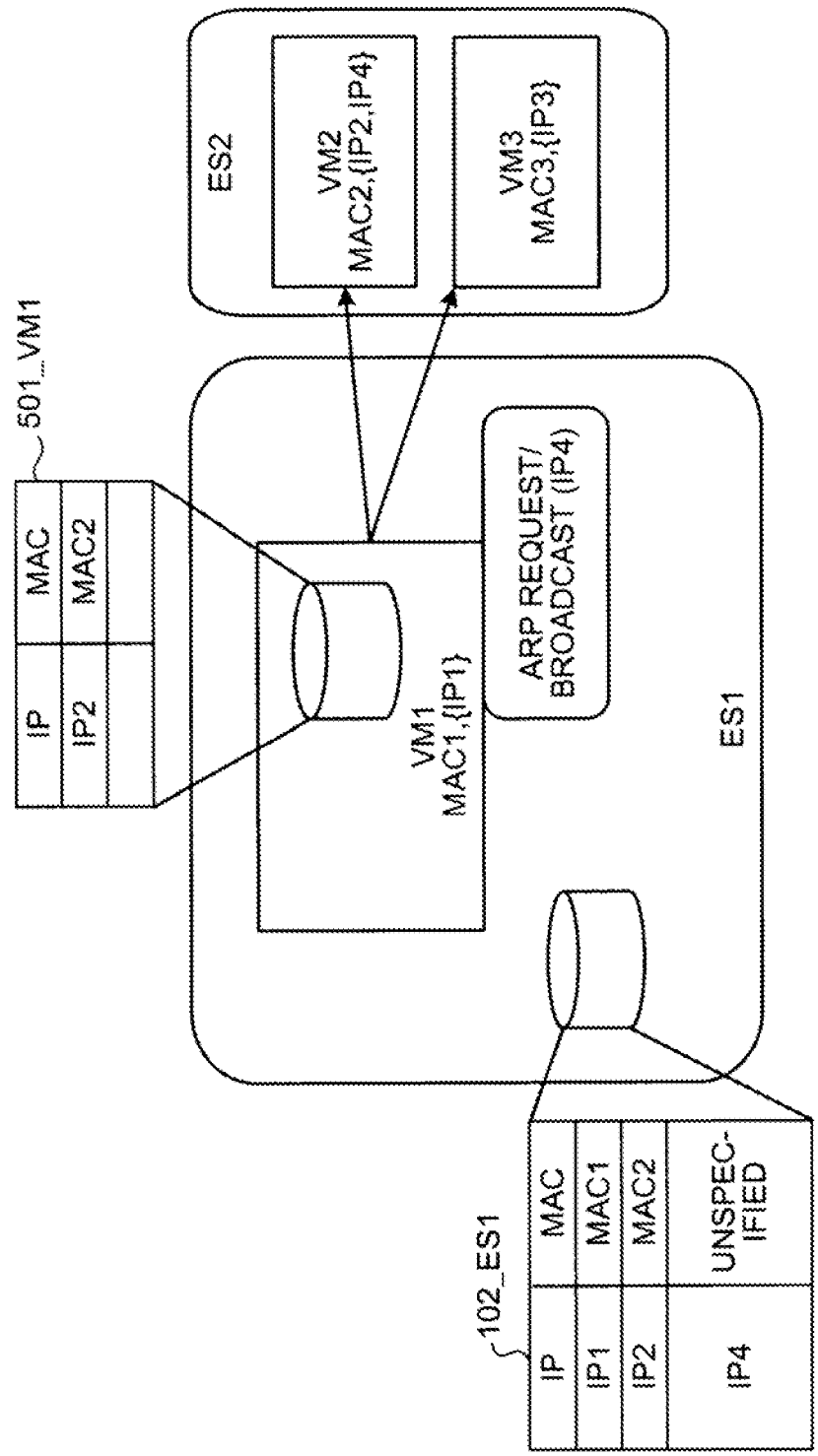
FIG. 15 is a first diagram depicting operation during IP address addition.

FIG. 15 is a first diagram depicting operation during IP address addition. In the communication system 100 depicted in FIG. 15, from the state depicted in FIG. 10, IP4 has been newly added to MAC2 of the VM 2.

In this state, the VM 1 broadcasts an ARP request inquiring about the MAC address that corresponds to IP4. The ES 1 having received the ARP request, transmits the ARP request to the VM 2 and the VM 3 by broadcast without changing the communication scheme of the ARP request since a MAC address for IP4 has not be registered in the ARP_BtoU table 102_ES1. The ES 1 further adds to the ARP_BtoU table 102_ES1, a record for "IP4" and "unspecified".

Figure 16:
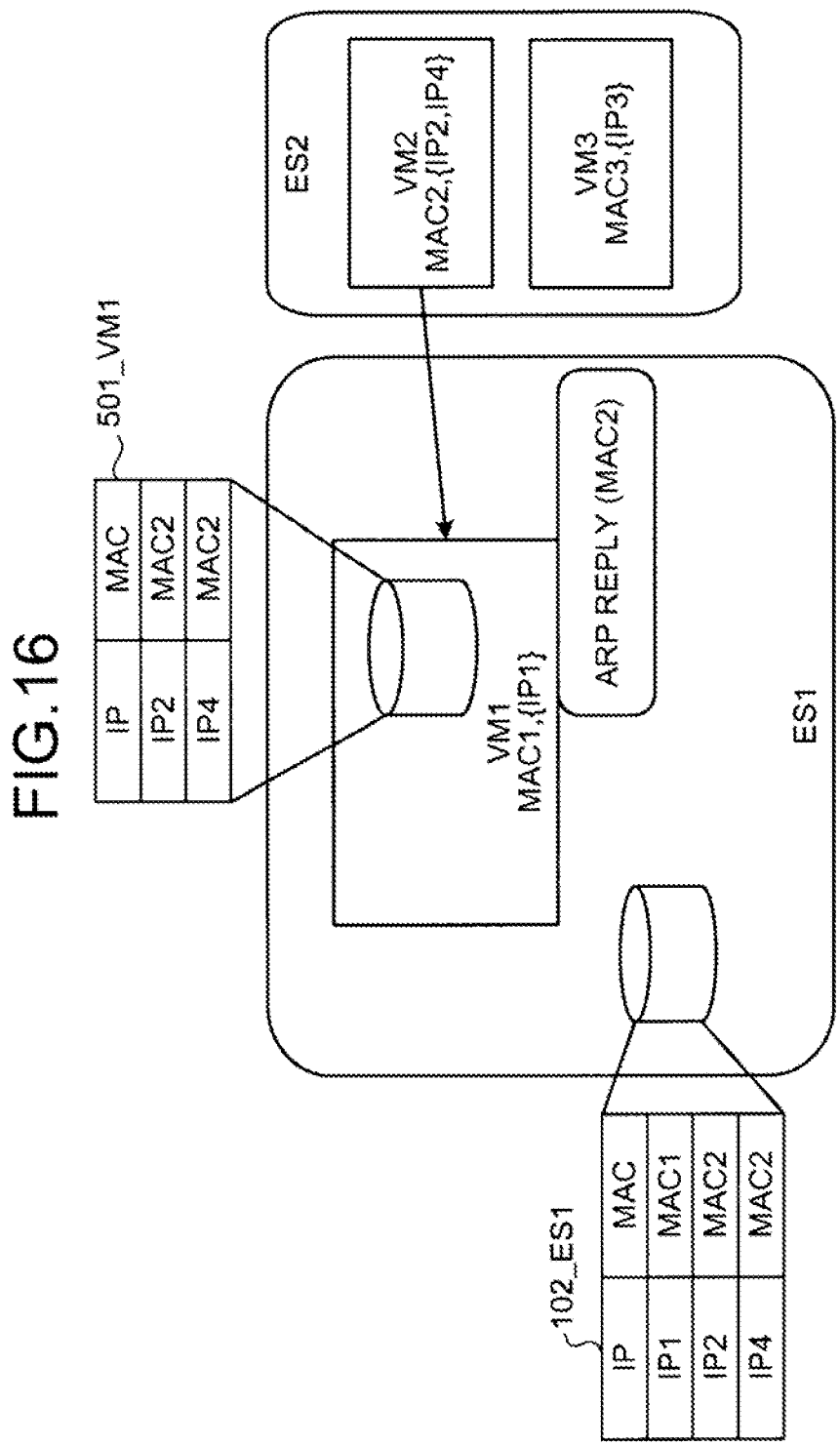
FIG. 16 is a second diagram depicting operation during IP address addition.

FIG. 16 is a second diagram depicting operation during IP address addition. In the communication system 100 depicted in FIG. 16, in response to the ARP request transmitted in FIG. 15, the VM 2 has transmitted an ARP reply in which MAC2 has been set.

The ES 1 having received the ARP reply, updates in the ARP_BtoU table 102_ES1, the MAC field of the record for "IP4" to "MAC2", which is from the transmission source hardware address of the ARP reply. The ES 1 further transmits the ARP reply to the VM 1. The VM 1 adds to the ARP cache table 501_VM1, a record for "IP4" and "MAC2", which are from the received ARP reply.

Figure 17:
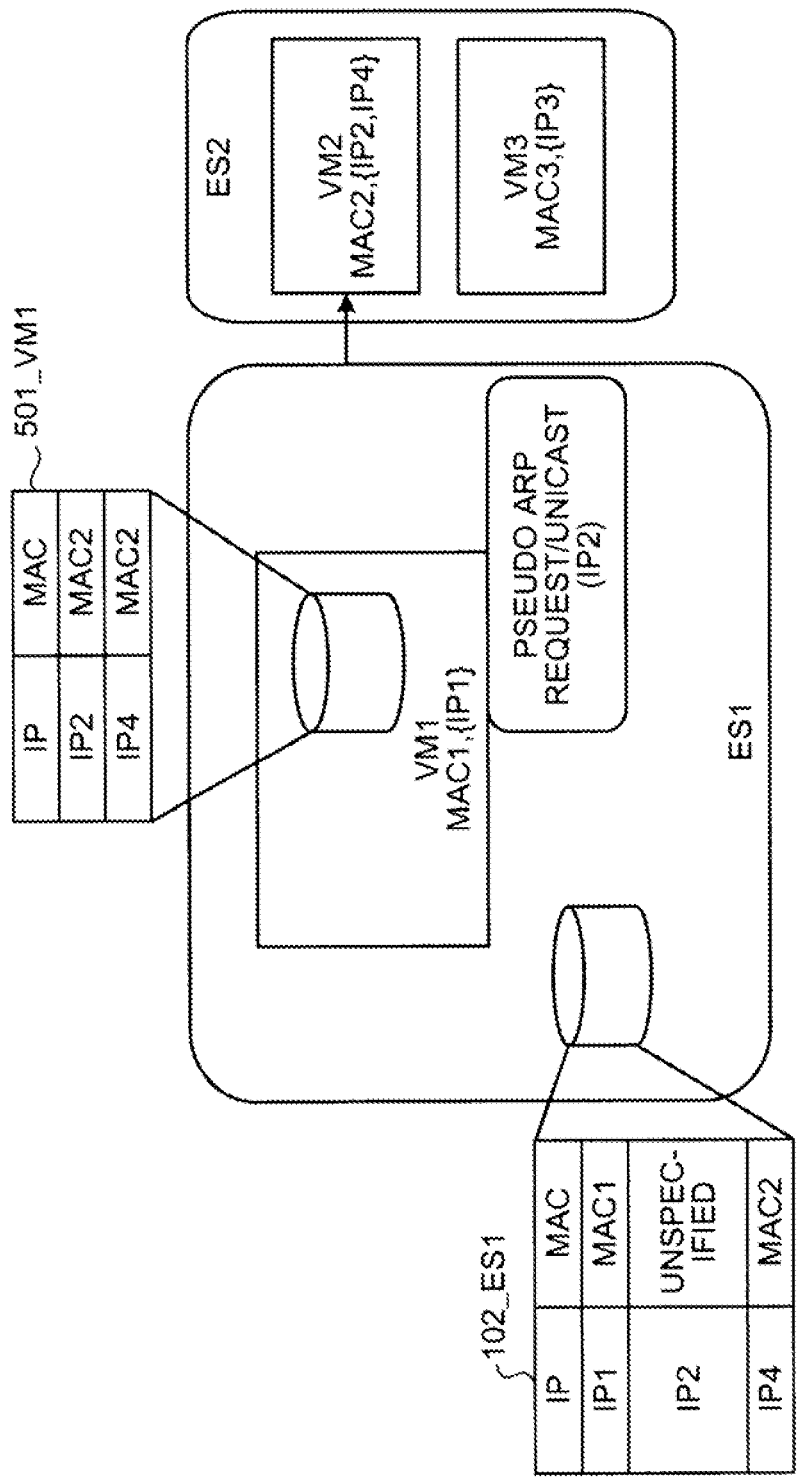
FIG. 17 is a third diagram depicting operation during IP address addition.

FIG. 17 is a third diagram depicting operation during IP address addition. FIG. 17 depicts a state of the communication system 100 after the ARP reply in FIG. 16 has been received. Since multiple IP addresses (IP2 and IP4) correspond to MAC2, the ES 1 transmits, by unicast, a pseudo ARP request to confirm whether the MAC address that corresponds to IP2 is actually MAC2.

Figure 18:
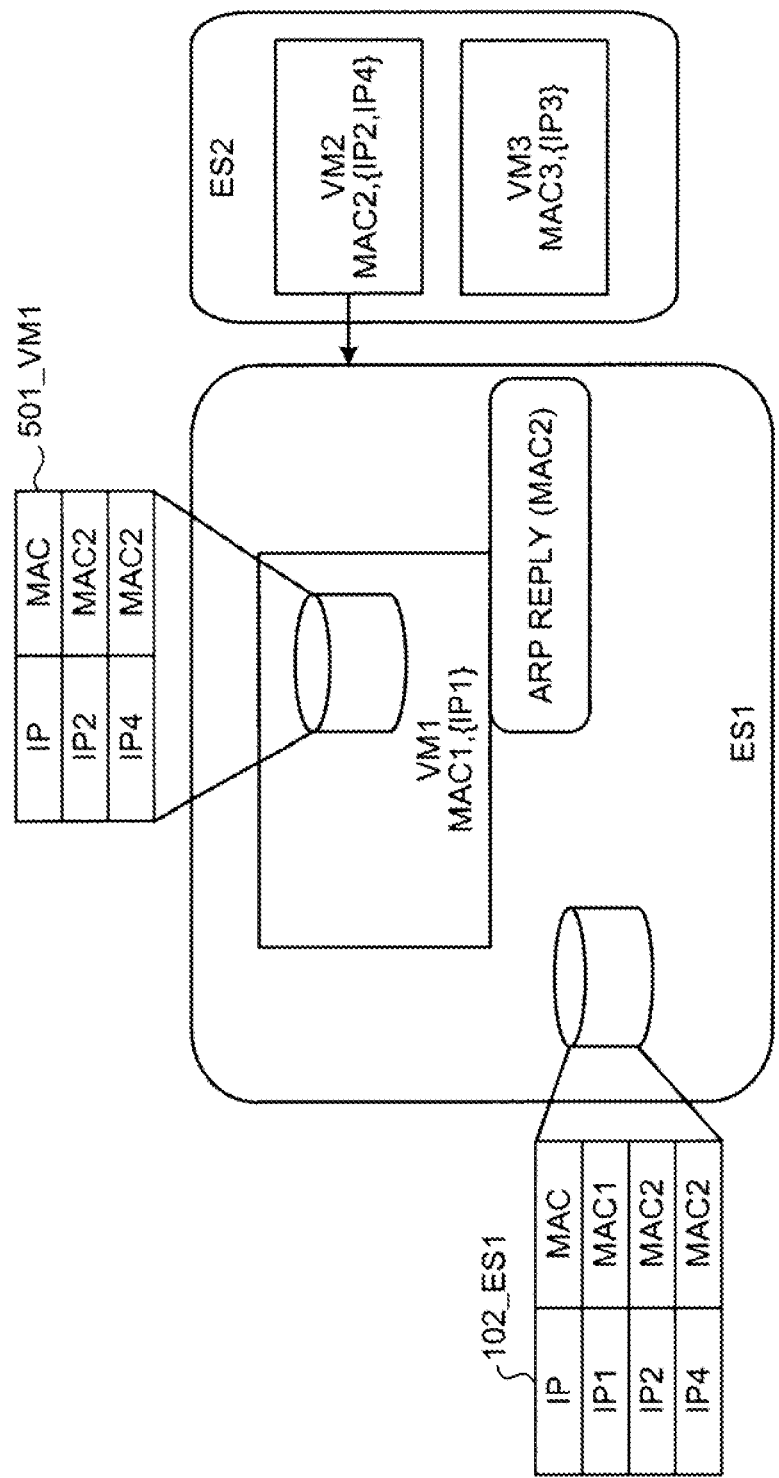
FIG. 18 is a fourth diagram depicting operation during IP address addition.

FIG. 18 is a fourth diagram depicting operation during IP address addition. In the communication system 100 depicted in FIG. 18, in response to the pseudo ARP request transmitted in FIG. 17, the VM 2 has transmitted an ARP reply in which MAC2 has been set.

The ES 1 having received the ARP reply, updates the MAC field of the ARP_BtoU table 102_ES1 record for "IP2" to "MAC2", which is from the transmission source hardware address of the ARP reply.

Figure 19:
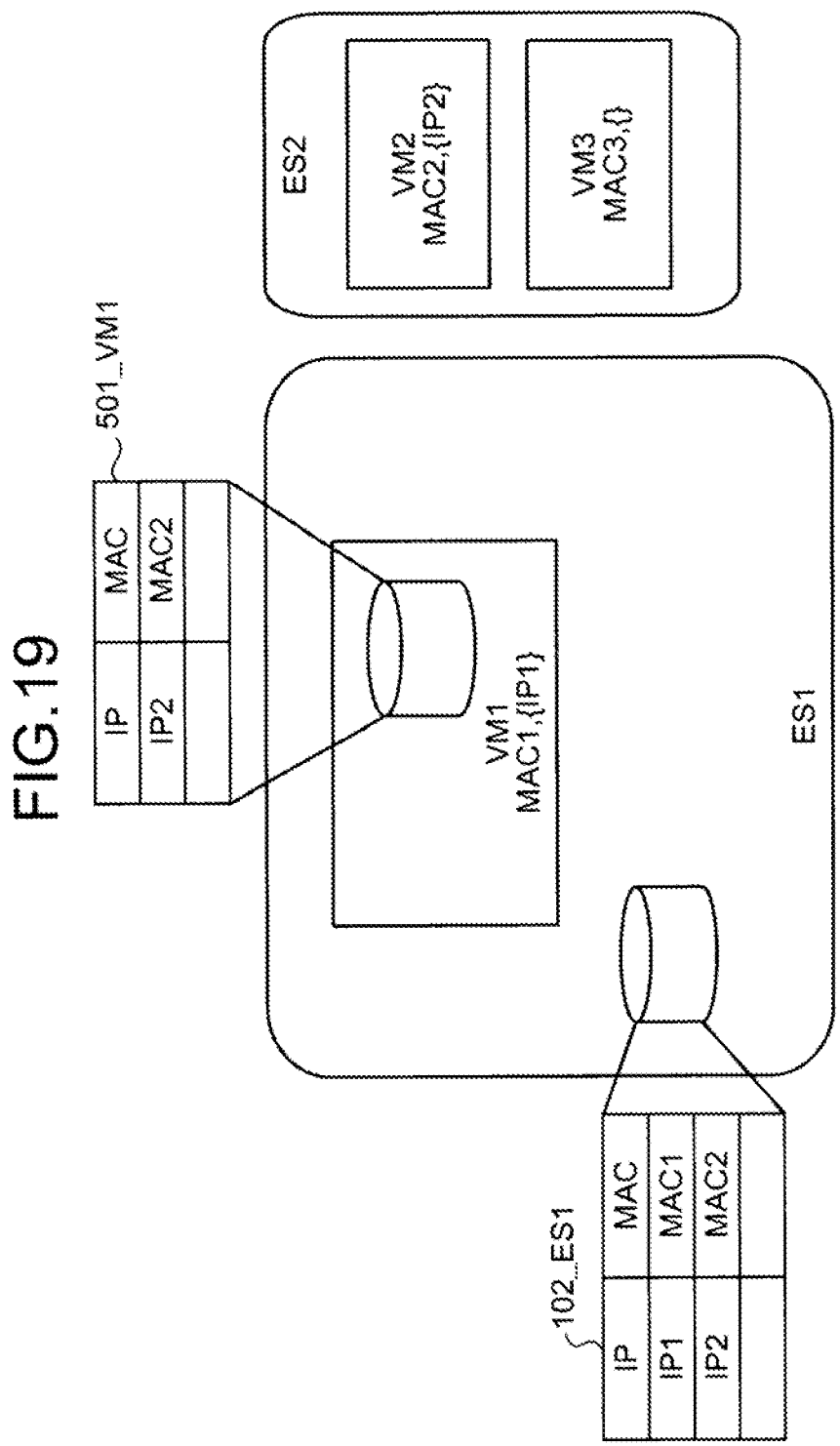
FIG. 19 is a first diagram depicting operation when the MAC address corresponding to an IP address is changed.

FIG. 19 is a first diagram depicting operation when the MAC address corresponding to an IP address is changed. With reference to FIG. 19, a case where in the communication system 100, reallocation of IP addresses occurs and the MAC address corresponding to an IP address changes will be described. In the communication system 100 depicted in FIG. 19, the VM 1 is allocated MAC1 as a MAC address and IP1 as an IP address. The VM 2 on the ES 2 is allocated MAC2 as a MAC address and IP2 as an IP address. The VM 3 on the ES 2 is allocated MAC3 as a MAC address and is not allocated an IP address.

The ARP_BtoU table 102_ES1 has a record for "IP1" and "MAC1" and a record for "IP2" and "MAC2". The ARP cache table 501_VM1 has a record for "IP2" and "MAC2".

Figure 20:
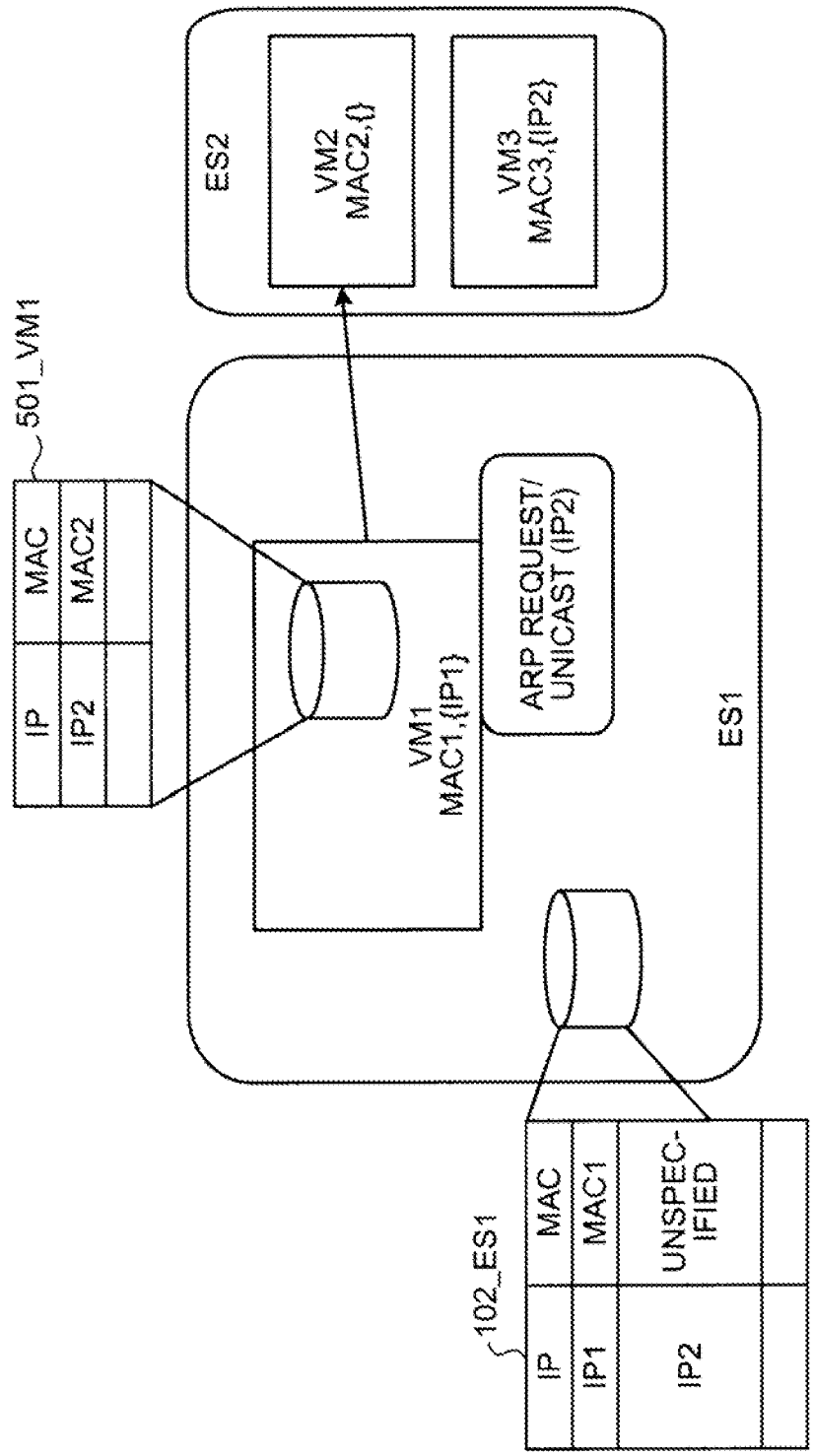
FIG. 20 is a second diagram depicting operation when the MAC address corresponding to an IP address is changed.

FIG. 20 is a second diagram depicting operation when the MAC address corresponding to an IP address is changed. FIG. 20 depicts a state of the communication system 100 where from the state depicted in FIG. 19, the allocation of IP2 to the VM 2 is released and IP2 is allocated to the VM 3.

In this state, the VM 1 broadcasts an ARP request inquiring about the MAC address that corresponds to IP2. The ES 1 having received the ARP request, changes the communication scheme from broadcast to unicast to MAC2 and transmits the ARP request to the VM 2 since MAC2 corresponding to IP2 is registered in the ARP_BtoU table 102_ES1. The ES 1 further sets in the ARP_BtoU table 102_ES1, "unspecified" for the MAC address corresponding to IP2.

Figure 21:
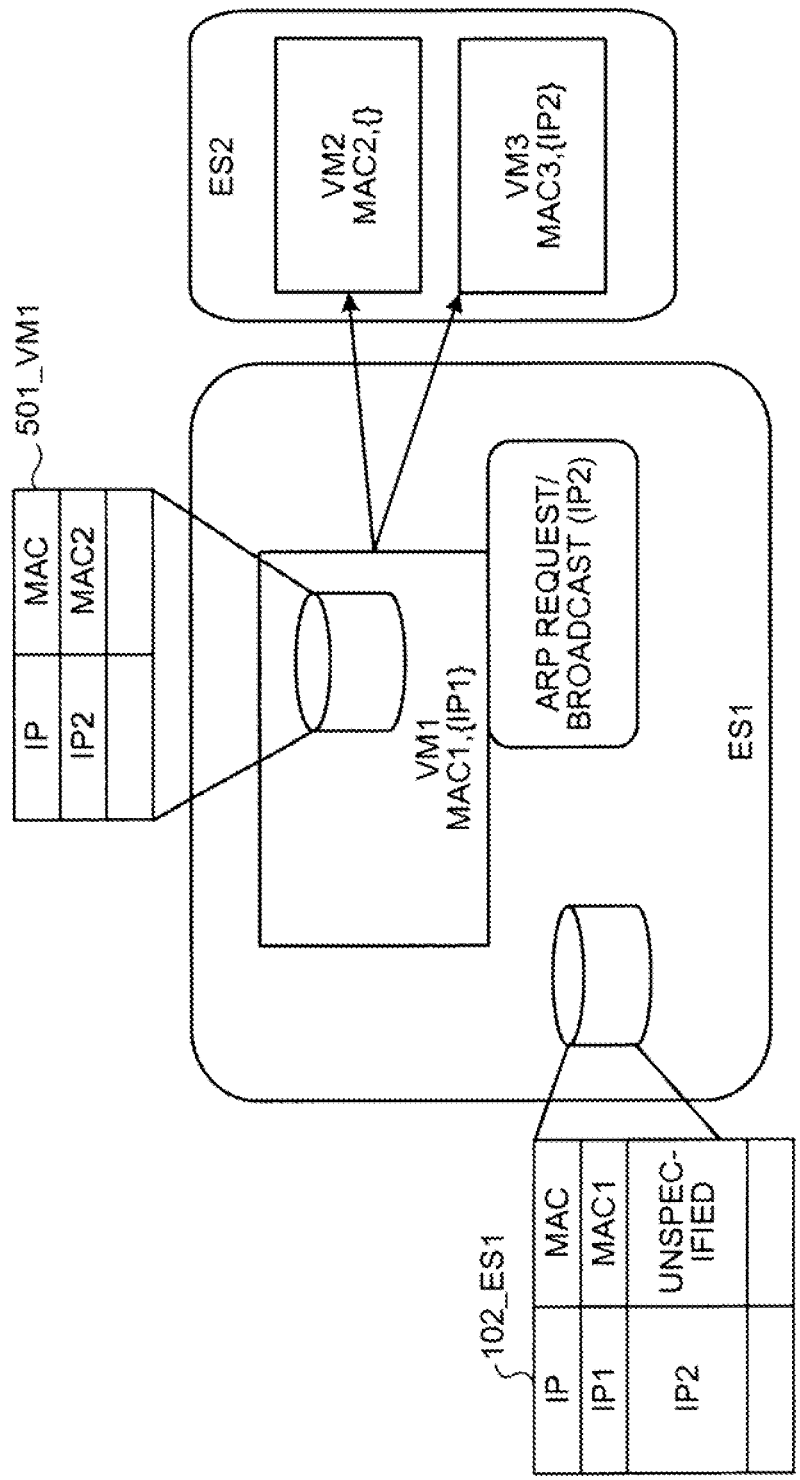
FIG. 21 is a third diagram depicting operation when the MAC address corresponding to an IP address is changed.

FIG. 21 is a third diagram depicting operation when the MAC address corresponding to an IP address is changed. FIG. 21 depicts a state of the communication system 100 where a given period has elapsed since the transmission of the ARP request to the VM 2. Since IP2 is not allocated thereto, the VM 2 does not respond to the ARP request for IP2.

In this state, if the ES 1 does not receive an ARP reply in response to the ARP request despite a given period elapsing, the ES 1 broadcasts an ARP request inquiring about the MAC address that corresponds to IP2.

Figure 22:
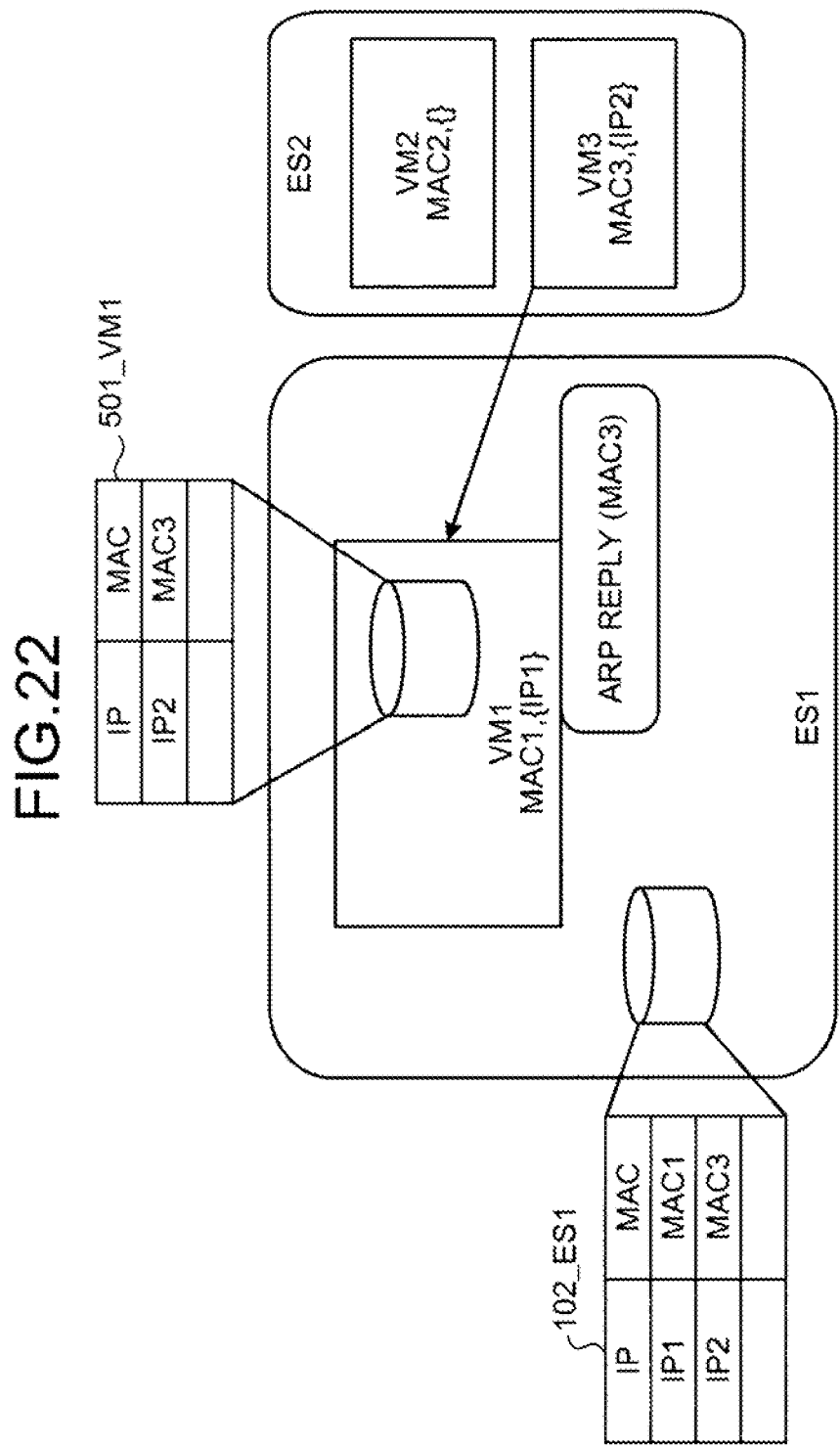
FIG. 22 is a fourth diagram depicting operation when the MAC address corresponding to an IP address is changed.

FIG. 22 is a fourth diagram depicting operation when the MAC address corresponding to an IP address is changed. In the communication system 100 depicted in FIG. 21, in response to the ARP request transmitted in FIG. 21, the VM 3 has transmitted an ARP reply in which MAC3 has been set.

The ES 1 having received the ARP reply, updates in the ARP_BtoU table 102_ES1, the MAC field of the record for "IP2" to "MAC3", which is from the transmission source hardware address of the ARP reply. The ES 1 further transmits the ARP reply to the VM 1. The VM 1 adds to the ARP cache table 501_VM1, a record for "IP2" and "MAC3", which are from the received ARP reply. Thus, even if the MAC address for an IP address has changed, the ES 1 can update the data of the ARP_BtoU table 102_ES1 according to the allocation state of the IP addresses.

FIG. 23 is a first diagram depicting an example of ARP_BtoU table use. FIG. 23 depicts as an example of ARP_BtoU table use, an example where an entry of a BtoU table in the same network can be acquired by a single ARP request. In FIG. 23 and FIG. 24, in addition to the VM 2 and the VM 3, the VM 4 is in the ES 2; MAC4 is allocated to the VM 4 as a MAC address; and is IP4 allocated as an IP address.

As process (1), the VM 1 broadcasts an ARP request inquiring about the MAC address that corresponds to IP2. The ES 1 having received the ARP request, transmits the ARP request as a broadcast to the VM 2, the VM 3, and the VM 4 without converting the communication scheme of the ARP request to unicast since a MAC address for IP2 has not been registered in the ARP_BtoU table 102_ES1. The ES 1 adds to the ARP_BtoU table 102_ES1, a record for "IP1" and "MAC1". The ES 2 having received the ARP request, adds to the ARP_BtoU table 102_ES2, a record for "IP1" and "MAC1".

As process (2), the VM 2 transmits an ARP reply in which MAC2 has been set. The ES 2 having received the ARP reply, adds to the ARP_BtoU table 102_ES2, a record for "IP2" and "MAC2". The ES 2 further transmits the ARP reply to the VM 1. The ES 1 adds to the ARP_BtoU table 102_ES1, a record for "IP2" and "MAC2", which are from the received ARP reply.

FIG. 24 is a second diagram depicting an example of ARP_BtoU table use. FIG. 24 depicts a state of the communication system 100 where the ARP request and the ARP reply in FIG. 23 have been transmitted.

In this state, at process (3), the VM 3 broadcasts an ARP request inquiring about the MAC address that corresponds to IP1. The ES 2 having received the ARP request, converts the communication scheme from broadcast to unicast to MAC1 and transmits the ARP request to the VM 1 since MAC1 is registered for IP1 in the ARP_BtoU table 102_ES2. The ES 2 adds to the ARP_BtoU table 102_ES2, a record for "IP3" and "MAC3", which are from the ARP request. The ES 1 having received the ARP request, adds to the ARP_BtoU table 102_ES1, a record for "IP3" and "MAC3". The ES 1 further transmits the ARP request to the VM 1. At process (4), the VM 1 transmits an ARP reply to the VM 3.

Similarly, at process (5), the VM 4 broadcasts an ARP request inquiring about the MAC address that corresponds to IP1. The ES 2 having received the ARP request, converts the communication scheme from broadcast to unicast to MAC1 and transmits the ARP request to the VM 1 since MAC1 has been registered for IP1 in the ARP_BtoU table 102_ES2. The ES 2 further adds to the ARP_BtoU table 102_ES2, a record for "IP4" and "MAC4", which are from the received ARP request. The ES 1 having received the ARP request, adds to the ARP_BtoU table 102_ES1, a record for "IP4" and "MAC4". The ES 1 further transmits the ARP request to the VM 1. At process (6), the VM 1 transmits an ARP reply to the VM 4.

Thus, as depicted in FIG. 23 and FIG. 24, by the 4 ARP frames at processes (1) to (3), and (5), information related to the VMs 1 to 4 is included in BtoU tables.

Figure 25:
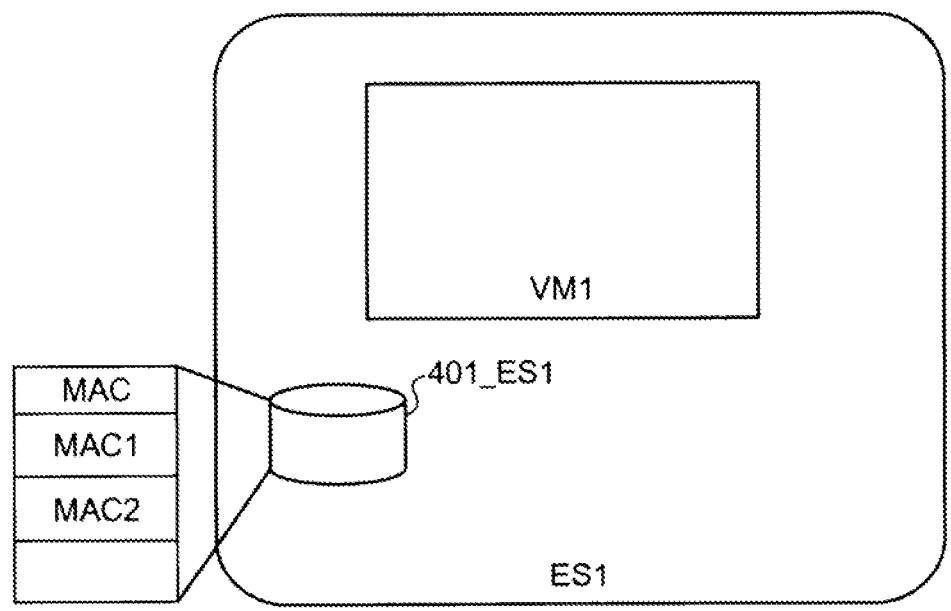
FIG. 25 is a diagram depicting an example of a DHCP_BtoU table.

FIG. 25 is a diagram depicting an example of the DHCP_BtoU table. The DHCP_BtoU table 401 indicates information related to the DHCP servers. The DHCP_BtoU table 401 depicted in FIG. 25 indicates DHCP MAC addresses as information related to the DHCP servers. The DHCP_BtoU table 401 may have a field indicating the LNIDs of the DHCP servers. For example, the ES 1 has the DHCP_BtoU table 401_ES1 and the DHCP_BtoU table 401_ES1 indicates "MAC1" and "MAC2" as DHCP server MAC addresses.

Figure 30:
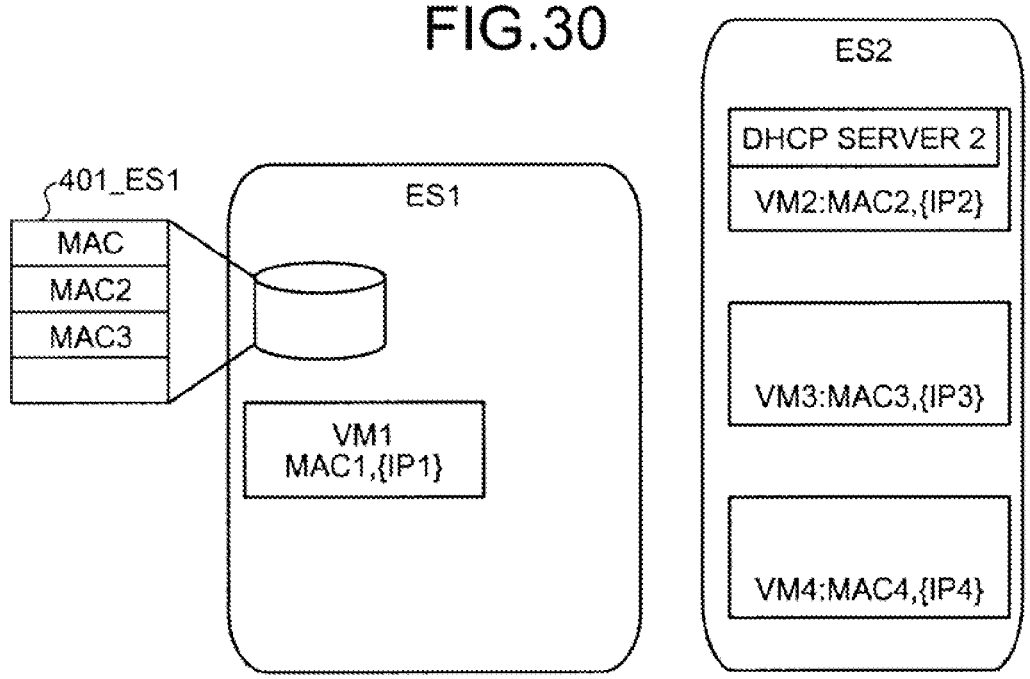
FIG. 30 is a first diagram depicting a state when DHCPDISCOVER is received during DHCP server suspension.
Figure 31:
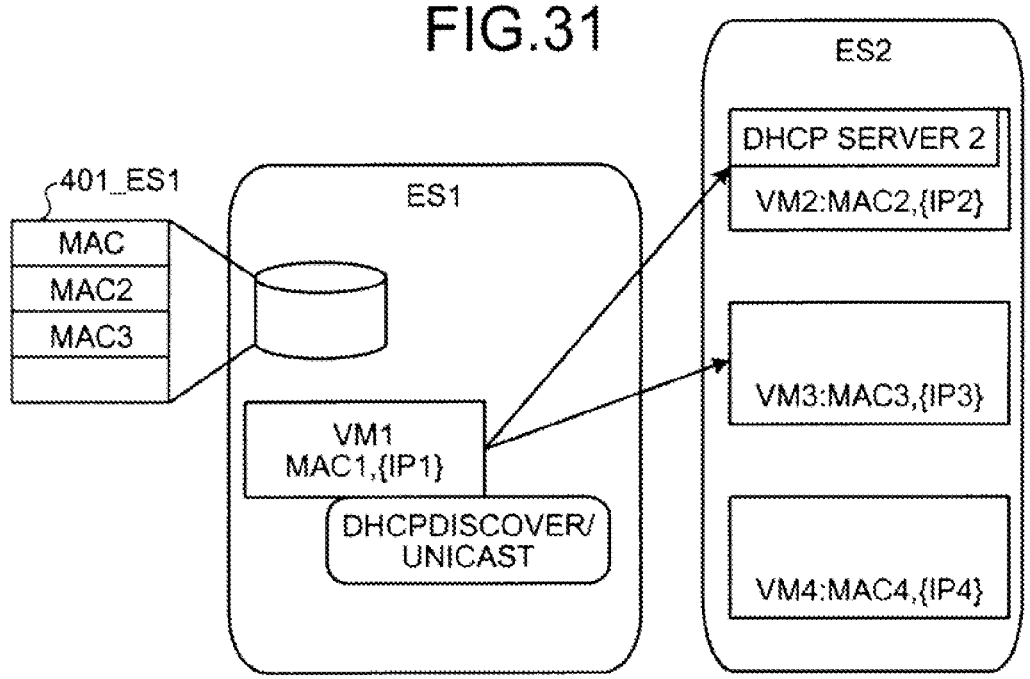
FIG. 31 is a second diagram depicting a state when DHCPDISCOVER is received during DHCP server suspension.
Figure 32:
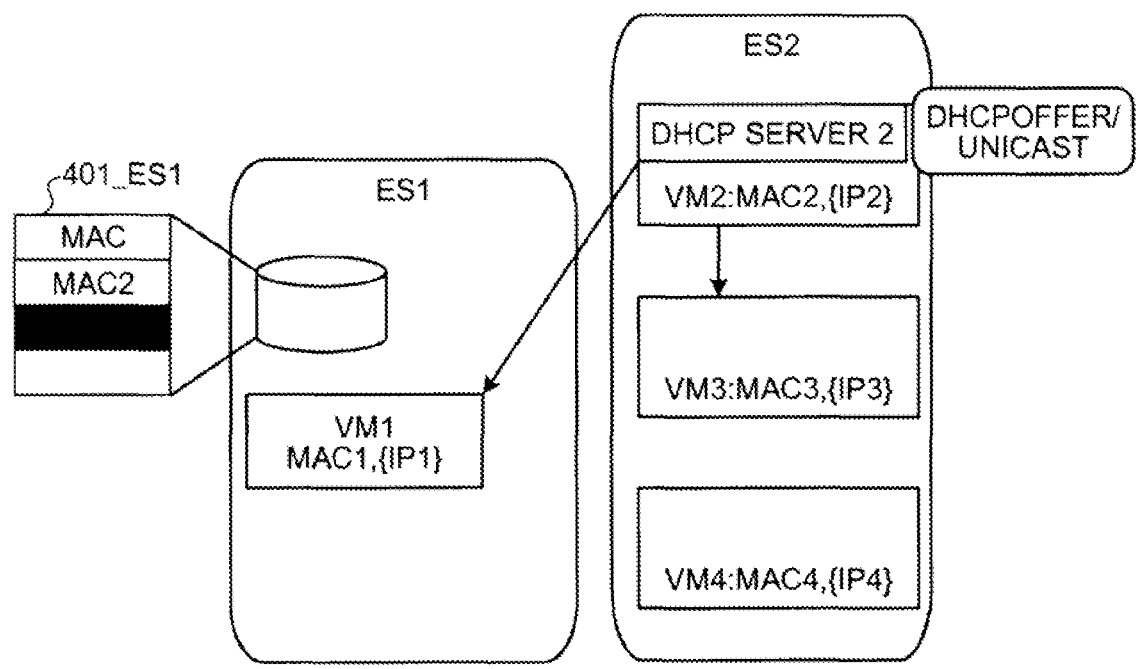
FIG. 32 is a third diagram depicting a state when DHCPDISCOVER is received during DHCP server suspension.

Using the DHCP_BtoU table 401, the ES 1 suppresses ARP broadcast communication. With reference to FIGS. 26 to 29, operation when DHCPDISCOVER has been received will be described. With reference to FIGS. 30 to 32, operation when among DHCP servers on the network, a DHCP server that is not running receives DHCPDISCOVER will be described.

Figure 26:
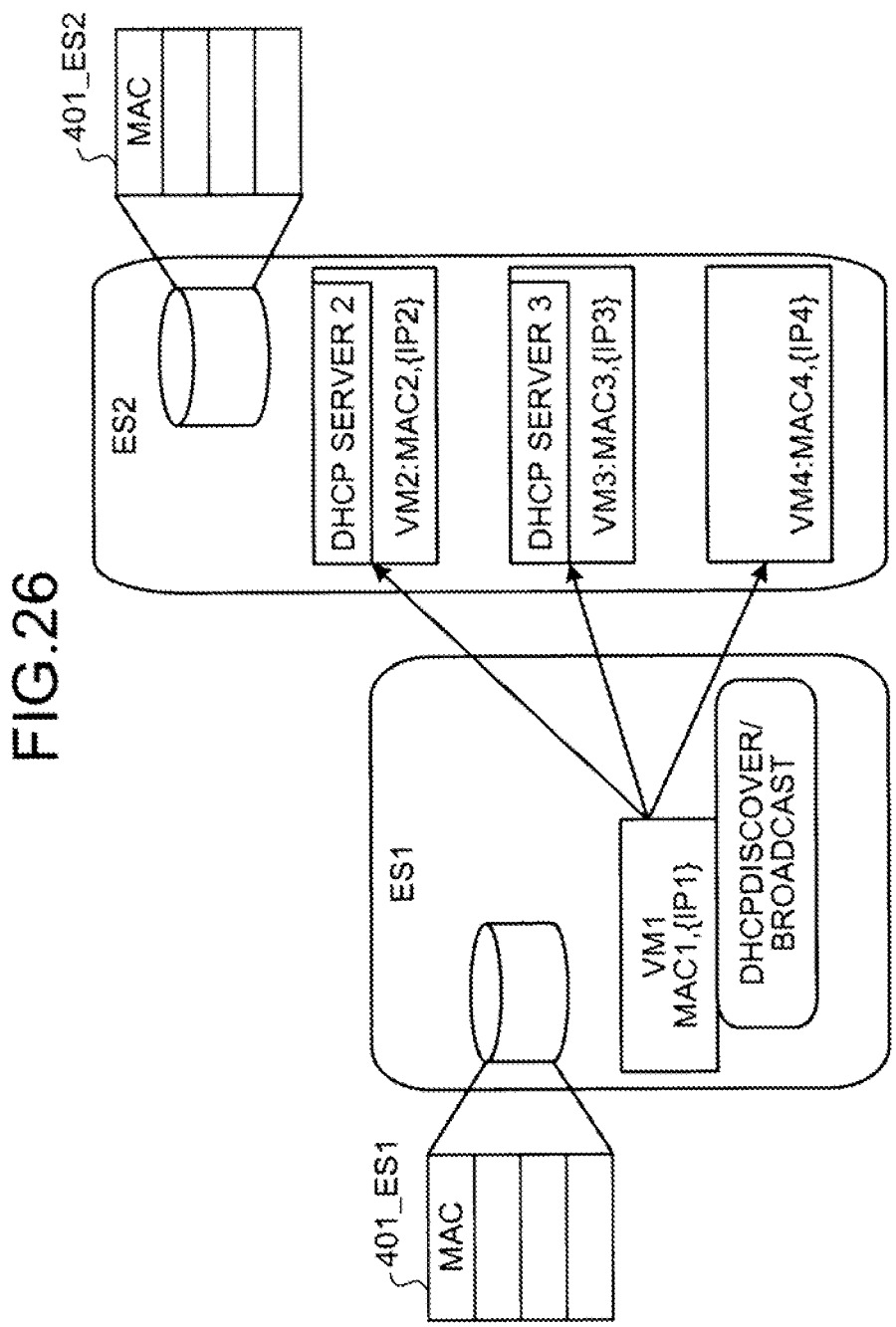
FIG. 26 is a first diagram depicting a state when DHCPDISCOVER is received before DHCP server registration.

FIG. 26 is a first diagram depicting a state when DHCP-DISCOVER is received before DHCP server registration. In the communication system 100 depicted in FIG. 26, the VM 1 in the ES 1, is allocated MAC1 as a MAC address and IP1 as an IP address. The VM 2, the VM 3, and the VM 4 on the ES 2 are respectively allocated MAC2, MAC3, and MAC4 as MAC addresses and IP2, IP3, and IP4 as IP addresses. At the VM 2 and the VM 3, a DHCP server 2 and a DHCP server 3 are running respectively. Nothing is registered in the DHCP_BtoU table 401_ES1 or in the DHCP_BtoU table 401_ES2.

In this state, a DHCP client of the VM 1 broadcasts DHCP-DISCOVER that detects from the network, a DHCP server. The ES 1 having received DHCPDISCOVER, transmits by broadcast to the VMs 2 to 4, DHCPDISCOVER without converting the communication scheme thereof from broadcast to unicast since nothing is registered in the DHCP_BtoU table 401_ES1.

Figure 27:
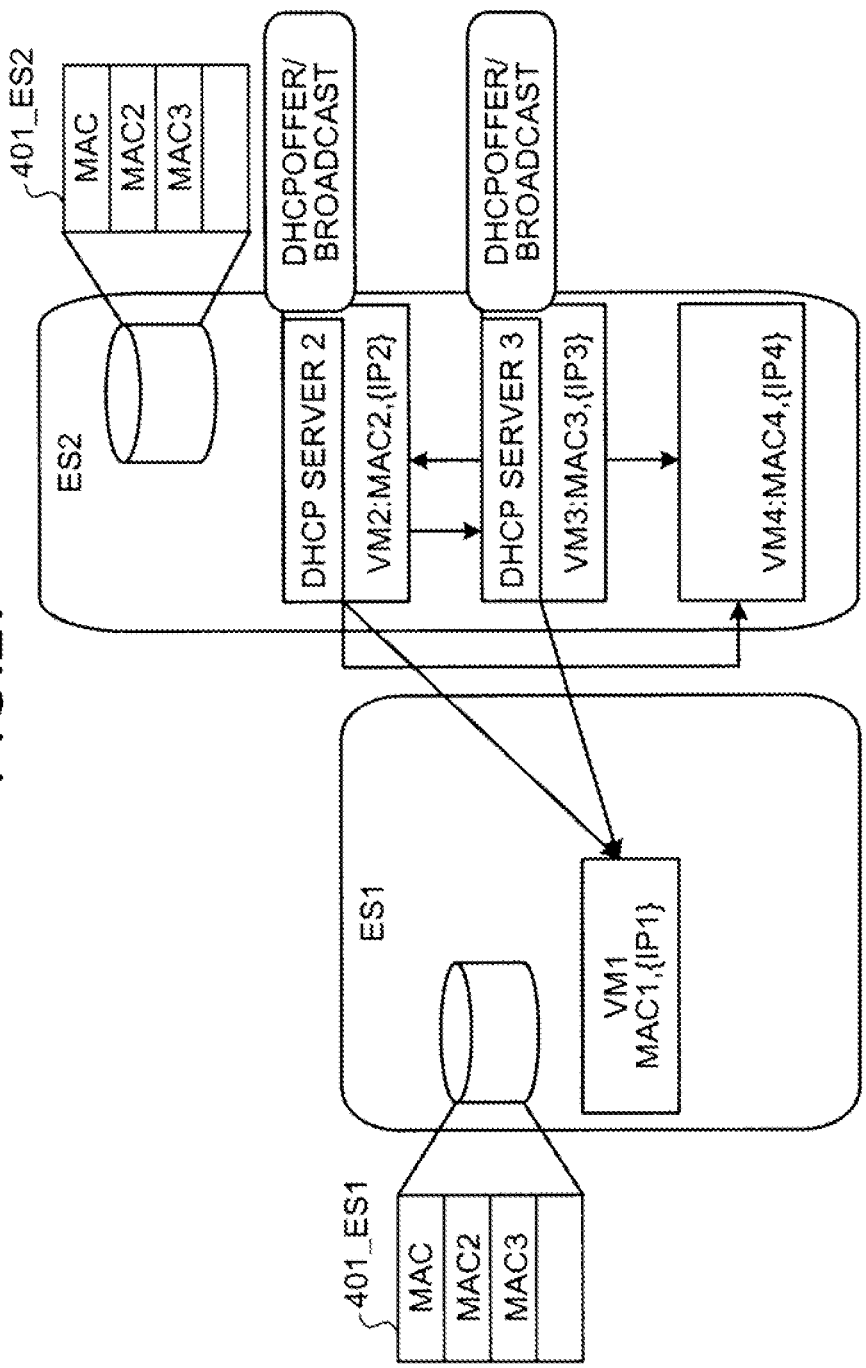
FIG. 27 is a second diagram depicting a state when DHCPDISCOVER is received before DHCP server registration.

FIG. 27 is a second diagram depicting a state when DHCP-DISCOVER is received before DHCP server registration. In the communication system 100 depicted in FIG. 27, the DHCP server 2 and the DHCP server 3 have transmitted DHCPOFFER in response to DHCPDISCOVER transmitted in FIG. 26.

In this state, the ES 2, via the DHCP server 2 of the VM 2 receives DHCPOFFER in response to DHCPDISCOVER. The ES 2 transmits by broadcast to the VM 1, the VM 3, and the VM 4, DHCPOFFER without converting the communication scheme thereof from broadcast to unicast since nothing is registered in the DHCP_BtoU table 401_ES2. The ES 2 adds the MAC address of the VM 2 to the DHCP_BtoU table 401_ES2. The ES 2 processes DHCPOFFER from the VM 3 similarly.

Figure 28:
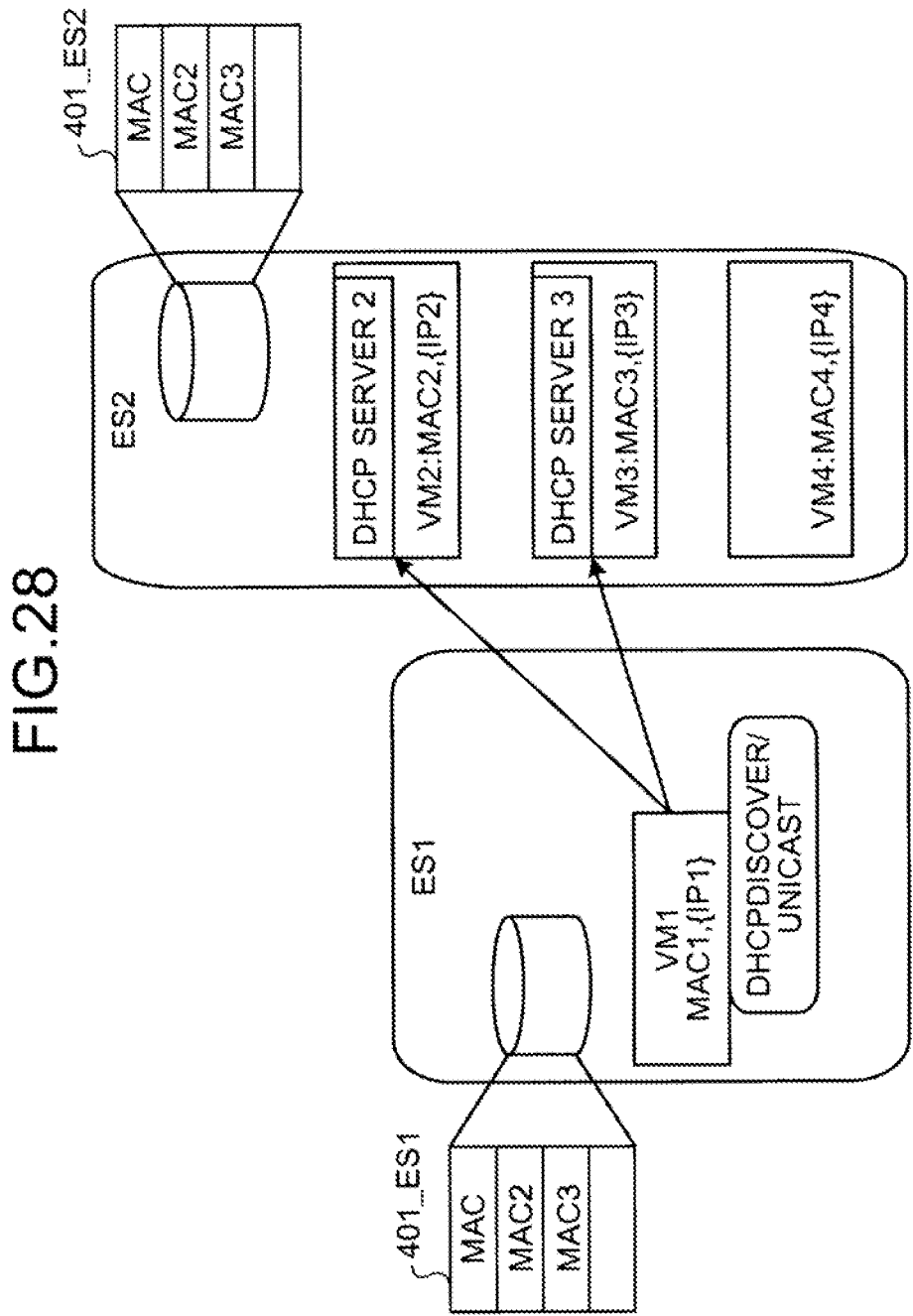
FIG. 28 is a first diagram depicting a state when DHCPDISCOVER is received after DHCP server registration.

FIG. 28 is a first diagram depicting a state when DHCP-DISCOVER is received after DHCP server registration. FIG. 28 depicts a state of the communication system 100 where the DHCP server 2 and the DHCP server 3 in FIG. 27 transmit DHCPOFFER, and the DHCP_BtoU table 401_ES1 and the DHCP_BtoU table 401_ES2 have DHCP server information registered therein.

In this state, the DHCP client of the VM 1 again broadcasts DHCPDISCOVER. The ES 1 having received DHCPDIS-COVER, converts the communication scheme of DHCPDIS-COVER from broadcast to unicast and transmits DHCPDIS-COVER to the VM 2 and the VM 3 since DHCP server information is registered in the DHCP_BtoU table 401_ES1. For example, the ES 1 transmits to the VM 2, a DHCP packet in which the destination MAC address has been converted from a broadcast address to MAC2; and transmits to the VM 3, a DHCP packet in which the destination MAC address has been converted from a broadcast address to MAC3.

Figure 29:
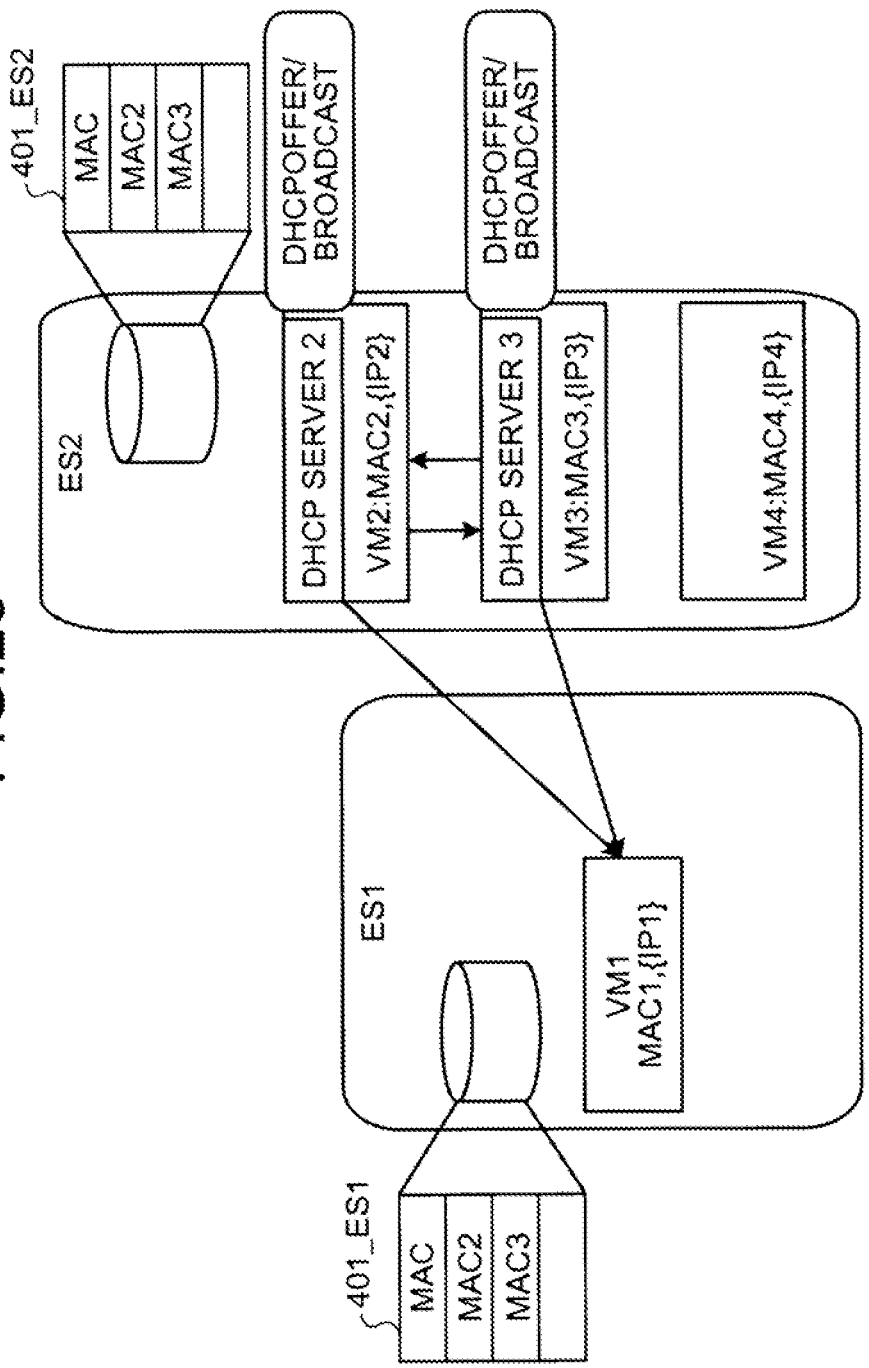
FIG. 29 is a second diagram depicting a state when DHCPDISCOVER is received after DHCP server registration.

FIG. 29 is a second diagram depicting a state when DHCP-DISCOVER is received after DHCP server registration. In the communication system 100 depicted in FIG. 29, the VM 2 and the VM 3 have transmitted DHCPOFFER in response to DHCPDISCOVER transmitted in FIG. 28.

In this state, the ES 2, via the DHCP server 2 of the VM 2 receives DHCPOFFER in response to DHCPDISCOVER. The ES 2 converts the communication scheme of DHCPOF-FER from broadcast to unicast and transmits DHCPOFFER to the DHCP server and the transmission source of DHCP-DISCOVER since DHCP server information is registered in the DHCP_BtoU table 401_ES2.

For example, the ES 1 transmits to the VM 3, a DHCP packet in which the destination MAC address has been converted to MAC3. The ES 1 acquires MAC1, which is the transmission source of DHCPDISCOVER stored at the client hardware address of DHCPOFFER, and transmits to the VM 1, a DHCP packet in which the destination MAC address has been converted from a broadcast address to MAC1. The ES 2 similarly processes DHCPOFFER from the VM 3.

FIG. 30 is a first diagram depicting a state when DHCP-DISCOVER is received during DHCP server suspension. FIG. 30 depicts a state of the communication system 100 where from the state depicted in FIG. 29, operation of the DHCP server 3 has been suspended. In the state depicted in FIG. 30, the DHCP_BtoU table 401_ES1 has MAC2 and MAC3 as DHCP server MAC addresses.

FIG. 31 is a second diagram depicting a state when DHCP-DISCOVER is received during DHCP server suspension. FIG. 31 depicts a state of the communication system 100 where from the state depicted in FIG. 30, the VM 1 broadcasts DHCPDISCOVER.

In this state, the ES 1 converts the communication scheme of DHCPDISCOVER from broadcast to unicast and transmits the DHCPDISCOVER to the VM 2 and the VM 3 since DHCP server information is registered in the DHCP_BtoU table 401_ES.

FIG. 32 is a third diagram depicting a state when DHCP-DISCOVER is received during DHCP server suspension. In the communication system 100 depicted in FIG. 32, the VM 2 has transmitted DHCPOFFER in response to DHCPDIS-COVER transmitted in FIG. 28.

In this state, if DHCPOFFER from the VM 3 has not arrived within a given period, the ES 1 determines that operation of the DHCP server has been suspended and deletes from the DHCP_BtoU table 401_ES1, the record for "MAC3". Thus, the ES 1 can update the data of the DHCP_BtoU table 401_ES1 according to DHCP server suspension.

Figure 33:
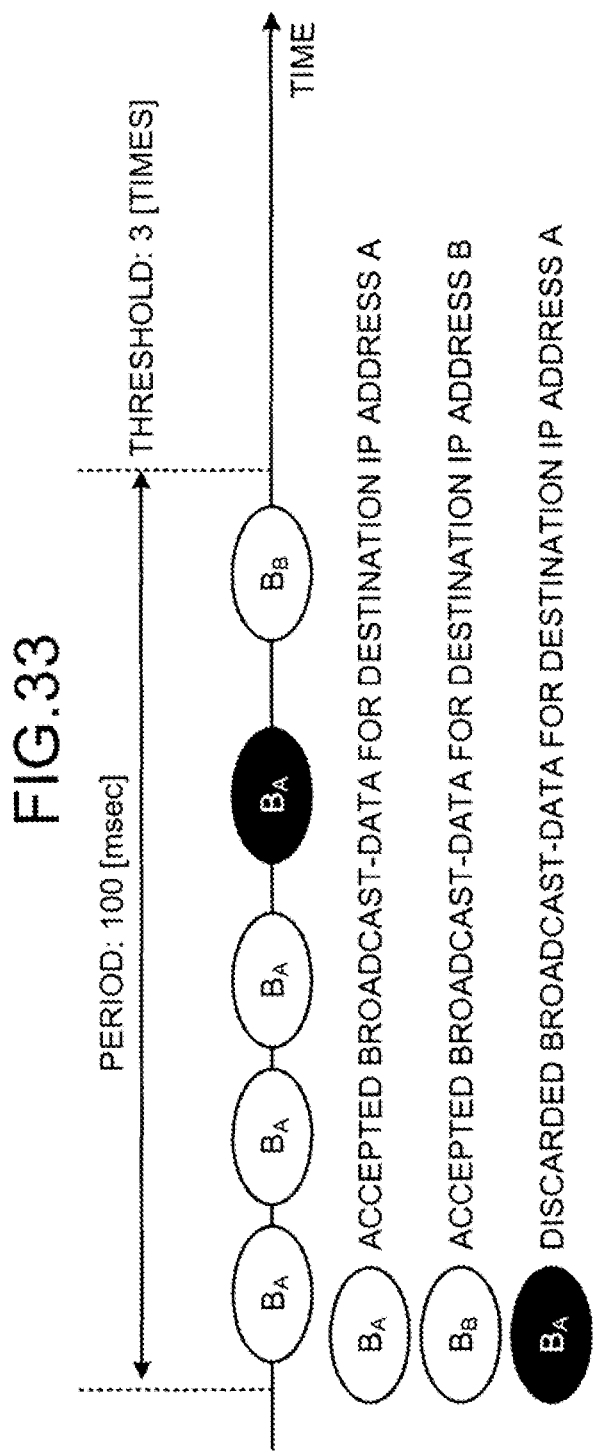
FIG. 33 is a diagram depicting an example of broadcast data discarding.

FIG. 33 is a diagram depicting an example of broadcast data discarding. For example, the VM 1 in FIG. 6 is assumed to periodically transmit an ARP request to IP address A. In this case, the ES 1, during a fixed period, broadcasts to an IP address, exceeding a threshold are discarded. In the example depicted in FIG. 25, assuming the fixed period is 100[msec] and the threshold is 3[times], among the broadcast data for which the destination IP address is A, the receipt of 3 data items is permitted and from the fourth reception, the data is discarded. The broadcast data may be, for example, ARP frames and DHCP packets. The broadcast data may be data broadcasted according to a protocol other than ARP and DHCP.

In the example depicted in FIG. 33, although the ES 1 counts the data to be discarded according to destination IP address, the data may be counted according to transmission source IP address, or according to combinations of a transmission source IP address and a destination IP address. The ES 1 may count the data to be discarded based on the MAC address rather than the IP address. Thus, the ES according to the present embodiment prevents first broadcasts transmitted to a different address from being discarded.

Flowcharts of the operations depicted in FIGS. 5 to 33 will be described. FIGS. 34 to 39 depict flowcharts related to ARP frames, and FIGS. 40 to 44 depict flowcharts related to DHCP packets. Although each of the ESs executes the operations in the flowcharts depicted in FIGS. 34 to 44, description will be given with the ES 1 executing the operations.

Figure 34:
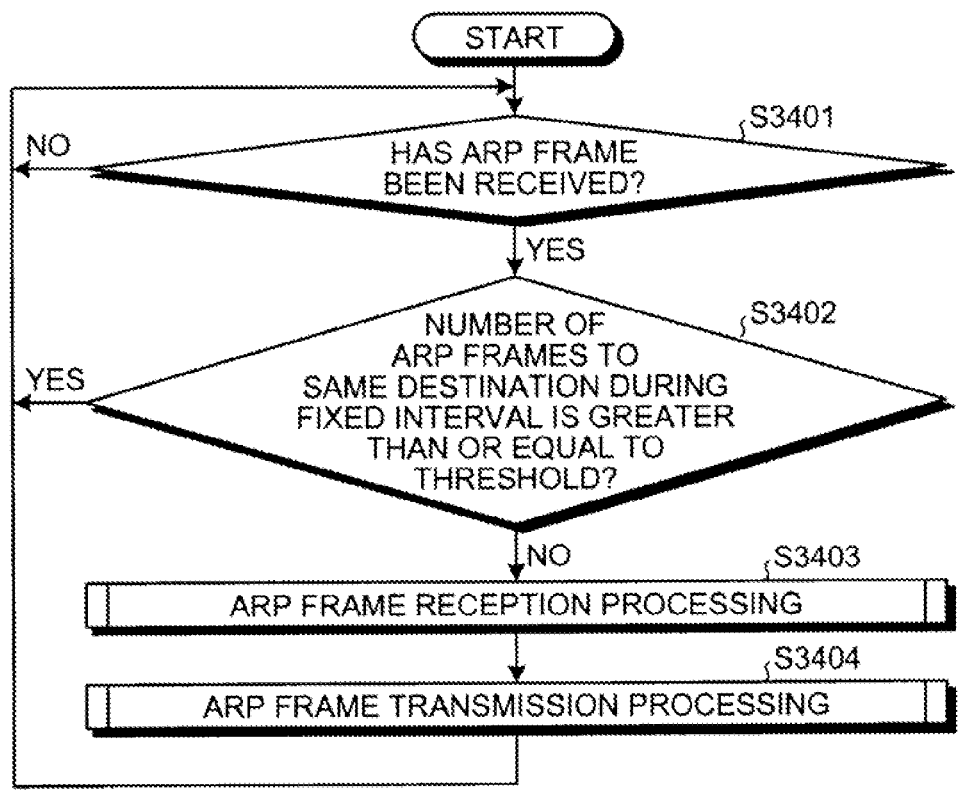
FIG. 34 is a flowchart depicting an example of ARP frame processing.

FIG. 34 is a flowchart depicting an example of ARP frame processing. The ES 1 determines whether an ARP frame has been received (step S3401). If an ARP frame has been received (step S3401: YES), the ES 1 determines whether the number of ARP frames to the same destination during a fixed interval is at least a threshold (step S3402). If the condition is not satisfied (step S3402: NO), the ES 1 executes ARP frame reception processing (step S3403). Details of the ARP frame reception processing will be described hereinafter with reference to FIG. 36.

After completion of the ARP frame reception processing, the ES 1 executes ARP frame transmission processing (step S3404). The ARP frame transmission processing is processing of transmitting the received ARP frame to a destination resulting from conversion by the ARP frame reception processing. Processing concerning frames for which there is no response after transmission by the ARP frame transmission processing is depicted in FIG. 35.

After completion of the ARP frame transmission processing, the ES 1 transitions to step S3401. At step S3402, if the condition is satisfied (step S3402: YES), the ES 1 discards the received ARP frame and transitions to step S3401. If no ARP frame has been received (step S3401: NO), the ES 1 re-executes the process at step S3401 after a predetermined period elapses.

Figure 35:
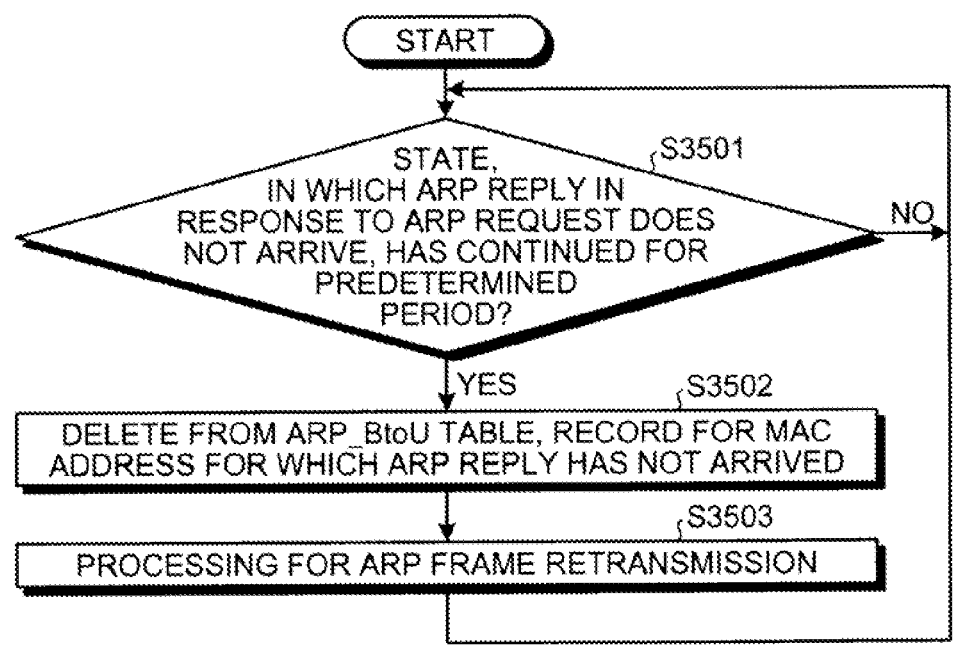
FIG. 35 is a flowchart depicting an example of ARP transmission timeout processing.

FIG. 35 is a flowchart depicting an example of ARP transmission timeout processing. The ES 1 determines whether a state in which an ARP reply in response to an ARP request does not arrive, has continued over a predetermined period (step S3501). At step S3501, the predetermined period, for example, may be set to be a retransmission time defined in ARP specifications or a period shorter than the specification-defined retransmission time.

If the state has continued over the predetermined period (step S3501: YES), the ES 1 deletes from the ARP_BtoU table 102_ES1, the record for the MAC address for which an ARP reply has not arrived (step S3502). Here, the record to be deleted includes the record for a pseudo ARP request that is transmitted at step S3904 described hereinafter. After the deletion, the ES 1 performs processing for ARP frame retransmission (step S3503), and transitions to step S3401.

The processing for ARP frame retransmission is transmission by broadcast, without communication scheme conversion. The ES 1 may omit the process at step S3503. The process at step S3503 is omitted consequent to the transmission source of the ARP request retransmitting the ARP request according to ARP specifications. If the state has not continued for the predetermined period (step S3501: NO), the ES 1 transitions to step S3501.

Figure 36:
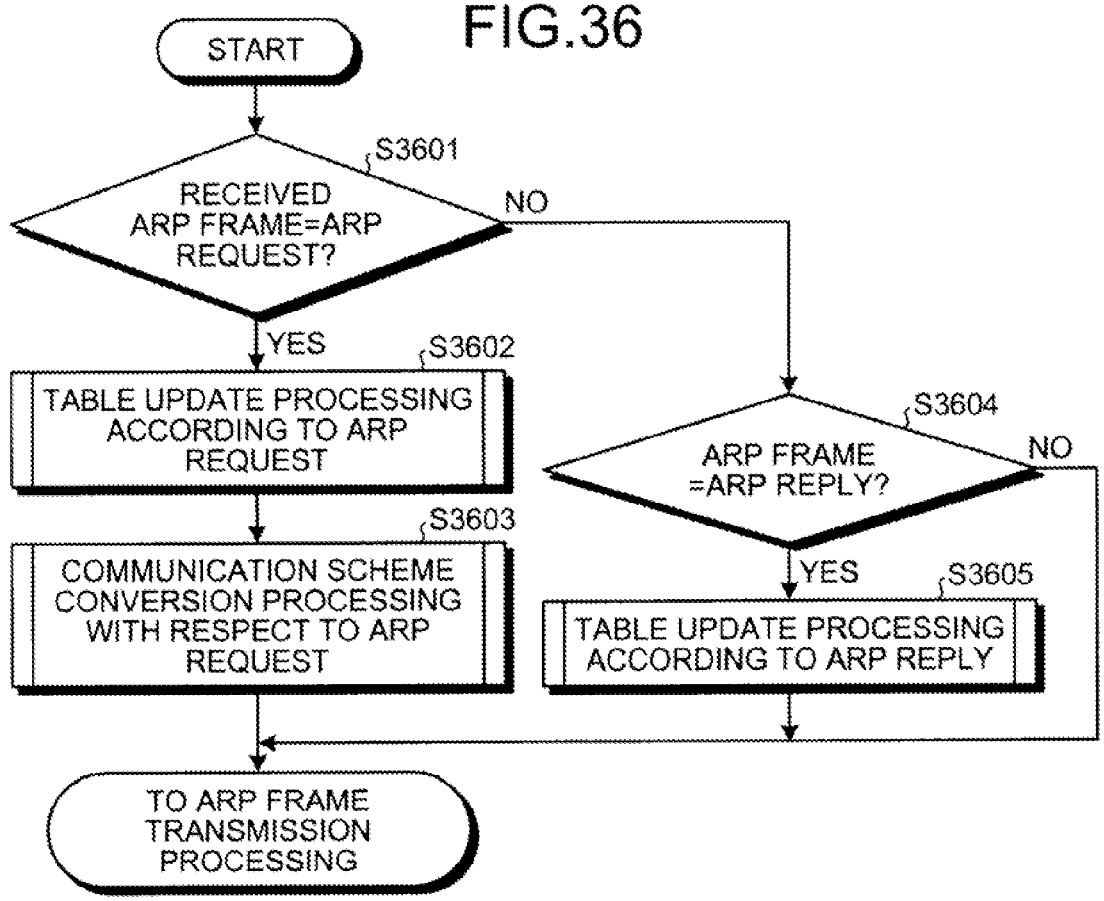
FIG. 36 is a flowchart depicting an example of ARP frame reception processing.

FIG. 36 is a flowchart depicting an example of the ARP frame reception processing. The ES 1 determines whether the received ARP frame is an ARP request (step S3601). If the ARP frame is an ARP request (step S3601: YES), the ES 1 executes table update processing according to the ARP request (step S3602). Details of the table update processing according to a ARP request will be described hereinafter with reference to FIG. 37. After execution of the table update processing according to the ARP request, the ES 1 executes communication scheme conversion processing with respect to the ARP request (step S3603). Details of the communication scheme conversion processing with respect to the ARP request will be described hereinafter with reference to FIG. 38. After completion of the communication scheme conversion processing with respect to the ARP frame, the ES 1 ends the ARP frame reception processing, and executes the ARP frame transmission processing.

If the received ARP frame is not an ARP request (step S3601: NO), the ES 1 determines whether the ARP frame is an ARP reply (step S3604). If the ARP frame is an ARP reply (step S3604: YES), the ES 1 executes the table update processing according to the ARP reply (step S3605). After execution of the table update processing according to the ARP reply, or if the ARP frame is not an ARP reply (step S3604: NO), the ES 1 ends the ARP frame reception processing and executes the ARP frame transmission processing.

Figure 37:
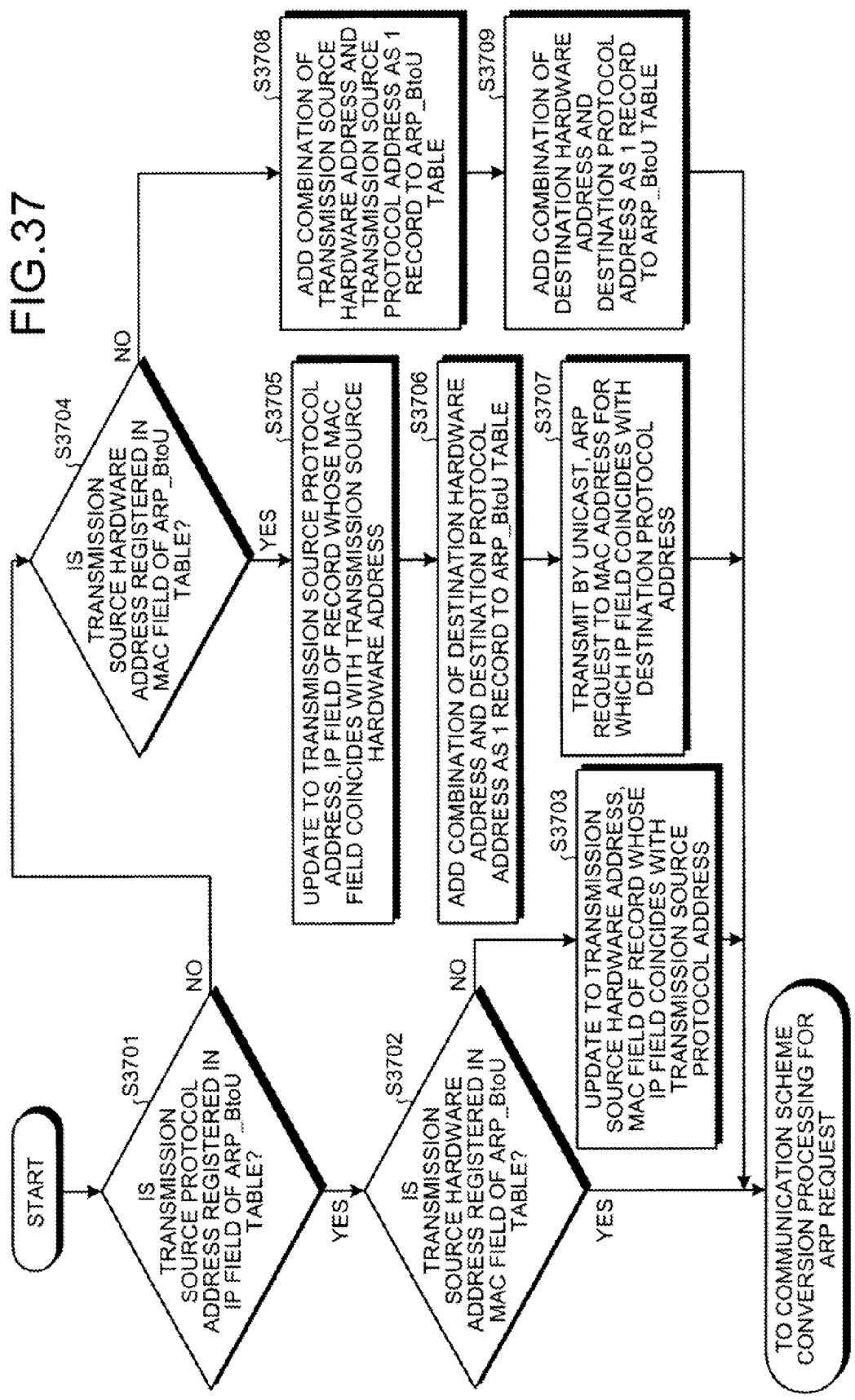
FIG. 37 is a flowchart depicting an example of table update processing according to an ARP request.

FIG. 37 is a flowchart depicting an example of the table update processing according to an ARP request. The ES 1 determines whether the transmission source protocol address is registered in the IP field of the ARP_BtoU table 102_ES1 (step S3701). If the transmission source protocol address is registered (step S3701: YES), the ES 1 determines whether the transmission source hardware address is registered in the MAC field of the ARP_BtoU table 102_ES1 (step S3702). If the transmission source hardware address is registered (step S3702: YES), the ES 1 ends the table update processing, and executes the communication scheme conversion processing for an ARP request.

If the transmission source hardware address is not registered (step S3702: NO), in the ARP_BtoU table 102_ES1, the ES 1 updates to the transmission source hardware address, the MAC field of the record whose IP field coincides with the transmission source protocol address (step S3703). After the update, the ES 1 ends the table update processing, and executes the communication scheme conversion processing for an ARP request.

If the transmission source protocol address is not registered (step S3701: NO), the ES 1 determines whether the transmission source hardware address is registered in the ARP_BtoU table 102_ES1 (step S3704). If the transmission source hardware address is registered (step S3704: YES), in the ARP_BtoU table 102_ES1, the ES 1 updates to the transmission source protocol address, the IP field of the record whose MAC field coincides with the transmission source hardware address (step S3705). After the update, the ES 1 adds the combination of the destination hardware address and the destination protocol address as 1 record to the ARP_BtoU table 102_ES1 (step S3706). The destination hardware address of the ARP request is a broadcast address and therefore, unspecified is registered in the ARP_BtoU table 102_ES1.

Irrespective of whether the transmission source hardware address is registered, if the transmission source protocol address is not registered, there is a possibility that the IP address allocation on the network has changed. Consequently, in the ARP_BtoU table 102_ES1, the ES 1 transmits by unicast, an ARP request to the MAC address for which the IP field coincides with the destination protocol address (step S3707). After the transmission, the ES 1 ends the table update processing, and executes the communication scheme conversion processing for an ARP request.

If the transmission source hardware address is not registered (step S3704: NO), the ES 1 adds a combination of the transmission source hardware address and the transmission source protocol address as 1 record to the ARP_BtoU table 102_ES1 (step S3708). The ES 1 further adds a combination of the destination hardware address and the destination protocol address as 1 record to the ARP_BtoU table 102_ES1 (step S3709). After the additions, the ES 1 ends the table update processing, and executes the communication scheme conversion processing for ARP request.

Figure 38:
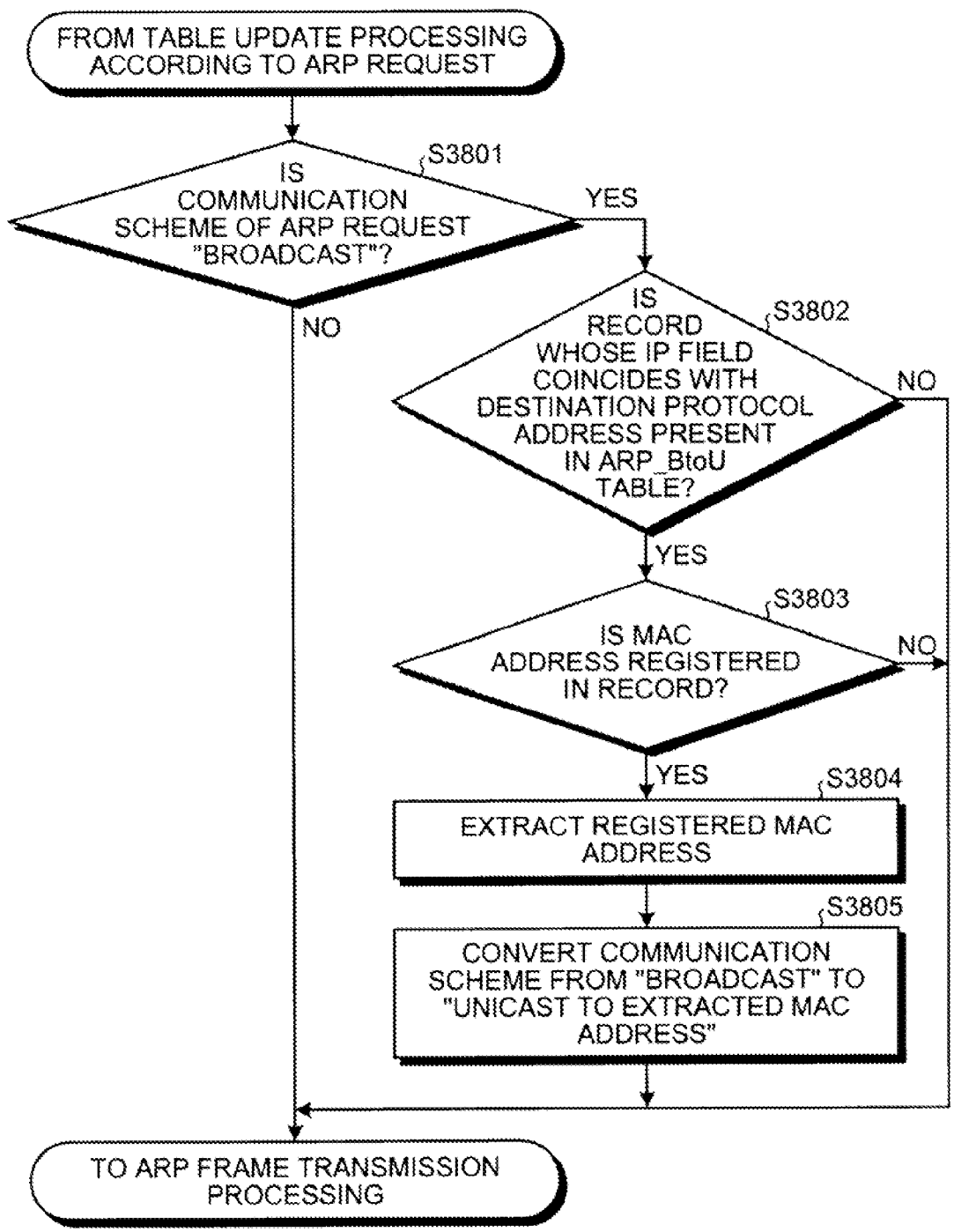
FIG. 38 is a flowchart depicting an example of communication scheme conversion processing for an ARP request.

FIG. 38 is a flowchart depicting an example of the communication scheme conversion processing for an ARP request. The ES 1 determines whether the communication scheme of the ARP request is "broadcast" (step S3801). If the communication scheme is "broadcast" (step S3801: YES), the ES 1 determines whether a record whose IP field coincides with the destination protocol address is present in the ARP_BtoU table 102_ES1 (step S3802). If such a record is present (step S3802: YES), the ES 1 determines whether a MAC address is registered in the record (step S3803). At step S3803, a case where a MAC address is registered is a case where unicast is registered and not "unspecified".

If a MAC address is registered (step S3803: YES), the ES 1 extracts the MAC address registered in the ARP_BtoU table 102_ES1 (step S3804). The ES 1 converts the communication scheme from "broadcast" to "unicast to the extracted MAC address" (step S3805), and transmits the ARP request by the ARP frame transmission processing.

If the communication scheme is not "broadcast" (step S3801: NO), the ES 1 transmits the ARP request by the ARP frame transmission processing, leaving the communication scheme as "unicast" (step S3802: NO). If the MAC address is not registered (step S3803: NO), the ES 1 transmits the ARP request by the ARP frame transmission processing, leaving the communication scheme as broadcast.

Figure 39:
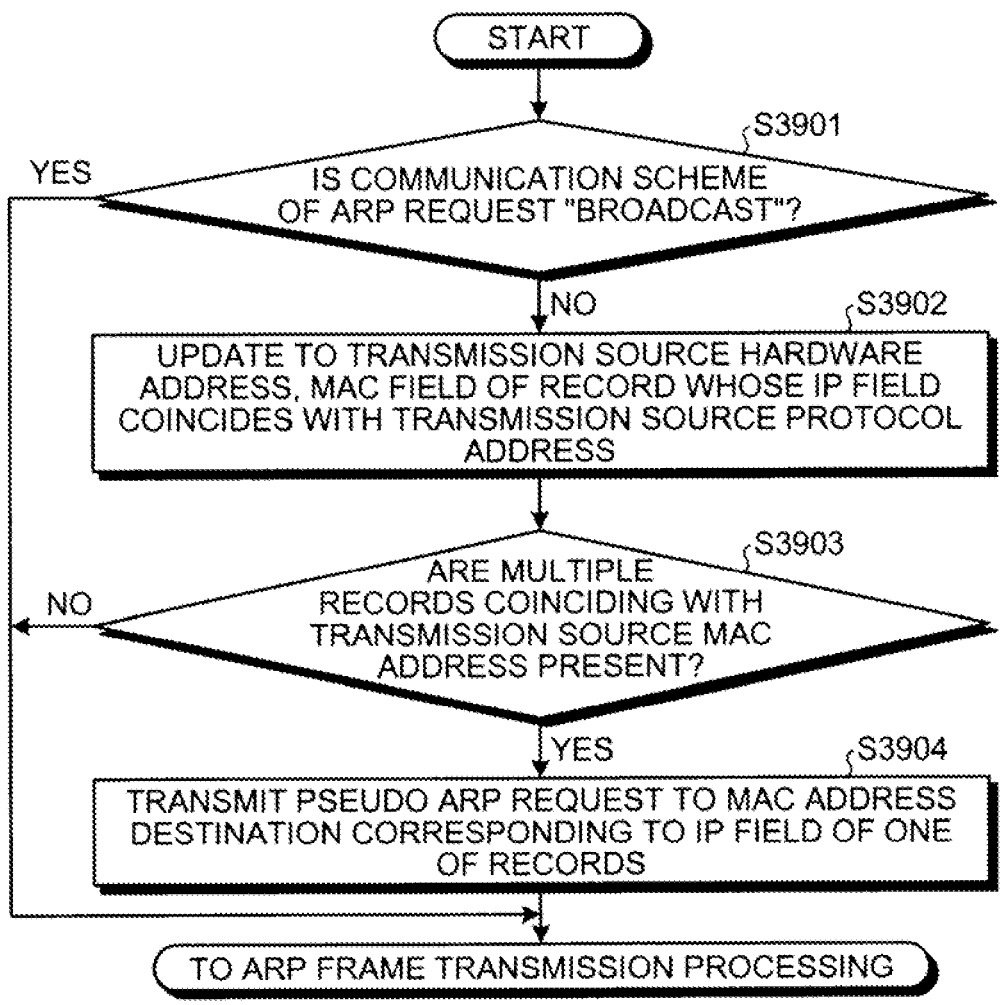
FIG. 39 is a flowchart depicting an example of table update processing according to an ARP reply.

FIG. 39 is a flowchart depicting an example of the table update processing according to an ARP reply. The ES 1 determines whether the communication scheme of the ARP reply is "broadcast" (step S3901). If the communication scheme is not "broadcast" (step S3901: NO), the ES 1 updates to the transmission source hardware address, the MAC field of the record whose IP field coincides with the transmission source protocol address (step S3902).

The ES 1 determines whether multiple records coinciding with the transmission source MAC address are present (step S3903). If multiple records are present (step S3903: YES), the ES 1 transmits a pseudo ARP request to the MAC address destination corresponding to the IP field of one of the records (step S3904), and transmits an ARP reply by the ARP frame transmission processing.

If the communication scheme is "broadcast" (step S3901: YES), or if multiple records are not present (step S3903: NO), the ES 1 transmits an ARP reply by the ARP frame transmission processing.

Figure 40:
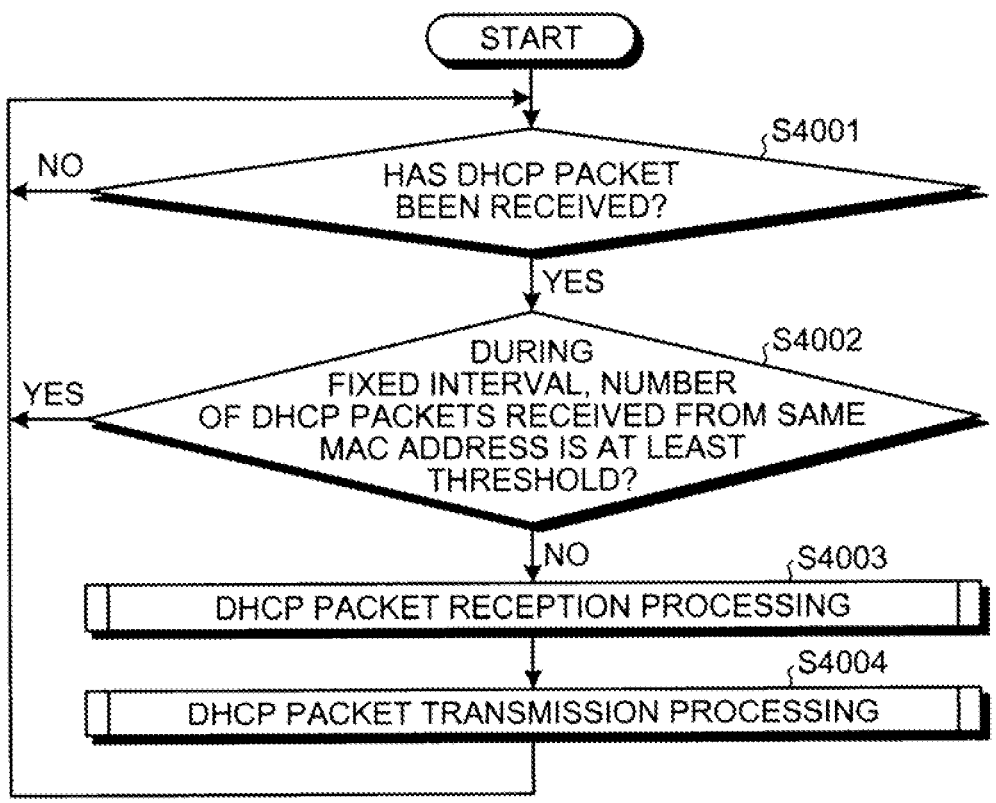
FIG. 40 is a flowchart depicting an example of DHCP packet processing.

FIG. 40 is a flowchart depicting an example of DHCP packet processing. The ES 1 determines whether a DHCP packet has been received (step S4001). If a DHCP packet has been received (step S4001: YES), the ES 1 determines whether during a fixed interval, the number DHCP packets received from the same MAC address is at least a threshold (step S4002). If the number is less than the threshold (step S4002: NO), the ES 1 executes DHCP packet reception processing (step S4003). Details of the DHCP packet reception processing are described hereinafter with reference to FIG. 42.

After the DHCP packet reception processing, the ES 1 executes DHCP packet transmission processing (step S4004). The DHCP packet transmission processing is processing for transmitting a received DHCP packet to a destination resulting from conversion by the DHCP packet reception processing. Processing concerning packets for which there is no response after transmission by the DHCP packet transmission processing will be described with reference to FIG. 41.

After the DHCP packet transmission processing, the ES 1 transitions to step S4001. If the number is greater than or equal to the threshold (step S4002: YES), the ES 1 discards the received DHCP packet, and transitions to step S4001. If a DHCP packet has not been received (step S4001: NO), the ES 1 transitions to step S4001 after a predetermined period elapses.

Figure 41:
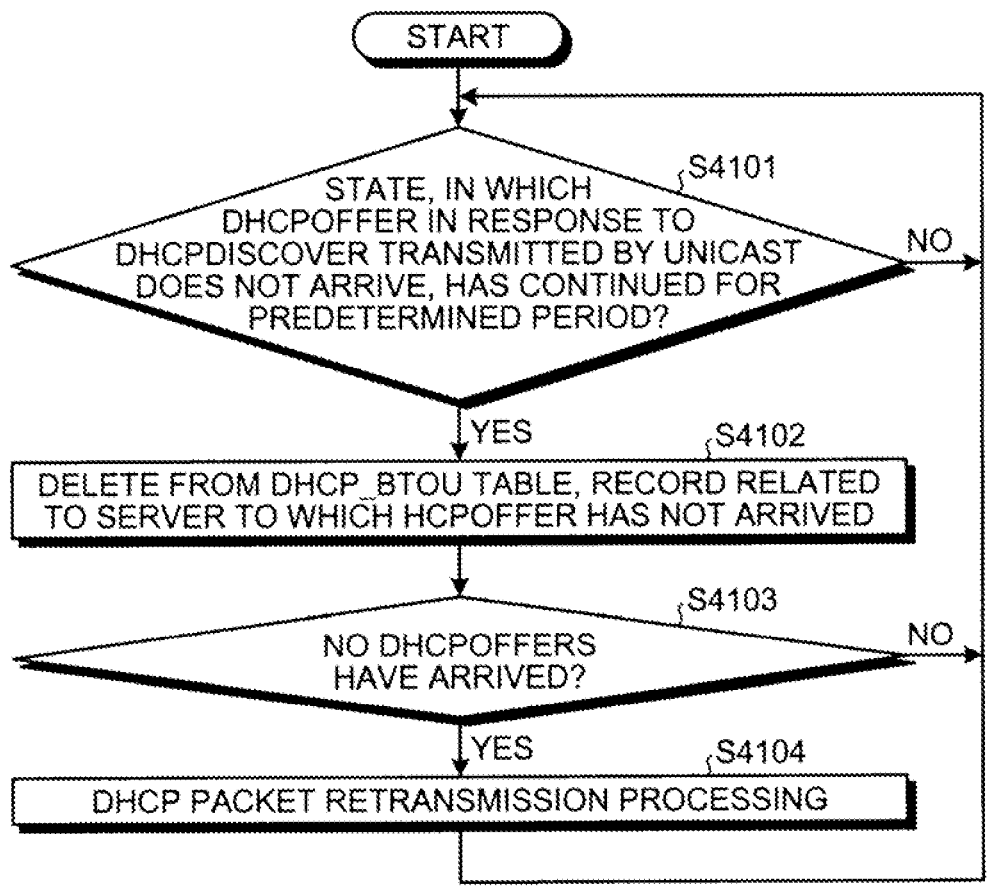
FIG. 41 is a flowchart depicting an example of DHCP transmission timeout processing.

FIG. 41 is a flowchart depicting an example of DHCP transmission timeout processing. The ES 1 determines whether a state, in which DHCPOFFER in response to DHCPDISCOVER transmitted by unicast does not arrive, has continued for predetermined period (step S4101). At step S4101, the predetermined period, for example, may be set as a re-transmission time defined in DHCP specifications, or may be shorter than the re-transmission time defined in the specifications.

If the state has continued for the predetermined period (step S4101: YES), the ES 1 deletes from the DHCP_BtoU table 401_ES1, a record related to the server at which HCPOFFER has not arrived (step S4102).

The ES 1 determines whether no DHCPOFFERs have arrived (step S4103). The purpose of determining the number of DHCPOFFERs that arrive is that if multiple DHCP servers are registered in the DHCP_BtoU table 401, the ES 1 generates and transmits multiple unicast DHCPDISCOVERs. If 1 or more DHCPOFFERs corresponding to multiple DHCP-DISCOVERs arrive at the ES 1, the transmission sources of the DHCPDISCOVERs can continue processing and therefore, the ES 1 determines the number of DHCPOFFERs that arrive.

If no DHCPOFFERs have arrived (step S4103: YES), the ES 1 performs DHCP packet retransmission processing (step S4104), and transitions to step S4001. The DHCP packet retransmission processing broadcasts the DHCP packet without converting the communication scheme. In the case of step S4103: YES, the ES 1 may omit the process at step S4104. The process at step S4104 is omitted if the transmission source of DHCPDISCOVER retransmits DHCPDISCOVER.

If the state does not continue for the predetermined period (step S4101: NO), or if DHCPOFFER has arrived (step S4103: NO), the ES 1 transitions to step S4001.

Figure 42:
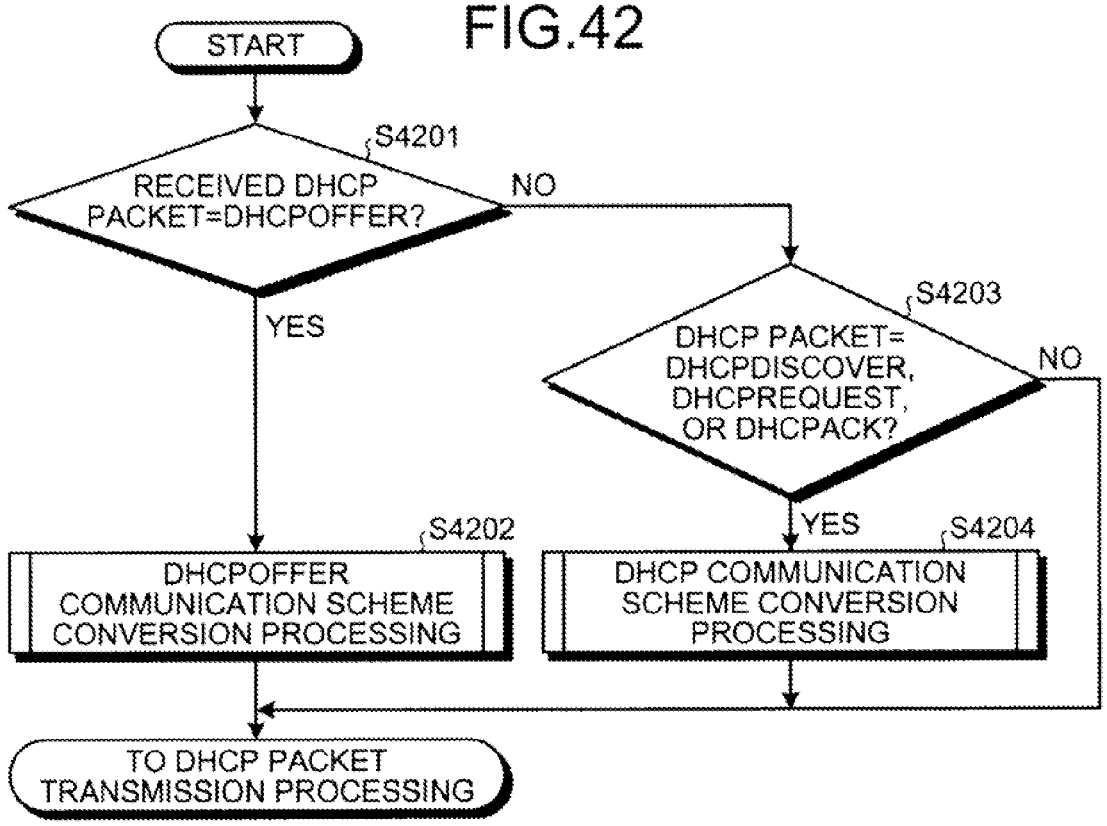
FIG. 42 is a flowchart depicting an example of DHCP packet reception processing.

FIG. 42 is a flowchart depicting an example of DHCP packet reception processing. The ES 1 determines whether the received DHCP packet is DHCPOFFER (step S4201). If the received DHCP packet is DHCPOFFER (step S4201: YES), the ES 1 executes DHCPOFFER communication scheme conversion processing (step S4202). Details of the DHCPOFFER communication scheme conversion processing will be described hereinafter with reference to FIG. 43. After the communication scheme conversion processing for the DHCP packet, the ES 1 ends the DHCP packet reception processing, and executes the DHCP packet transmission processing.

If the DHCP packet is not DHCPOFFER (step S4201: NO), the ES 1 determines if the DHCP packet is DHCPDIS-COVER, DHCPREQUEST, or DHCPACK (step S4203). If so (step S4203: YES), the ES 1 executes DHCP communication scheme conversion processing (step S4204). Details of the DHCP communication scheme conversion processing will be described hereinafter with reference to FIG. 44. After the DHCP table update processing, or if conditions are not met at step S4203 (step S4203: NO), the ES 1 ends the DHCP packet reception processing, and executes the DHCP packet transmission processing.

Figure 43:
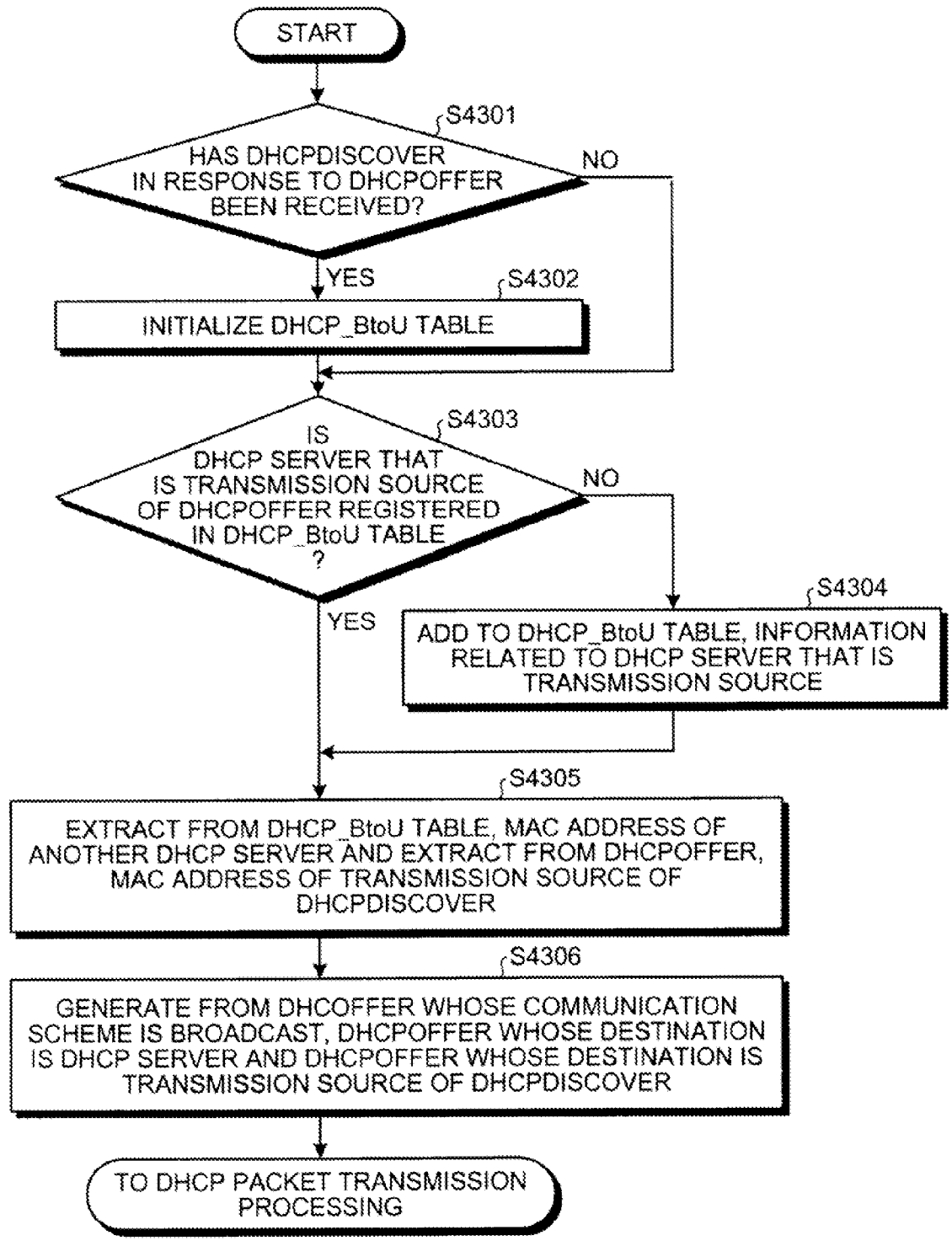
FIG. 43 is a flowchart depicting an example of DHCPOFFER communication scheme conversion processing.

FIG. 43 is a flowchart depicting an example of the DHCPOFFER communication scheme conversion processing. The ES 1 determines whether DHCPDISCOVER in response to DHCPOFFER has been received (step S4301). As a method of determining whether DHCPDISCOVER in response to DHCPOFFER has been received, for example, the ES 1 stores the received DHCPDISCOVER. If DHCPDISCOVER having a transaction ID identical to DHCPOFFER is received, the ES 1 determines that DHCPDISCOVER in response to DHCPOFFER has been received.

If DHCPDISCOVER has been received (step S4301: YES), the ES 1 initializes the DHCP_BtoU table 401_ES1 (step S4302). After the initialization, or if DHCPDISCOVER has not been received (step S4301: NO), the ES 1 determines whether the DHCP server that is the transmission source of DHCPOFFER is registered in the DHCP_BtoU table 401_ES1 (step S4303). If the DHCP server is not registered (step S4303: NO), the ES 1 adds to the DHCP_BtoU table 401_ES1, information related to the DHCP server that is the transmission source (step S4304).

After the addition, or if the DHCP server is registered (step S4303: YES), the ES 1 extracts from the DHCP_BtoU table 401_ES1, the MAC address of another DHCP server and extracts from the DHCPOFFER, the MAC address of the transmission source of DHCPDISCOVER (step S4305). The ES 1 generates from DHCPOFFER whose communication scheme is broadcast, DHCPOFFER whose destination is the DHCP server and DHCPOFFER whose destination is the transmission source of DHCPDISCOVER (step S4306). After the generation, the ES 1 executes the DHCP packet transmission processing and thereby transmits DHCPOFFER whose communication scheme has been converted to DHCP unicast.

Figure 44:
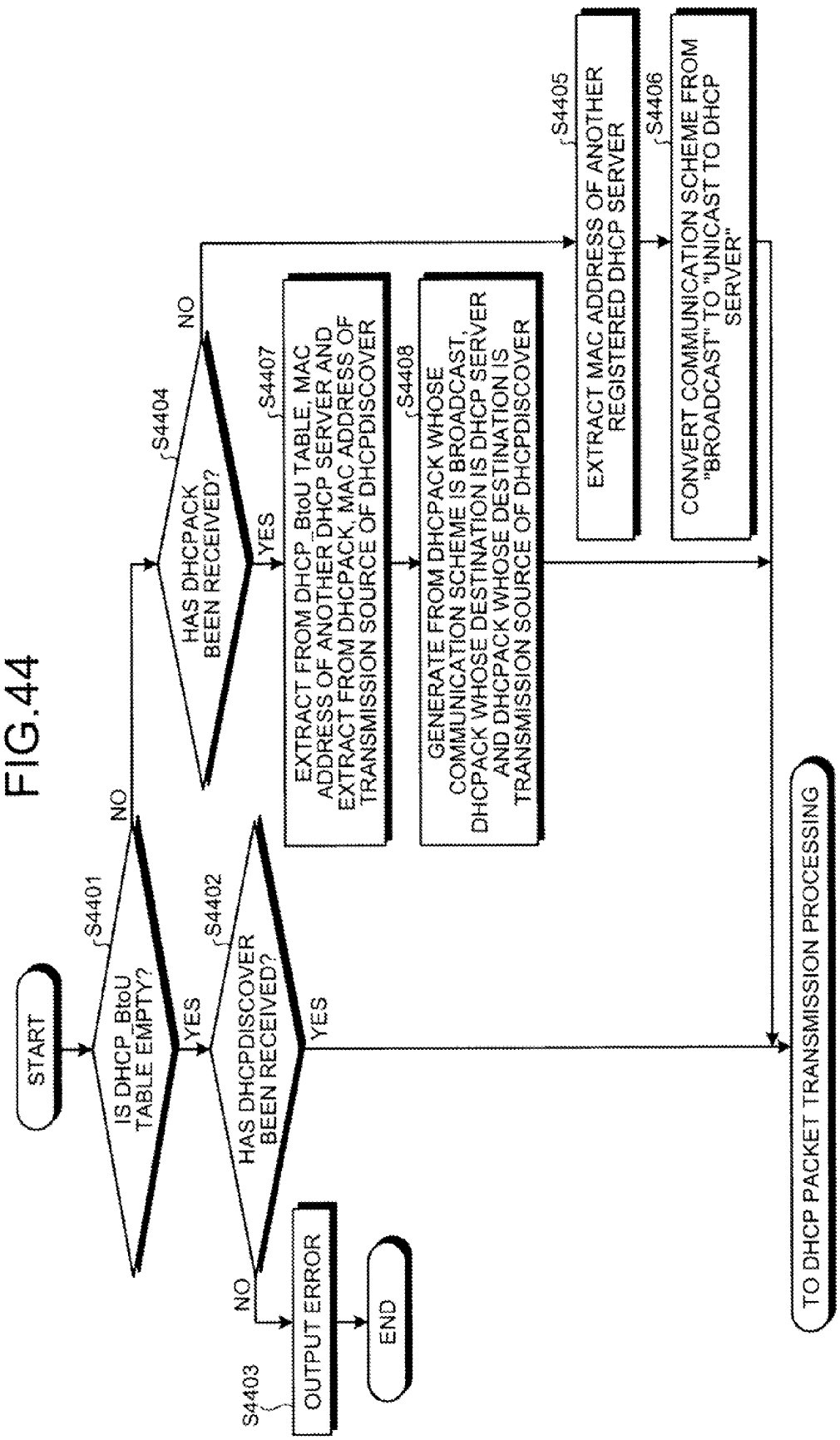
FIG. 44 is a flowchart depicting an example of DHCP communication scheme conversion processing.

FIG. 44 is a flowchart depicting an example of the DHCP communication scheme conversion processing. The DHCP communication scheme conversion processing is communication scheme conversion processing for DHCPDISCOVER, DHCPREQUEST, and DHCPACK. The ES 1 determines whether the DHCP_BtoU table 401_ES1 is empty (step S4401). If the DHCP_BtoU table 401_ES1 is empty (step S4401: YES), the ES 1 determines whether DHCPDISCOVER has been received (step S4402). If DHCPREQUEST, or DHCPACK has been received (step S4402: NO), the ES 1 outputs an error (step S4403), and ends the DHCP communication scheme conversion processing.

If DHCPDISCOVER has been received (step S4402: YES), the ES 1 ends the DHCP communication scheme conversion processing, and executes the DHCP packet transmission processing without converting the communication scheme.

If the DHCP_BtoU table 401_ES1 is not empty (step S4401: NO), the ES 1 determines whether DHCPACK has been received (step S4404). If DHCPDISCOVER, or DHCPREQUEST has been received (step S4404: NO), the ES 1 extracts the MAC address of another DHCP server that is registered in the DHCP_BtoU table 401_ES1 (step S4405). The ES 1 converts the communication scheme from "broadcast" to "unicast to the DHCP server" (step S4406). After the conversion, the ES 1 ends the DHCP communication scheme conversion processing, and executes the DHCP packet transmission processing for the DHCP packet whose communication scheme has been converted to unicast.

If DHCPACK has been received (step S4404: YES), the ES 1, extracts from the DHCP_BtoU table 401_ES1, the MAC address of another DHCP server and extracts from DHCPACK, the MAC address of the transmission source of DHCPDISCOVER (step S4407). The ES 1 generates from DHCPACK whose communication scheme is broadcast, DHCPACK whose destination is the DHCP server and DHCPACK whose destination is the transmission source of DHCPDISCOVER (step S4408). After the generation, the ES 1 ends the DHCP communication scheme conversion processing, and executes the DHCP packet transmission processing with respect to the generated DHCP packets.

As described, according to the embodiments, the broadcasting of ARP requests are converted to transmissions by unicast to MAC addresses stored in a BtoU table and MAC addresses obtained from ARP replies are updated. Consequently, broadcasting is suppressed and since network changes can be coped with, invalid data is not transmitted, thereby enabling network load to be suppressed. With respect to DHCP as well, the communication device converts the broadcasting of DHCPDISCOVER to DHCP servers into transmissions by unicast to stored MAC addresses and in DHCPOFFERs, updates the MAC address.

The ARP cache table responds to network changes by way of the aging_time. However, if the aging_time is long, although the degree to which broadcasting is suppressed increases, the response to network changes becomes delayed. Further, if the aging_time is short, although the response to the network changes quickens, the degree to which broadcasting is suppressed decreases. The communication device according to the present embodiment, updates the data of the BtoU table and can thereby respond to network changes and since records are not deleted according to a predetermined period, can increase the degree to which broadcasting is suppressed.

The communication device may delete relevant records from the BtoU table when a converted ARP request, an ARP reply corresponding to DHCPDISCOVER, or DHCPOFFER is not received. Thus, the communication device can follow network changes and prevent the transmission of data to invalid conversion destinations. Further, since the data of the BtoU table is minimal, the speed of searches related to conversion can be increased.

After updating the BtoU table to the MAC address of the ARP reply in response to an ARP request, if there are multiple IP addresses for the same MAC address, the communication device may transmit a pseudo ARP request to the IP addresses. If an ARP reply is received in response to the pseudo ARP request, the communication device may update the BtoU table. A pseudo ARP request is transmitted to at least the IP addresses remaining excluding the IP address of the ARP request. Consequently, the communication device can cause the contents of the BtoU table to follow network changes accompanying IP aliasing.

If an ARP reply is not received in response to the pseudo ARP request, the communication device may delete the relevant record from the BtoU table. Consequently, the communication device can cause the contents of the BtoU table to follow network changes accompanying changes in IP address allocation by DHCP, etc.

With respect to DHCPOFFER in response to DHCPDISCOVER, the communication device may convert the communication scheme into unicast to the MAC address stored in the BtoU table and into unicast to the transmission source of DHCPDISCOVER, and accordingly perform transmission. Consequently, the communication device can suppress broadcasting with respect to DHCPOFFER and network load.

The communication device may set the number of broadcasts in a fixed period according to protocol, or according to transmission/reception address. Consequently, the communication device can suppress invalid broadcast data and heavy broadcasting by a malicious user. Further, since the communication address counts broadcasts according to address, the communication device can prevent broadcasts from a different address from being discarded.

In the communication system 100 according to the first embodiment, when a record is present in the DHCP_BtoU table, the ES converts DHCPDISCOVER to unicast transmission. Therefore, after a record is added to the DHCP_BtoU table, if a DHCP server is newly started up, the DHCP server has not been added to the DHCP_BtoU table. The communication system 100 according to the second embodiment will be described with respect to a method of adding the newly started up DHCP server to the DHCP_BtoU table, after a record has been added to the DHCP_BtoU table.

The hardware of the ES according to the second embodiment is equivalent to that of the ES according to the first embodiment and description thereof will be omitted. Functions of the ES according to the second embodiment will be described with reference to FIG. 45.

Figure 45:
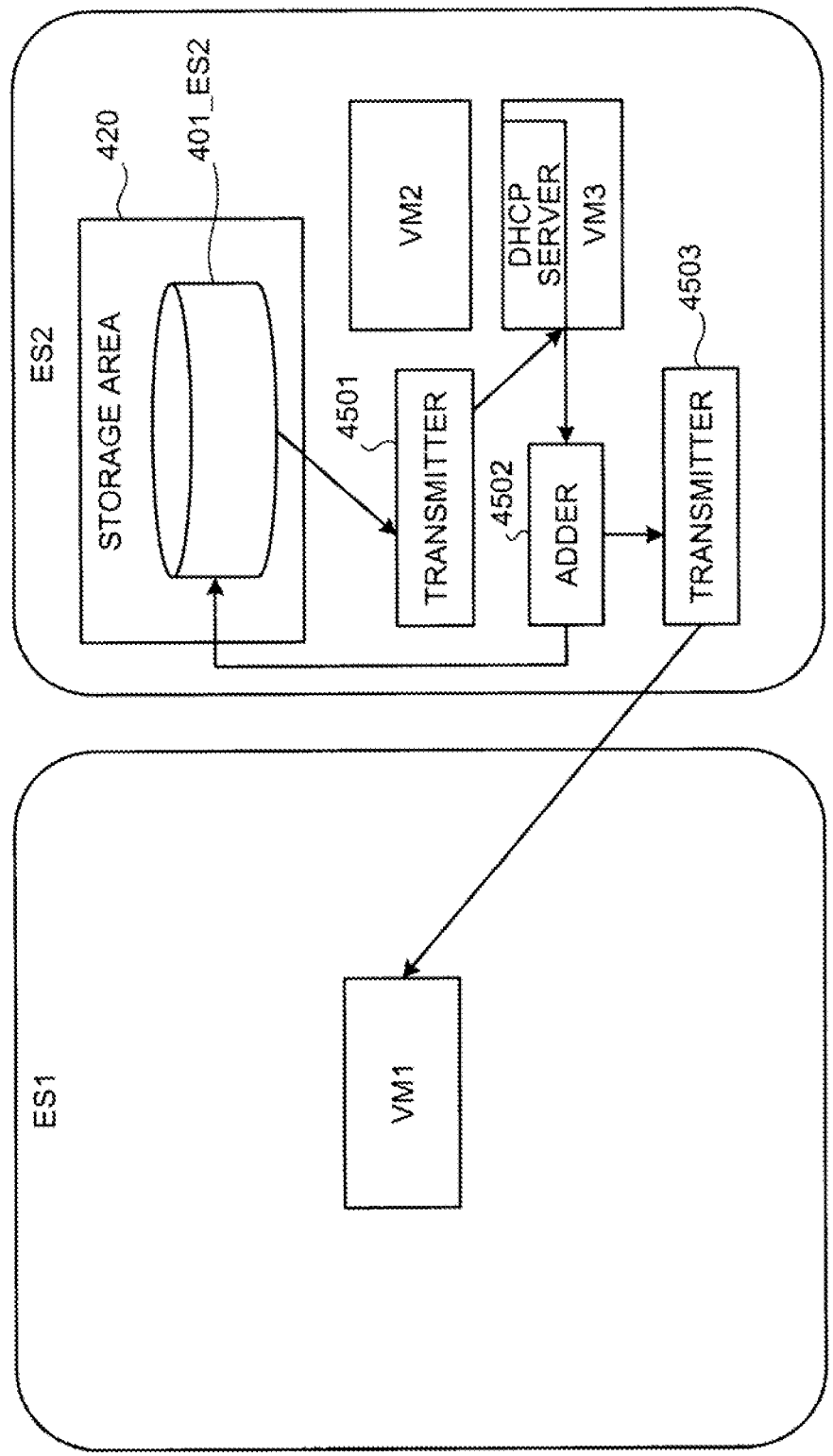
FIG. 45 is a block diagram depicting an example of functions of the communication system according to a second embodiment.

FIG. 45 is a block diagram depicting an example of functions of the communication system according to the second embodiment. The communication system 100 includes the storage area 420, a transmitter 4501, an adder 4502, and a transmitter 4503. These functions (the transmitter 4501 to the transmitter 4503) forming a controller are implemented by executing on the CPU 301, a program stored in a storage device. The storage device is, for example, the ROM, the RAM, the magnetic disk, and the optical disk of the ES 2. Further, these functions may be implemented by the execution of the program on another CPU, via the I/F of the ES 2. The storage area 420 according to the second embodiment is identical to the storage area 420 of the first embodiment and description thereof is omitted. The VM 2 in the ES 2 is in a state where a DHCP server has been newly started up.

The transmitter 4501 has a function of transmitting to a device among a group of devices and storing an allocable layer 3 address, a pseudo acquisition request for a layer 3 address. For example, the transmitter 4501, among devices in the communication system 100, transmits to a DHCP server, a pseudo DHCPDISCOVER. The destination of the transmission may be a newly detected DHCP server, a DHCP server under the management of the ES 1, etc.

The adder 4502 has a function of adding to the storage area 420, the layer 2 address of the device having an allocable layer 3 address included in a fourth response, when the fourth response is received in response to the pseudo acquisition request. For example, when DHCPOFFER is received in response to a pseudo DHCPDISCOVER, the adder 4502 adds to the DHCP_BtoU table 401_ES2, the MAC address of the VM 3, which is the transmission source of DHCPOFFER. If the MAC address of the DHCP server has already been added to the DHCP_BtoU table 401_ES2, the adder 4502 need not add the DHCP server.

The transmitter 450 has a function of transmitting the fourth response to a device (among the group of devices) other than the device storing an allocable layer 3 address, if the layer 2 address of a detected device has been added to the storage area 420. For example, if the MAC address of the DHCP server has been added to the DHCP_BtoU table 401_ES2, the transmitter 4503 transmits DHCPOFFER to the VM 1.

Figure 46:
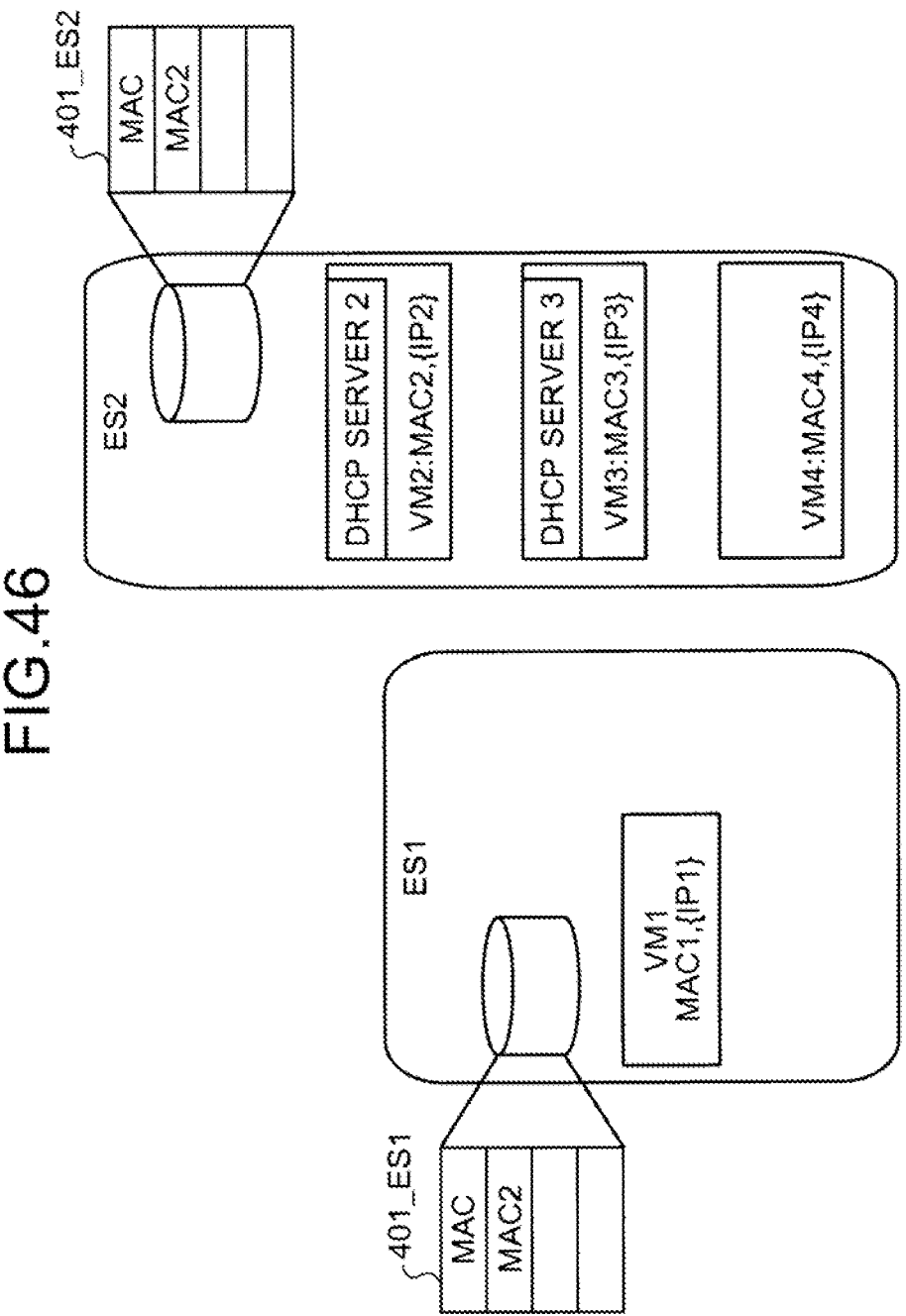
FIG. 46 is a first diagram depicting DHCP server addition.

FIG. 46 is a first diagram depicting DHCP server addition. In the communication system 100 depicted in FIG. 46, the VM 1 on the ES 1 has been allocated MAC1 as a MAC address and IP1 as an IP address. The VM 2, the VM 3, and the VM 4 on the ES 2 have been allocated respectively MAC2, MAC3, and MAC4 as MAC addresses and IP2, IP3, and IP4 as IP addresses.

At the VM 2, the DHCP server 2 is running, and in the DHCP_BtoU table 401_ES1 and the DHCP_BtoU table 401_ES2, MAC2, which is the MAC address of the VM 2 in which the DHCP server 2 is running, is registered. In this state, the DHCP server 3 at the VM 3 is started as a new DHCP server and description hereof will be given with reference to FIGS. 47 to 49.

Figure 47:
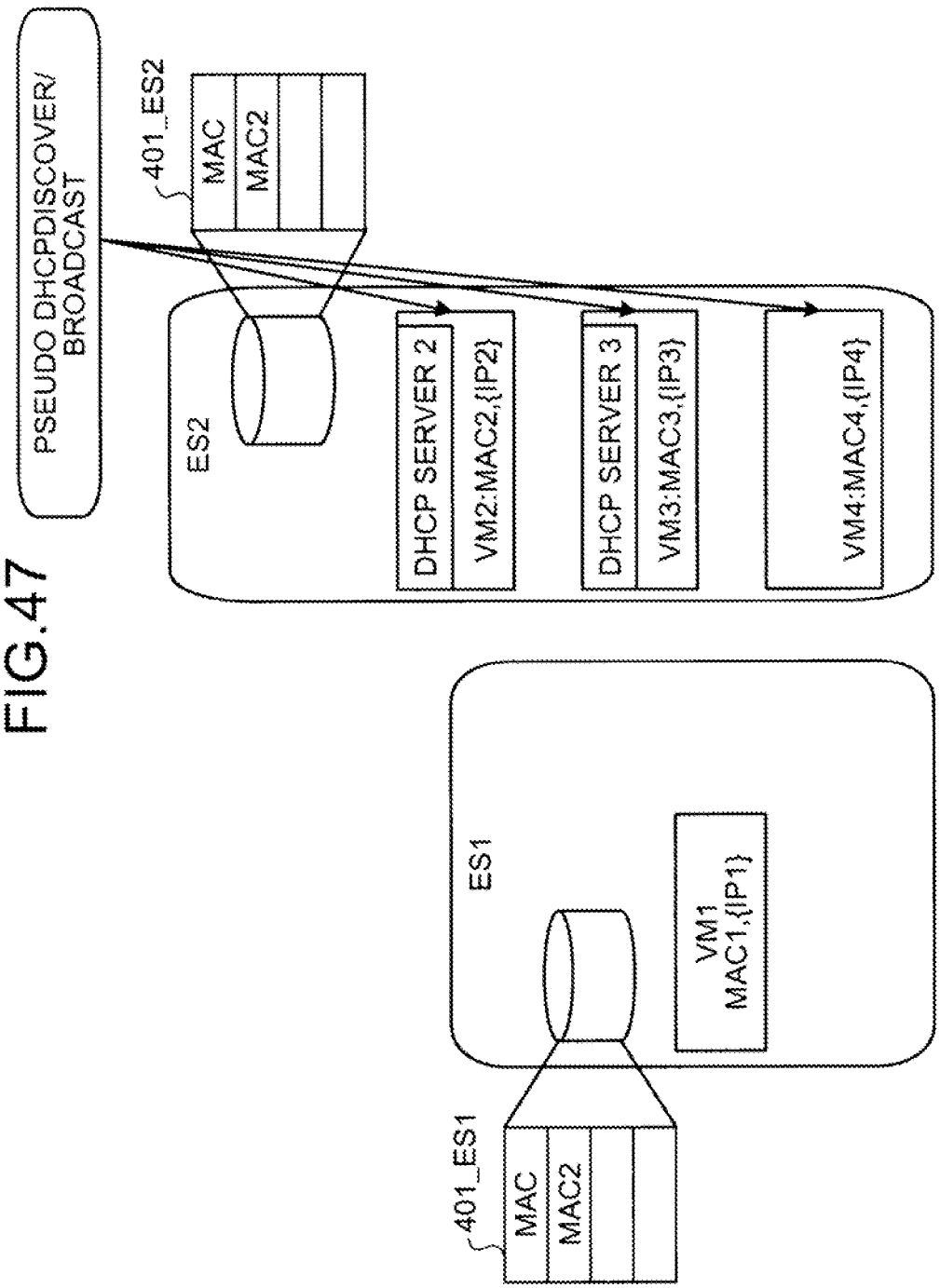
FIG. 47 is a second diagram depicting DHCP server addition.

FIG. 47 is a second diagram depicting DHCP server addition. In the communication system 100 depicted in FIG. 47, the ES 2 has detected the DHCP server 3. In this case, the ES 2 having detected the new DHCP server 3, transmits a pseudo DHCPDISCOVER to the subordinate VMs 2 to 4. The pseudo DHCPDISCOVER is no different from DHCPDISCOVER transmitted by a DHCP client on a VM. For example, to enable the identification of a pseudo DHCPDISCOVER, the ES 2 may set the physical MAC address of the ES 2 as the client hardware address of DHCPDISCOVER, set a particular value, etc.

Figure 48:
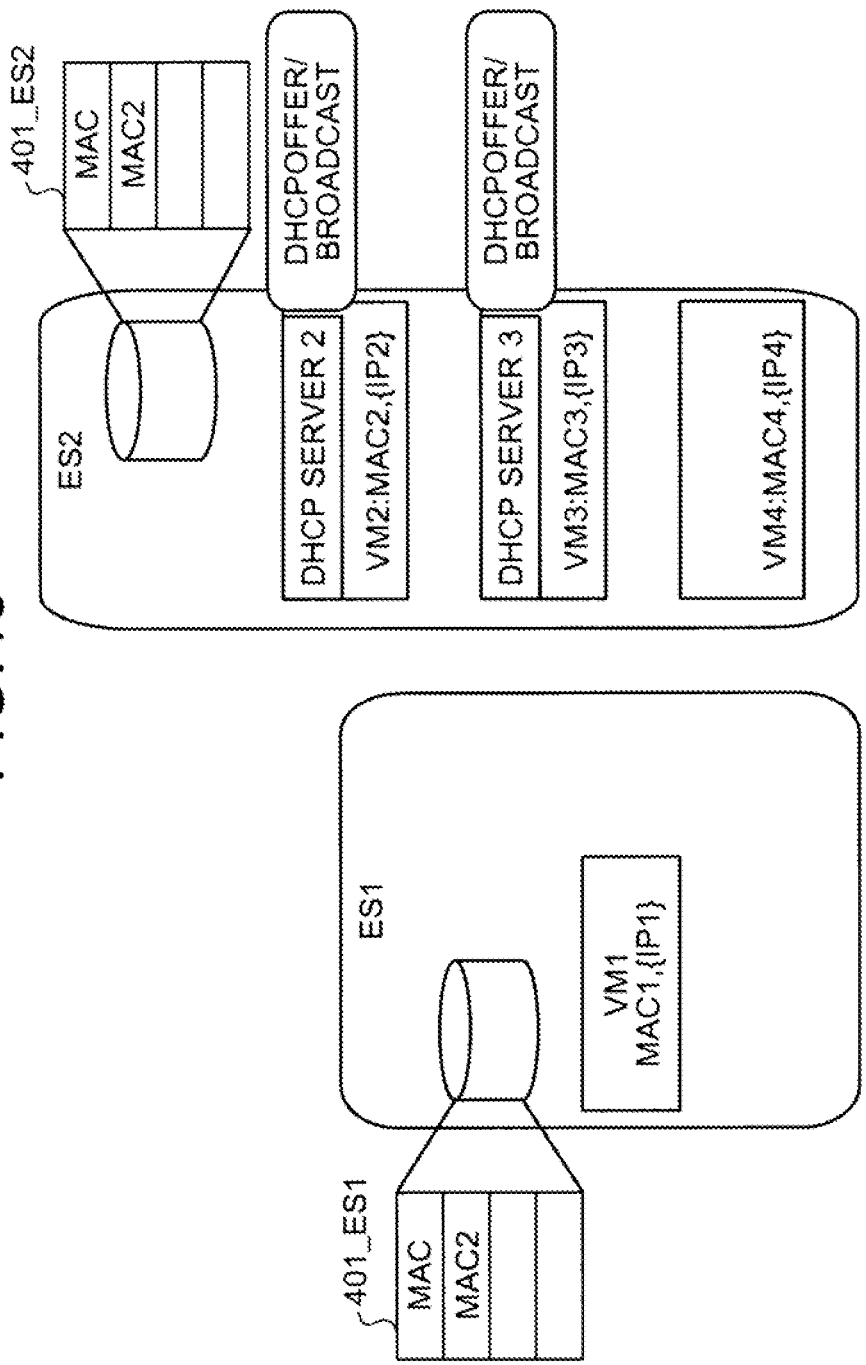
FIG. 48 is a third diagram depicting DHCP server addition.

FIG. 48 is a third diagram depicting DHCP server addition. In the communication system 100 depicted in FIG. 48, the VMs 2 to 4 have received the pseudo DHCPDISCOVER. In this state, since the DHCP server is running, the VM 2 and the VM 3 broadcast DHCPOFFER in response to the pseudo DHCPDISCOVER.

Figure 49:
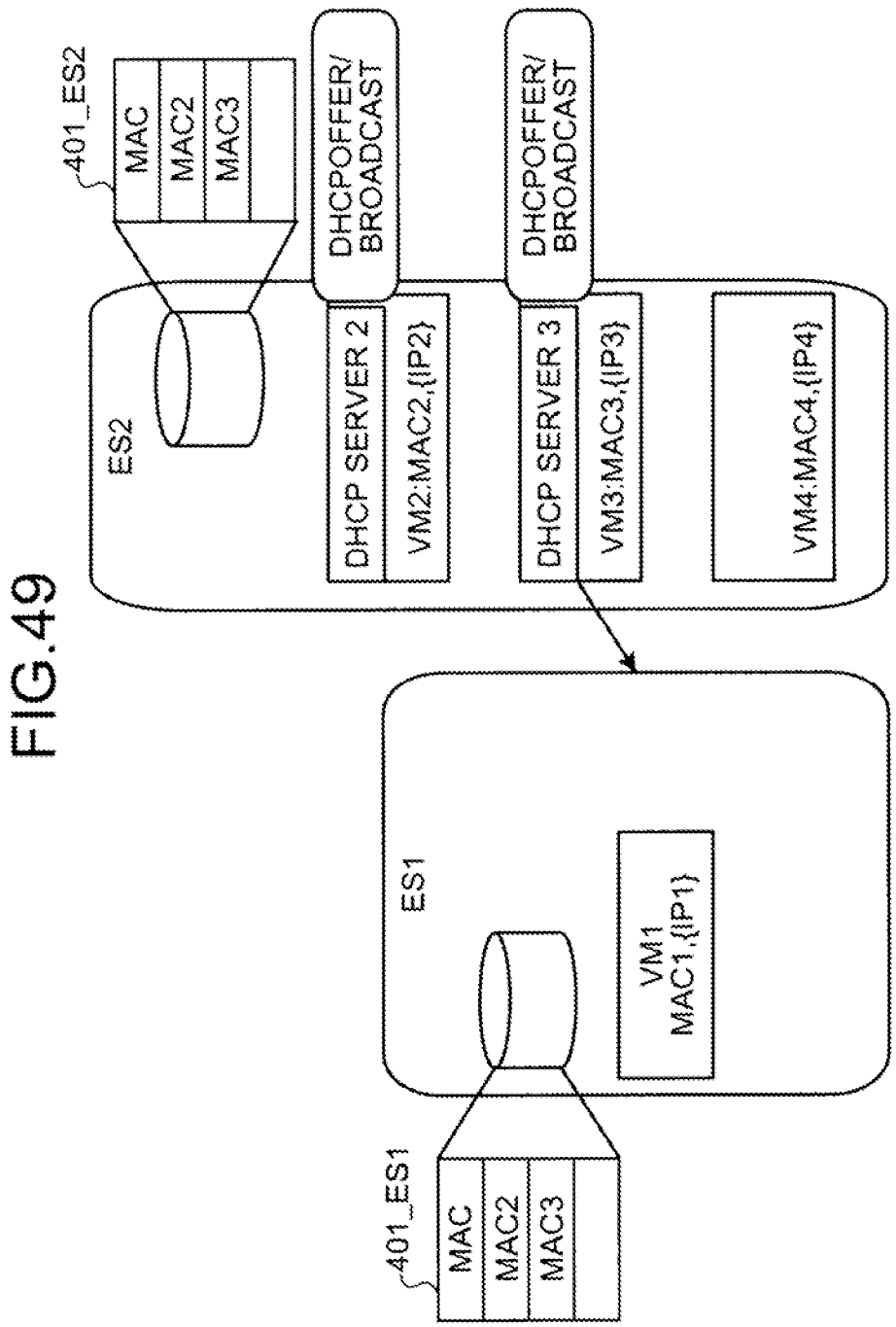
FIG. 49 is a fourth diagram depicting DHCP server addition.

FIG. 49 is a fourth diagram depicting DHCP server addition. In the communication system 100 depicted in FIG. 49, the VM 2 and the VM 3 have broadcast DHCPOFFER.

In this state, the ES 2 receives DHCPOFFER from the VM 2 and DHCPOFFER from the VM 3. DHCPOFFER from the VM 2 is already registered in the DHCP_BtoU table 401_ES2 as information concerning the VM 2 and therefore, the ES 2 does nothing. DHCPOFFER from the VM 3 has not been registered in the DHCP_BtoU table 401_ES2 as information concerning the VM 3 and therefore, the ES 2 transmits DHCPOFFER to another ES. Consequently, the communication system 100 can add to the DHCP_BtoU table, a DHCP server newly started up.

Flowcharts of the operations depicted in FIG. 46 to FIG. 49 will be described. The DHCP packet processing, DHCP transmission timeout processing, DHCP packet reception processing, and the DHCP communication scheme conversion processing according to the second embodiment are equivalent to the processes described with reference to FIGS. 40 to 42, and FIG. 44, and further description thereof is omitted.

Figure 50:
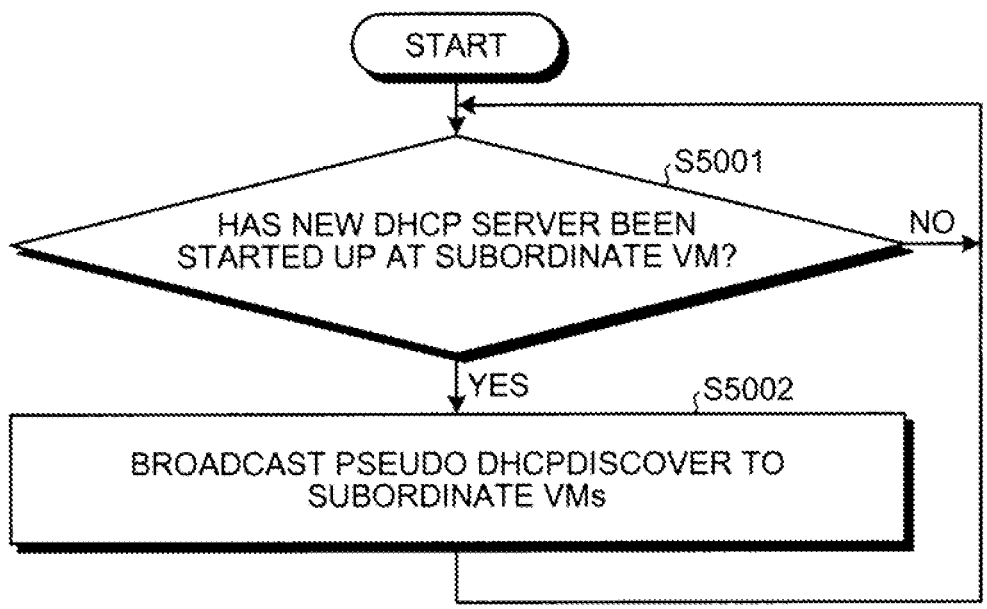
FIG. 50 is a flowchart depicting an example of pseudo DHCPDISCOVER transmission processing.

FIG. 50 is a flowchart depicting an example of pseudo DHCPDISCOVER transmission processing. The DHCP packet processing according to the second embodiment is periodically run by the ES 1 according to the second embodiment.

The ES 1 determines whether a new DHCP server has been started up at a subordinate VM (step S5001). If a new DHCP server has been started up (step S5001: YES), the ES 1 broadcasts a pseudo DHCPDISCOVER to subordinate VMs (step S5002). If a pseudo DHCPDISCOVER has been transmitted, or if a new DHCP server has not been started up (step S5001: NO), the ES 1 transitions to step S5001.

Figure 51:
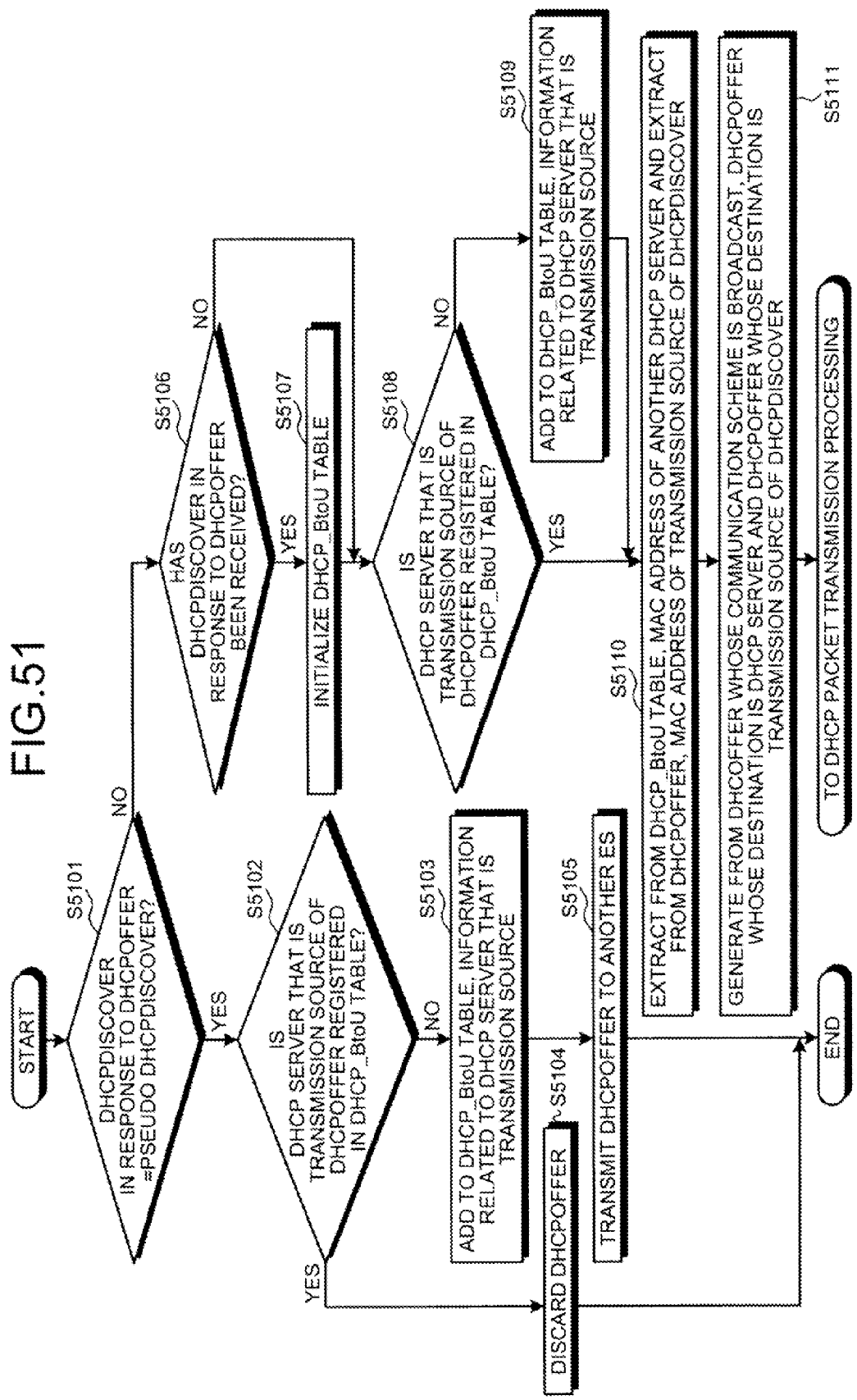
FIG. 51 is a flowchart depicting DHCPOFFER reception processing according to the second embodiment.

FIG. 51 is a flowchart depicting DHCPOFFER reception processing according to the second embodiment. Processes at steps S5106 to S5111 of the DHCPOFFER reception processing according to the second embodiment are equivalent to the processes at steps S4301 to S4306, and description thereof is omitted.

The ES 1 determines whether DHCPDISCOVER in response to DHCPOFFER is a pseudo DHCPDISCOVER (step S5101). If DHCPDISCOVER is not a pseudo DHCPDISCOVER (step S5101: NO), the ES 1 transitions to step S5106. If DHCPDISCOVER is a pseudo DHCPDISCOVER (step S5101: YES), the ES 1 determines whether the DHCP server that is the transmission source of DHCPOFFER is registered in the DHCP_BtoU table 401_ES1 (step S5102). If the DHCP server is registered (step S5102: YES), the ES 1 discards DHCPOFFER (step S5103), and ends the DHCPOFFER reception processing.

If the DHCP server is not registered (step S5102: NO), the ES 1 adds to the DHCP_BtoU table 401_ES1, information related to the DHCP server that is the transmission source (step S5104). The ES 1 transmits DHCPOFFER to another ES (step S5105), and ends the DHCPOFFER reception processing.

As described, according to the embodiments, with respect to a detected DHCP server, a pseudo DHCPDISCOVER is transmitted, a received DHCPOFFER is added, and DHCPOFFER may be transmitted to another device. Consequently, when a DHCP server has already been registered in the BtoU table and even if a new DHCP server is added, the communication device can add the new DHCP server to a unicast conversion destination. Therefore, the communication device can actively notify other devices of a service by the new DHCP server.

Concerning the communication method described in the first and the second embodiments, although description was given concerning a virtual environment in an end host server, the communication method is further applicable to, for example, an end host server and network switch. Further, in addition to ARP, DHCP applicable protocols include, for example, common internet file system (CIFS).

The communication method described in the first and the second embodiments may be implemented by executing a prepared program on a computer such as a personal computer and a workstation. The program is stored on a computer-readable recording medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method executed by a computer having access to a storage device having stored therein correlation relations between layer 2 addresses and layer 3 addresses set for a group of devices on a network, the communication process comprising:
   extracting from the storage device when an acquisition request for a layer 2 address is to be transmitted, a first layer 2 address that corresponds to a layer 3 address included in the acquisition request;
   converting a destination of the acquisition request, from a second layer 2 address representing the group of devices, to the first layer 2 address;
   transmitting the converted acquisition request whose destination has been converted; and
   updating when a response to the converted acquisition request has been received, the first layer 2 address in the storage device, to the first layer 2 address included in response.

2. The communication method according to claim 1, wherein
   the updating includes deleting the first layer 2 address in the storage device, when no response to the converted acquisition request is received.

3. The communication method according to claim 1 and further comprising:
   determining, after the updating to the first layer 2 address, whether multiple layer 3 addresses corresponding to the first layer 2 address are present in the storage device;
   transmitting to remaining layer 3 addresses exclusive of the layer 3 address included in the acquisition request, a pseudo acquisition request addressed to the first layer 2 address, when multiple layer 3 addresses corresponding to the first layer 2 address are present; and
   updating in the storage device, the first layer 2 address corresponding to the remaining layer 3 addresses, when a response to the pseudo acquisition request has been received, the first layer 2 address being updated to the first layer 2 address included in the response to the pseudo acquisition request.

4. The communication method according to claim 3, wherein
   the updating to the first layer 2 address included in the response to the pseudo acquisition request includes deleting from the storage device, the first layer 2 address corresponding to the remaining layer 3 addresses, when no response to the pseudo acquisition request is received.

5. The communication method according to claim 1, wherein
   the storage device has stored therein a layer 2 address of a device that is among the group of devices on the network and that stores an available layer 3 address, and
   the extracting includes extracting from the storage device, the first layer 2 address of the device that stores an available layer 3 address, when the acquisition request to be transmitted is an acquisition request for an available layer 3 address.

6. A communication method executed by a computer having access to a storage device having stored therein a first layer 2 address of a device that is among a group of devices on a network and stores an allocable layer 3 address, the communication method comprising:
   receiving an acquisition request for a layer 3 address;
   extracting from the storage device and when a first response to the acquisition request is to be transmitted, the first layer 2 address and extracting from the first response, a second layer 2 address that is the transmission source of the acquisition request;

generating based on the first response, a second response having a destination to the first layer 2 address and a third response having a destination to the second layer 2 address; and transmitting the second and the third responses.

7. The communication method according to claim 6 and further comprising:

transmitting to the device that stores the allocable layer 3 address, a pseudo acquisition request for a layer 3 address;

adding to the storage device and when a fourth response to the pseudo acquisition request has been received, the layer 2 address of the device that stores the allocable layer 3 address included in the fourth response; and transmitting the fourth response to, among the group of devices, a device other than the device that stores the allocable layer 3 address, when the layer 2 address of the device that stores the allocable layer 3 address is added to the storage device.

8. A communication device comprising:

a storage device having stored therein correlation relations between layer 2 addresses and layer 3 addresses set for a group of devices on a network;

an extractor that extracts from the storage device when an acquisition request for a layer 2 address is to be transmitted, a first layer 2 address that corresponds to a layer 3 address included in the acquisition request;

a converter that converts a destination of the acquisition request, from a second layer 2 address representing the group of devices, to the first layer 2 address;

a transmitter that transmits the converted acquisition request whose destination has been converted; and an updater that when a response to the converted acquisition request has been received, updates the first layer 2 address in the storage device, to the first layer 2 address included in response.

9. A communication device comprising:

a storage device having stored therein a first layer 2 address of a device that is among a group of devices on a network and stores an allocable layer 3 address;

a receiver that receives an acquisition request for a layer 3 address;

an extractor that extracts from the storage device and when a first response to the acquisition request is to be transmitted, the first layer 2 address and that extracts from the first response, a second layer 2 address that is the transmission source of the acquisition request;

a generator that based on the first response, generates a second response having a destination to the first layer 2 address and a third response having a destination to the second layer 2 address; and a transmitter that transmits the second and the third responses.

10. A non-transitory computer-readable recording medium having stored therein a program for causing a computer to execute a process, the computer having access to a storage device having stored therein correlation relations between layer 2 addresses and layer 3 addresses set for a group of devices on a network, the process comprising:

extracting from the storage device when an acquisition request for a layer 2 address is to be transmitted, a first layer 2 address that corresponds to a layer 3 address included in the acquisition request;

converting a destination of the acquisition request, from a second layer 2 address representing the group of devices, to the first layer 2 address;

transmitting the converted acquisition request whose destination has been converted; and updating when a response to the converted acquisition request has been received, the first layer 2 address in the storage device, to the first layer 2 address included in response.

11. A non-transitory computer-readable recording medium having stored therein a program for causing a computer to execute a process, the computer having access to a storage device having stored therein a first layer 2 address of a device that is among a group of devices on a network and stores an allocable layer 3 address, and the processing comprising:

receiving an acquisition request for a layer 3 address;

extracting from the storage device and when a first response to the acquisition request is to be transmitted, the first layer 2 address and extracting from the first response, a second layer 2 address that is the transmission source of the acquisition request;

generating based on the first response, a second response having a destination to the first layer 2 address and a third response having a destination to the second layer 2 address; and transmitting the second and the third responses.

* * * * *